US011945043B2

(12) United States Patent
Hunze

(10) Patent No.: US 11,945,043 B2
(45) Date of Patent: Apr. 2, 2024

(54) ENERGY BEAM GENERATION SYSTEMS AND OPTICAL SYSTEMS WITH EXPANDED SCAN FIELDS

(71) Applicant: Concept Laser GmbH, Lichtenfels (DE)

(72) Inventor: Stephan Hunze, Lichtenfels (DE)

(73) Assignee: Concept Laser GmbH, Lichtenfels (DE)

(*) Notice: Subject to any disclaimer, the term of this patent is extended or adjusted under 35 U.S.C. 154(b) by 499 days.

(21) Appl. No.: 16/953,434

(22) Filed: Nov. 20, 2020

(65) Prior Publication Data

US 2022/0161355 A1     May 26, 2022

(51) Int. Cl.
| | |
|---|---|
| *B23K 26/00* | (2014.01) |
| *B23K 26/03* | (2006.01) |
| *B23K 26/06* | (2014.01) |
| *B23K 26/342* | (2014.01) |
| *B23K 26/352* | (2014.01) |

(Continued)

(52) U.S. Cl.
CPC ........ *B23K 26/0006* (2013.01); *B23K 26/032* (2013.01); *B23K 26/0648* (2013.01); *B23K 26/342* (2015.10); *B23K 26/352* (2015.10); *B33Y 30/00* (2014.12); *G02B 13/0005* (2013.01); *G02B 13/22* (2013.01)

(58) Field of Classification Search
CPC ............... G02B 13/0005; G02B 13/22; B23K 26/0006; B23K 26/352; B23K 26/032; B33Y 50/02; B33Y 30/00; B33Y 10/00
See application file for complete search history.

(56) References Cited

U.S. PATENT DOCUMENTS

| 4,863,250 A | 9/1989 | Ishizuka |
| 5,404,247 A | 4/1995 | Cobb et al. |

(Continued)

FOREIGN PATENT DOCUMENTS

| WO | WO2007050662 A2 | 5/2007 |
| WO | WO2018136902 A1 | 7/2018 |

OTHER PUBLICATIONS

Araki et al., Development of F-Theta Lens for UV Lasers, Industrial Materials, SEI Technical Review, No. 69, Oct. 2009, pp. 59-65.

(Continued)

*Primary Examiner* — John J Norton
*Assistant Examiner* — Franklin Jefferson Wang
(74) *Attorney, Agent, or Firm* — Dority & Manning, P.A.

(57) ABSTRACT

An optical system may include a first optical assembly and a first scan field expansion assembly. The first optical assembly may include or may be configured as a first flat-field lens. The first flat-field lens may have a first nominal scan field with a first flat focal plane. The first scan field expansion assembly may include one or more first field-expanding optical elements configured to provide a first expanded scan field coinciding with the first flat focal plane. The first expanded scan field may have a cross-sectional width and/or area that exceeds a corresponding cross-sectional width and/or area of the first nominal scan field. A method of additively manufacturing a three-dimensional object may include directing a first energy beam through the first optical assembly, and directing the first energy beam through the first scan field expansion assembly.

19 Claims, 21 Drawing Sheets

(51) Int. Cl.
  *B33Y 30/00* (2015.01)
  *G02B 13/00* (2006.01)
  *G02B 13/22* (2006.01)

(56) References Cited

U.S. PATENT DOCUMENTS

| | | | | |
|---|---|---|---|---|
| 5,812,181 | A * | 9/1998 | Ishibe | G02B 13/0005 |
| | | | | 359/662 |
| 5,838,481 | A | 11/1998 | Ang | |
| 6,515,782 | B1 | 2/2003 | Harrigan et al. | |
| 7,947,922 | B2 | 5/2011 | Gross et al. | |
| 8,329,600 | B2 | 12/2012 | Gu et al. | |
| 9,939,633 | B2 * | 4/2018 | De Loor | G02B 13/0005 |
| 2008/0259427 | A1 * | 10/2008 | Voss | G02B 26/105 |
| | | | | 359/206.1 |
| 2012/0002261 | A1 * | 1/2012 | Yukawa | G02B 26/125 |
| | | | | 359/204.2 |
| 2014/0071509 | A1 * | 3/2014 | Fujino | G02B 26/125 |
| | | | | 359/206.1 |
| 2015/0346483 | A1 * | 12/2015 | Ehrmann | B23K 26/0648 |
| | | | | 219/121.85 |
| 2018/0318926 | A1 * | 11/2018 | Woods | B23K 26/0648 |
| 2019/0129188 | A1 * | 5/2019 | Aslanov | G02B 26/105 |
| 2019/0143454 | A1 | 5/2019 | Choi et al. | |
| 2019/0286106 | A1 * | 9/2019 | Goldsmith | G05B 19/402 |
| 2020/0094320 | A1 * | 3/2020 | Krol | B29C 64/364 |
| 2021/0143015 | A1 * | 5/2021 | Okumura | B23K 26/352 |

OTHER PUBLICATIONS

Edmund Optics, Telecentric Illumination: Why You Need It In Machine Vision Applications, Section, 12.4 of the Imaging Resource Guide, 10 Pages. Retrieved on Jul. 22, 2020 from https://www.edrcenter/application-notes/imaging/telecentric-illumination-why-you-need-it-in-machine-vision-applications/.

Edmund Optics, The Advantages of Telecentricity, Section 5.1 of the Imaging Resource Guide, 7 Pages. Retrieved on Jul. 22, 2020 from https://www.edmundoptics.com/knowledge-center/application-notes/imaging/advantages-of-telecentricity/#:~:text=The%20ability%20to%20quickly%20perform.possible%20accuracy%20to%20be%20obtained.

Jenoptik, F-Theta Lens for Laser Material Processing Applications, Detailed Laser Processing with F-Theta Lenses, 13 Pages. Retrieved on Jul. 22, 2020 from: https://www.jenoptik.us/products/optical-systems/objective-lenses-for-high-precision-laser-material-processing/f-theta-objective-lenses#:~:text=You%20can%20use%20standard%20F,high%2Dprecision%20laser%20material%20processing.

Jenoptik, Telecentric Measurement Lenses JENmetar: Machine Vision at its most Powerful!, Products and Solutions, Optics and Optical Systems, Customized and Standardized Objective Lenses, Telecentric Lens JENmetar, 8 Pages. Retrieved on Jul. 22, 2020 from https://www.jenoptik.us/products/optical-systems/customized-and-standardized-objective-lenses/telecentric-lens-jenmetar.

Lasit (Laser Marking Innovation) Telecentric Lens vs Standard Lens, Laser Marking Systems, Lens Differences, Dec. 20, 2019, 5 Pages. Retrieved on Jul. 22, 2020 from: https://www.lasitlaser.com/portfolio/laser-marking-telecentric-lens/.

NEWPORT Experience Solutions, Optics: How to Build a Beam Expander, Optics Technical Note #1 Optical Components, 12 Pages. Retrieved Jul. 22, 2020 from: https://www.newport.com/medias/sys_master/images/images/he7/h44/8797226237982/How-to-Build-a-Beam-Expander.pdf.

Paschotta, Scanning Lenses, RP Photonics Encyclopedia, RP Photonics Consulting GmbH, 5 Pages. Retrieved from https://www.rp-photonics.com/scanning-lenses.html.

Simanek, Telecentric Lens System, Lockhaven Edu, 3 pages. Retrieved from: http://www.lockhaven.edu/~dsimanek/3d/telecent.htm.

Thorlabs Inc, F-Theta Lenses Tutorial, Technical Resources/Optical Systems Tutorials, 2 pgs. Retrieved Jul. 22, 2020 from https://www.thorlabs.com/newgrouppage9.cfm?objectgroup_id=10766.

Thorlabs, Telecentric Lenses Tutorial, Technical Resources, Camera and Camera Lense Technical Publications, 4 Pages. Retrieved Jul. 22, 2020 from: https://www.thorlabs.com/newsgrouppage9.cfm?objectgroup_id=10762.

ULO Optics, Telecentric Scanning Lenses, 3 Pages. Retrieved on Jul. 22, 2020 from: https://www.ulooptics.com/telecentric-scanning-lenses.

* cited by examiner

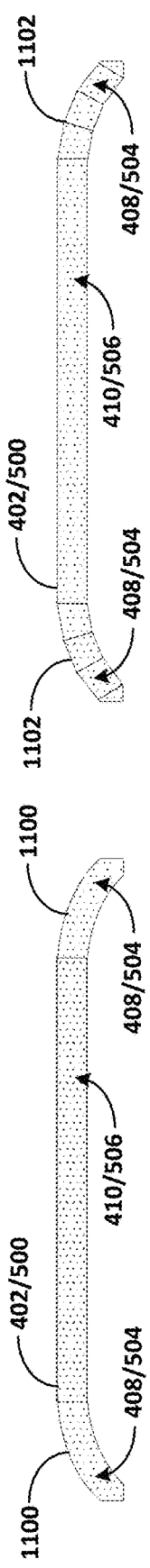
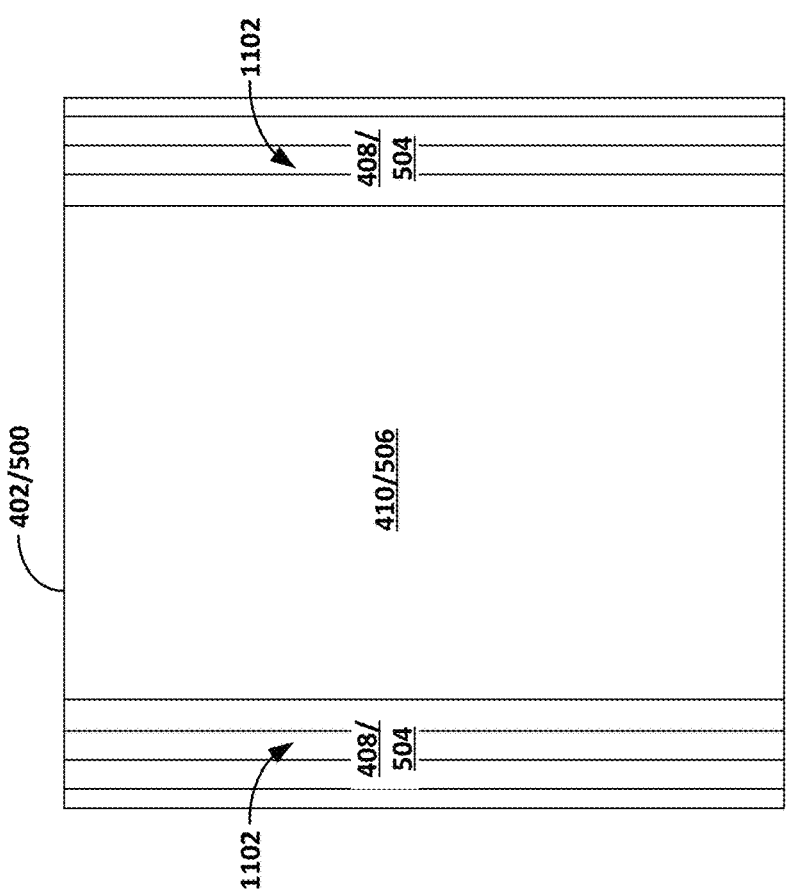
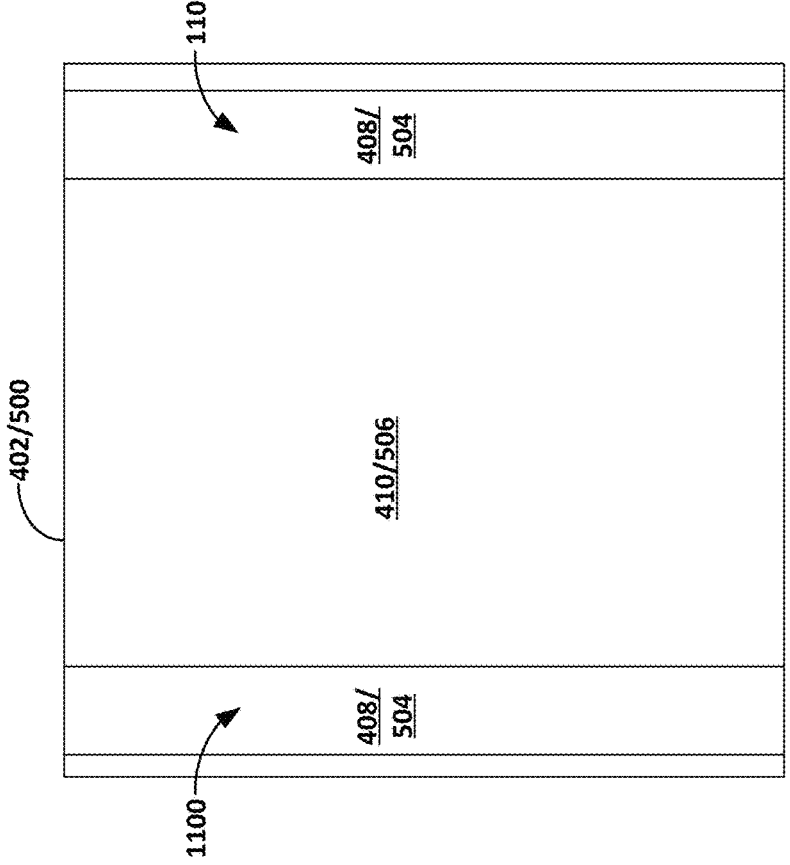
FIG. 11E
FIG. 11F
FIG. 11G
FIG. 11H

ENERGY BEAM GENERATION SYSTEMS AND OPTICAL SYSTEMS WITH EXPANDED SCAN FIELDS

FIELD

The present disclosure generally pertains to energy beam and optical assemblies, and related systems and methods, including those associated with additive manufacturing machines and methods of additively manufacturing three-dimensional objects.

BACKGROUND

Energy beam systems and devices may utilize a plurality of energy beams. The plurality of energy beams may be directed onto a focal plane to perform work. For example, additive manufacturing systems or machines may utilize a plurality of energy beams to irradiate powder material to additively manufacture three-dimensional objects. In some instances, an energy beam system or an optical system may include a plurality of optical assemblies respectively configured to provide a corresponding plurality of energy beams. The optical assemblies may include a housing that holds the one or more optical elements, with the optical elements of the respective optical assemblies being separated by a distanced determined at least by the space occupied by the housing. In some instances, telecentric lenses may be used. With a telecentric lens, an energy beam incident upon the focal plane may be parallel to an optical axis of the telecentric lens across substantially the whole cross-sectional width and/or area of the scan field. However, with a plurality of telecentric lenses, the respective scan fields may be separated from one another by a distanced determined at least by the space occupied by the housing. Such separation would result in gaps in the aggregate scan field of an energy beam system or an optical system that includes a plurality of optical assemblies.

Accordingly, there exists a need for improved energy beam generation systems and devices, improved optical systems and devices, as well as improved systems and methods of generating an energy beam. For example, there exists a need for improved additive manufacturing machines, and improved systems and methods of generating an energy beam for additively manufacturing three-dimensional objects.

BRIEF DESCRIPTION

Aspects and advantages will be set forth in part in the following description, or may be apparent from the description, or may be learned through practicing the presently disclosed subject matter.

In one aspect, the present disclosure pertains to optical systems for apparatuses for additively manufacturing three-dimensional objects. An exemplary optical system may include a first optical assembly and a first scan field expansion assembly. The first optical assembly may include or may be configured as a first flat-field lens. The first flat-field lens may have a first nominal scan field with a first flat focal plane. The first scan field expansion assembly may include one or more first field-expanding optical elements configured to provide a first expanded scan field coinciding with the first flat focal plane. The first expanded scan field may have a cross-sectional width and/or area that exceeds a corresponding cross-sectional width and/or area of the first nominal scan field.

In another aspect, the present disclosure pertains to methods of additively manufacturing a three-dimensional object. An exemplary method may include directing a first energy beam through a first optical assembly that includes or that is configured as a first flat-field lens that has a first nominal scan field with a first flat focal plane, and directing the first energy beam through a first scan field expansion assembly that includes one or more first field-expanding optical elements configured to provide a first expanded scan field coinciding with the first flat focal plane. The first expanded scan field may have a cross-sectional width and/or area that exceeds a corresponding cross-sectional width and/or area of the first nominal scan field.

In yet another aspect, the present disclosure pertains to computer-readable medium. An exemplary computer-readable medium may include computer-executable instructions, which when executed by a processor associated with an additive manufacturing machine or system, cause the additive manufacturing machine or system to perform a method in accordance with the present disclosure.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which:

FIGS. 11A and 11B, 11C and 11D, 11E and 11F, 11G and 11H, 11I and 11J, and 11K and 11L, 11M and 11N, and 11O and 11P, respectively, schematically depict cross-sectional views and a corresponding perspective views of exemplary field-expanding optical elements and/or field-orienting optical elements that may be included in a scan field expansion assembly;

Figure 1:
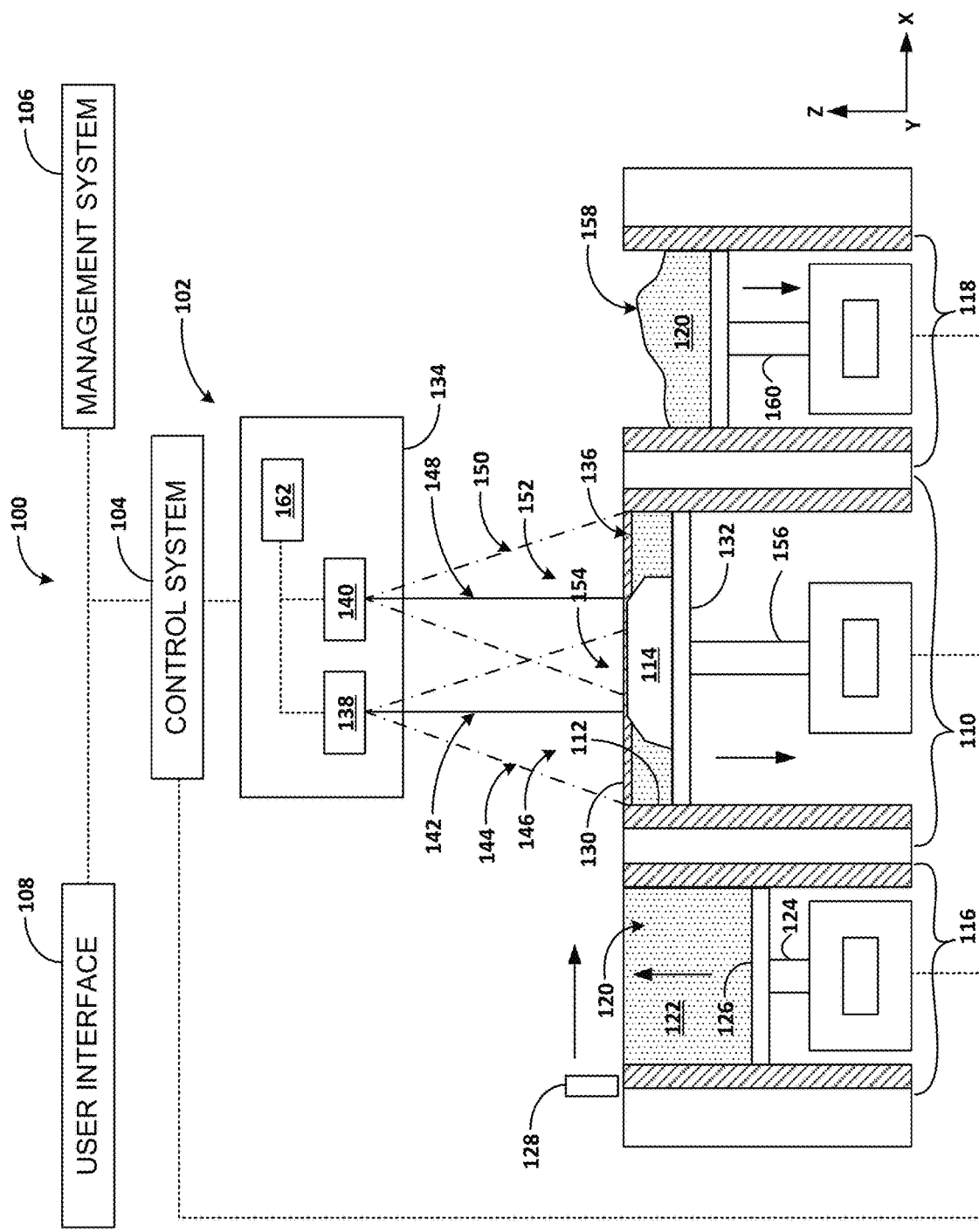
FIG. 1 schematically depicts an exemplary additive manufacturing system.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

The present disclosure generally provides energy beam systems and/or optical systems that have flat-field lenses with overlapping scan fields. The flat-field lenses may include or may be configured as a telecentric lens, however other flat-field lenses such as f-theta lenses and f-tan-theta lenses are also contemplated. A plurality of telecentric lenses may be positioned adjacent to one another, and a corresponding plurality of scan field expansion assemblies may be positioned behind respective ones of the plurality of telecentric lenses. The scan field expansion assemblies may respectively include one or more field-expanding optical elements, such as one or more lenses, field-expanding mirrors, and/or other optical elements, configured to expand a cross-sectional width and/or area of a nominal scan field. The expanded scan field corresponding to respective ones of the plurality of telecentric lenses may partially overlap one another. The partially overlapping expanded scan fields may close a gap that may otherwise be present between scan fields of adjacently disposed telecentric lenses.

The present disclosure advantageously provides for energy beam systems and/or optical systems that have a plurality of adjacent flat focal plane lenses, such as telecentric lenses. Relatively larger areas may be irradiated by a plurality of energy beams by providing energy beam systems and/or optical systems that include a plurality of optical assemblies and corresponding scan field expansion assemblies. Advantageously, the present disclosure includes embodiments that allow for relatively larger systems without requiring prohibitively large lens geometries. Additionally, or in the alternative, the present disclosure may provide embodiments that included a plurality of adjacently disposed flat-field lenses, such as telecentric lenses, with overlapping scan fields, including overlapping scan fields that maintain telecentricity.

The presently disclosed energy beam systems and/or optical systems may be utilized in connection with additive manufacturing systems or machines. However, embodiments pertaining to an additive manufacturing system or machine are not intended to be limiting. In fact, the presently disclosed energy beam systems and/or optical systems may be utilized in any field where a given embodiment may be suitable or desired. By way of example, in addition to additive manufacturing, the presently disclosed subject matter may be applicable to embodiments pertaining generally to lasers and other energy beams, beam generation devices, testing, measurement, and/or detection systems or devices that utilize energy beams, material processing systems or devices that utilize energy beams, imaging systems or devices that utilize energy beams, display systems or devices, fiber optics systems or devices, semiconductor manufacturing systems or devices, and so forth.

As used herein, the term "flat-field lens" refers to a plurality of lenses, which plurality may sometimes be referred to as a compound lens, that provides an effective focal length that coincided with a flat focal plane. The flat focal plane coinciding with the effective focal length of a flat-field lens may extend across substantially an entire scan field, such as at least 99% of the scan field, or such as at least 99.5% of the scan field. A flat-field lens may exhibit a slight curvature and/or distortion in the focal plane across the scan field, such as less than ±100 micrometers (µm), such as less than ±10 µm, or such as less than ±3 µm. In some embodiments, a flat-field lens may be configured as an f-tan-theta lens, an f-theta lens, or a telecentric lens.

As used herein, the term "scan field" refers to an area within which an optical lens, or an assembly of lenses, can be focused.

As used herein, the term "effective focal length" refers to a distance from a primary principal plane to a focal point of an optical lens or assembly of lenses.

As used herein, the term "f-theta lens" refers to a flat field lens configured to output an energy beam with a linear displacement along a flat focal plane proportional to the deflection angle, theta ($\theta_d$), of the energy beam entering the lens. For example, the linear displacement may correspond to a product of the effective focal length of the f-theta lens and the deflection angle ($\theta$). An f-theta lens may be configured to exhibit linear displacement in proportion to the deflection angle ($\theta$) across substantially the entire scan field, such as at least 99% of the scan field, or such as at least 99.5% of the scan field. An f-theta lens may exhibit a slight deviation from linear displacement in proportion to the deflection angle ($\theta$) across the scan field, such as less than ±1%, such as less than ±0.5%, or such as less than ±0.1%

As used herein, the term "f-tan-theta lens" refers to a flat field lens configured to output an energy beam with a nonlinear displacement along a flat focal plane proportional to the tangent of the deflection angle ($\theta$) of the energy beam entering the lens. An f-tan-theta lens may be configured to exhibit displacement in proportion to the tangent of the deflection angle ($\theta$) across substantially the entire scan field, such as at least 99% of the scan field, or such as at least 99.5% of the scan field. An f-tan-theta lens may exhibit a slight deviation from displacement in proportion to the tangent of the deflection angle ($\theta$) across the scan field, such as less than ±1%, such as less than ±0.5%, or such as less than ±0.1%

As used herein, the term "telecentric lens" refers to a flat field lens configured to output an energy beam having a principal ray that exhibits a telecentric orientation upon exiting the lens. A principal ray exhibits a telecentric orientation with respect to a telecentric lens when the principal ray has a substantially parallel orientation to the optical axis of the telecentric lens and/or a substantially perpendicular orientation to the flat focal plane of the telecentric lens. A telecentric lens may be configured to output an energy beam that exhibits a telecentric orientation across substantially the entire scan field, such as at least 99% of the scan field, or such as at least 99.5% of the scan field. A telecentric lens may output an energy beam that exhibits a slight deviation from a telecentric orientation, such as less than about 2 degrees, or such as less than about 1 degree, or such as less than about 0.5 degrees.

As described herein, exemplary embodiments of the present subject matter involve the use of additive manufacturing machines or systems. As used herein, the term "additive manufacturing" refers generally to manufacturing technology in which components are manufactured in a layer-by-layer manner. An exemplary additive manufacturing machine may be configured to utilize any desired additive manufacturing technology. In an exemplary embodiment, the additive manufacturing machine may utilize an additive manufacturing technology that includes a powder bed fusion (PBF) technology, such as a direct metal laser melting (DMLM) technology, an electron beam melting (EBM) technology, an electron beam sintering (EBS) technology, a selective laser melting (SLM) technology, a directed metal laser sintering (DMLS) technology, or a selective laser sintering (SLS) technology. In an exemplary PBF technology, thin layers of powder material are sequentially applied to a build plane and then selectively melted or fused to one another in a layer-by-layer manner to form one or more three-dimensional objects. Additively manufactured objects are generally monolithic in nature, and may have a variety of integral sub-components.

Additionally or alternatively suitable additive manufacturing technologies include, for example, Fused Deposition Modeling (FDM) technology, Direct Energy Deposition (DED) technology, Laser Engineered Net Shaping (LENS) technology, Laser Net Shape Manufacturing (LNSM) technology, Direct Metal Deposition (DMD) technology, Digital Light Processing (DLP) technology, Vat Polymerization (VP) technology, Sterolithography (SLA) technology, and other additive manufacturing technology that utilizes an energy beam.

Additive manufacturing technology may generally be described as enabling fabrication of complex objects by building objects point-by-point, layer-by-layer, typically in a vertical direction; however, other methods of fabrication are contemplated and within the scope of the present disclosure. For example, although the discussion herein refers to the addition of material to form successive layers, the presently disclosed subject matter may be practiced with any additive manufacturing technology or other manufacturing technology, including layer-additive processes, layer-subtractive processes, or hybrid processes.

The additive manufacturing processes described herein may be used for forming components using any suitable material. For example, the material may be metal, ceramic, polymer, epoxy, photopolymer resin, plastic, concrete, or any other suitable material that may be in solid, liquid, powder, sheet material, wire, or any other suitable form. Each successive layer may be, for example, between about 10 µm and 200 µm, although the thickness may be selected based on any number of parameters and may be any suitable size according to alternative embodiments.

As used herein, the term "build plane" refers to a plane defined by a surface upon which an energy beam impinges during an additive manufacturing process. Generally, the surface of a powder bed defines the build plane; however, during irradiation of a respective layer of the powder bed, a previously irradiated portion of the respective layer may define a portion of the build plane, and/or prior to distributing powder material across a build module, a build plate that supports the powder bed generally defines the build plane.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Exemplary embodiments of the present disclosure will now be described in further detail. FIG. 1 schematically depicts an exemplary additive manufacturing system 100. The additive manufacturing system 100 may include one or more additive manufacturing machines 102. The one or more additive manufacturing machines 102 may include a control system 104. The control system 104 may be included as part of the additive manufacturing machine 102 or the control system 104 may be associated with the additive manufacturing machine 102. The control system 104 may include one or more controllers, respectively including componentry integrated as part of the additive manufacturing machine 102 and/or componentry that is provided separately from the additive manufacturing machine 102. For example, the control system 104 may include a central control unit configured to coordinate a plurality of sub-control units respectively dedicated to specific systems or subsystems of the additive manufacturing machine 102 and/or the additive manufacturing system 100. Various componentry of the control system 104 may be communicatively coupled to various componentry of the additive manufacturing machine 102.

The control system 104 may be communicatively coupled with a management system 106 and/or a user interface 108. The management system 106 may be configured to interact with the control system 104 in connection with enterprise-level operations pertaining to the additive manufacturing system 100. Such enterprise level operations may include transmitting data from the management system 106 to the control system 104 and/or transmitting data from the control system 104 to the management system 106. The user interface 108 may include one or more user input/output devices to allow a user to interact with the additive manufacturing system 100.

As shown, an additive manufacturing machine 102 may include a build module 110 that includes a build chamber 112 within which an object or objects 114 may be additively manufactured. In some embodiments, an additive manufacturing machine 102 may include a powder module 116 and/or an overflow module 118. The build module 110, the powder module 116, and/or the overflow module 118 may be provided in the form of modular containers configured to be installed into and removed from the additive manufacturing machine 102 such as in an assembly-line process. Additionally, or in the alternative, the build module 110, the powder module 116, and/or the overflow module 118 may define a fixed componentry of the additive manufacturing machine 102.

The powder module 116 contains a supply of powder material 120 housed within a supply chamber 122. The powder module 116 includes a powder piston 124 that elevates a powder floor 126 during operation of the additive manufacturing machine 102. As the powder floor 126 elevates, a portion of the powder material 120 is forced out of the powder module 116. A recoater 128 such as a blade or roller sequentially distributes thin layers of powder material 120 across a build plane 130 above the build module 110. A build platform 132 supports the sequential layers of powder material 120 distributed across the build plane 130. In some embodiments, a build platform 132 may include a build plate (not shown) secured thereto and upon which an object 114 may be additively manufactured.

The additive manufacturing machine 102 includes an energy beam system 134 configured to generate a plurality of energy beams such as laser beams or electron beams, and to direct the respective energy beams onto the build plane 130 to selectively solidify respective portions of the powder bed 136 defining the build plane 130. As the respective energy beams selectively melt or fuse the sequential layers of powder material 120 that define the powder bed 136, the object 114 begins to take shape. Typically with a DMLM, EBM, or SLM system, the powder material 120 is fully melted, with respective layers being melted or re-melted with respective passes of the energy beams. Conversely, with DMLS or SLS systems, typically the layers of powder material 120 are sintered, fusing particles of powder material 120 to one another generally without reaching the melting point of the powder material 120. The energy beam system 134 may include componentry integrated as part of the additive manufacturing machine 102 and/or componentry that is provided separately from the additive manufacturing machine 102.

The energy beam system 134 may include one or more irradiation devices configured to generate a plurality of energy beams and to direct the energy beams upon the build plane 130. The irradiation devices may respectively have an energy beam source, a galvo-scanner, and optical componentry configured to direct the energy beam onto the build plane 130. For the embodiment shown in FIG. 1, the energy beam system 134 includes a first irradiation device 138 and a second irradiation device 140. In other embodiments, an energy beam system 134 may include three, four, six, eight, ten, or more irradiation devices. The plurality of irradiation devise may be configured to respectively generate one or more energy beams that are respectively scannable within a scan field incident upon at least a portion of the build plane 130. For example, the first irradiation device 138 may generate a first energy beam 142 that is scannable within a first scan field 144 incident upon at least a first build plane region 146. The second irradiation device 140 may generate a second energy beam 148 that is scannable within a second scan field 150 incident upon at least a second build plane region 152. The first scan field 144 and the second scan field 150 may overlap such that the first build plane region 146 scannable by the first energy beam 142 overlaps with the second build plane region 152 scannable by the second energy beam 148. The overlapping portion of the first build plane region 146 and the second build plane region 152 may sometimes be referred to as an interlace region 154. Portions of the powder bed 136 to be irradiated within the interlace region 154 may be irradiated by the first energy beam 142 and/or the second energy beam 148 in accordance with the present disclosure.

To irradiate a layer of the powder bed 136, the one or more irradiation devices (e.g., the first irradiation device 138 and the second irradiation device 140) respectively direct the plurality of energy beams (e.g., the first energy beam 142 and the second energy beam 148) across the respective portions of the build plane 130 (e.g., the first build plane region 146 and the second build plane region 152) to melt or fuse the portions of the powder material 120 that are to become part of the object 114. The first layer or series of layers of the powder bed 136 are typically melted or fused to the build platform 132, and then sequential layers of the powder bed 136 are melted or fused to one another to additively manufacture the object 114.

As sequential layers of the powder bed 136 are melted or fused to one another, a build piston 156 gradually lowers the build platform 132 to make room for the recoater 128 to distribute sequential layers of powder material 120. As the build piston 156 gradually lowers and sequential layers of powdered material 120 are applied across the build plane 130, the next sequential layer of power material 120 defines the surface of the powder bed 136 coinciding with the build plane 130. Sequential layers of the powder bed 136 may be selectively melted or fused until a completed object 114 has been additively manufactured.

In some embodiments, an additive manufacturing machine may utilize an overflow module 118 to capture excess powder material 120 in an overflow chamber 158. The overflow module 118 may include an overflow piston 160 that gradually lowers to make room within the overflow chamber 158 for additional excess powder material 120.

It will be appreciated that in some embodiments an additive manufacturing machine may not utilize a powder module 116 and/or an overflow module 118, and that other systems may be provided for handling powder material 120, including different powder supply systems and/or excess powder recapture systems. However, the subject matter of the present disclosure may be practiced with any suitable additive manufacturing machine without departing from the scope hereof.

Still referring to FIG. 1, in some embodiments, an additive manufacturing machine 102 may include an imaging system 162. The imaging system 162 may be configured to detect a monitoring beam (not shown) such as an infrared beam from a laser diode and/or a reflected portion of an energy beam (e.g., a first energy beam 142 and/or a second energy beam 148).

An energy beam system 134 and/or an imaging system 162 may include one or more detection devices (not shown). The one or more detection devices may be configured to determine one or more parameters associated with irradiating the sequential layers of the powder bed 136 based at least in part on the detected monitoring beam. One or more parameters associated with irradiating the sequential layers of the powder bed 136 may include irradiation parameters and/or object parameters, such as melt pool monitoring parameters. The one or more parameters determined by the imaging system 162 may be utilized, for example, by the control system 104, to control one or more operations of the additive manufacturing machine 102 and/or of the additive manufacturing system 100. The one or more detection devices may be configured to obtain image data of the build plane 130 from a respective monitoring beam (not shown). An exemplary detection device may include a camera, an image sensor, a photo diode assembly, or the like. For example, a detection device may include charge-coupled device (e.g., a CCD sensor), an active-pixel sensor (e.g., a CMOS sensor), a quanta image device (e.g., a QIS sensor), or the like. A detection device may additionally include a lens assembly configured to focus an monitoring beam along a beam path to the detection device. An imaging system 162 may include one or more imaging optical elements (not shown), such as mirrors, beam splitters, lenses, and the like, configured to direct an monitoring beam to a corresponding detection device.

In addition or in the alternative to determining parameters associated with irradiation the sequential layers of the powder bed 136, the imaging system 162 may be configured to perform one or more calibration operations associated with an additive manufacturing machine 102, such as a calibration operation associated with the energy beam system 134, one or more irradiation devices 138, 140 or components thereof, and/or the imaging system 162 or components thereof.

The imaging system 162 may be configured to project a monitoring beam (not shown) and to detect a portion of the monitoring beam reflected from the build plane 130. Additionally, and/or in the alternative, the imaging system 162 may be configured to detect a monitoring beam that includes radiation emitted from the build plane 130, such as radiation from an energy beam 142, 148 reflected from the powder bed 136 and/or radiation emitted from a melt pool in the powder bed 136 generated by an energy beam 142, 148 and/or radiation emitted from a portion of the powder bed 136 adjacent to the melt pool.

The imaging system 162 may include componentry integrated as part of the additive manufacturing machine 102 and/or componentry that is provided separately from the additive manufacturing machine 102. For example, the imaging system 162 may include componentry integrated as part of the energy beam system 134. Additionally, or in the alternative, the imaging system 162 may include separate componentry, such as in the form of an assembly, that can be installed as part of the energy beam system 134 and/or as part of the additive manufacturing machine 102.

Now turning to FIGS. 2A and 2B, exemplary energy beam systems 134 will be described. An energy beam system 134 may include one or more irradiation devices 200, such as a first irradiation device 138 and/or a second irradiation device 140 configured to generate one or more energy beams 202, such as a first energy beam 142 and/or a second energy beam 148. An energy beam system 134 may include an optical system 204 configured to direct the one or more energy beams onto a surface, such as a build plane 130. The energy beam system 134 and the optical system 204 may include various componentry that may be provided as a single unit or as a plurality of separate units. For example, the energy beam system 134 and the optical system 204 may be combined as a single unit. Additionally, or in the alternative, the energy beam system 134 and the optical system 204 may be provided as separate units. An energy beam system 134 and/or an optical system 204 may include a beam generation device 206, a scanner 208, and an optical assembly 210. Additionally, or in the alternative, the one or more irradiation devices 200 may include a beam generation device 206, a scanner 208, and/or an optical assembly 210. An exemplary energy beam system 134 and/or an optical system 204, and/or an exemplary irradiation device 200, may additionally or alternatively include one or more mirrors, beam splitters, lenses, and the like, configured, for example, to direct one or more energy beams 202 onto a surface, such as a build plane 130.

A beam generation device 206 may include any device configured to generate and/or emit an energy beam providing electromagnetic radiation such as a laser beam or an electron beam. An exemplary beam generation device 206 may include one or more lasers such as a laser diode array. The one or more lasers may be continuous wave lasers and/or pulsed lasers. A scanner 208 corresponding to a respective beam generation device 206 may be configured to control the orientation of the corresponding energy beam 202 so as to direct the path of the energy beam 202 across a build plane 130, such as a powder bed 136 and/or a build platform 132. A scanner 208 may be actuated, such as according to a control command from a control system 104, to change the deflection angle, theta ($\theta$), of the energy beam 202 incident upon the optical assembly 210. An exemplary scanner 208 may include a galvanometer or a polygon scanner. Additionally, or in the alternative, a beam generation device 206 may utilize phased array scanning, such as with one or more vertical-cavity surface-emitting lasers (VCSELs).

An exemplary optical assembly 210 may include one or more optical elements, located, for example, behind the scanner 208, that are configured to focus, project, displace, shape and/or filter the one or more energy beams 202 emitted from the beam generation device 206. In addition to an optical assembly 210, in some embodiments, an energy beam system 134, an optical system 204, and/or an irradiation device 200 may include a beam conditioner 212, configured to focus, collimate, expand, diffract, shape and/or filter the one or more energy beams 202 emitted from the beam generation device 206. For example, in some embodiments, the beam conditioner 212 may include a beam expander 214. The beam expander 214 may be configured to adjust a cross-sectional area of an energy beam 202 and/or an intensity profile of the energy beam 202.

The optical assembly 210 may include plurality of lenses 216. The plurality of lenses may be supported by a housing 218 that includes one or more housing components. The plurality of lenses 216 may be configured to focus, shape and/or filter the energy beam 202. The plurality of lenses 216 may include one or more converging lenses and/or one or more diverging lenses. By way of example, the plurality of lenses 216 may include concave, convex, and/or meniscus configurations. More particularly, the plurality of lenses 216 may include one or more converging lenses such as one or more biconvex lenses, one or more plano-convex lenses, and/or one or more converging meniscus lenses; and/or, the plurality of lenses 216 may include one or more diverging lenses such as one or more biconcave lenses, one or more plano-concave lenses, one or more diverging meniscus lenses. Additionally, or in the alternative, the plurality of lenses 216 may include one or more aspheric lenses, one or more myodisc lenses, one or more lenticular lenses, one or more multidrop lenses, one or more multifocal lenses, and/or one or more astigmatic lenses. Such aspheric, myodisc, lenticular, multidrop, multifocal, and/or astigmatic lenses, or at least a portion thereof, may have a concave, convex, and/or meniscus configuration. Additionally, or in the alternative, at least a portion of a concave, convex, and/or meniscus lens may include an aspheric, myodisc, lenticular, multidrop, multifocal, and/or astigmatic region. One or more of the lenses 216 in an optical assembly 210 may have a common optical axis, and/or one or more of the lenses 216 in the optical assembly 210 may have an optical axis that differs from one or more of the other lenses in the optical assembly 210.

The plurality of lenses 216 may have a flat focal plane 220. For example, the plurality of lenses 216 may include or may be configured as a flat-field lens, such as an f-theta lens, an f-tan-theta lens, and/or a telecentric lens. The flat focal plane 220 may coincide with the build plane 130 of an additive manufacturing machine 102. The plurality of lenses 216 in the optical assembly 210 shown in FIG. 2A depicts an f-theta lens 250. The plurality of lenses 216 in the optical assembly 210 shown in FIG. 2B depicts a telecentric lens 300.

Figure 2B:
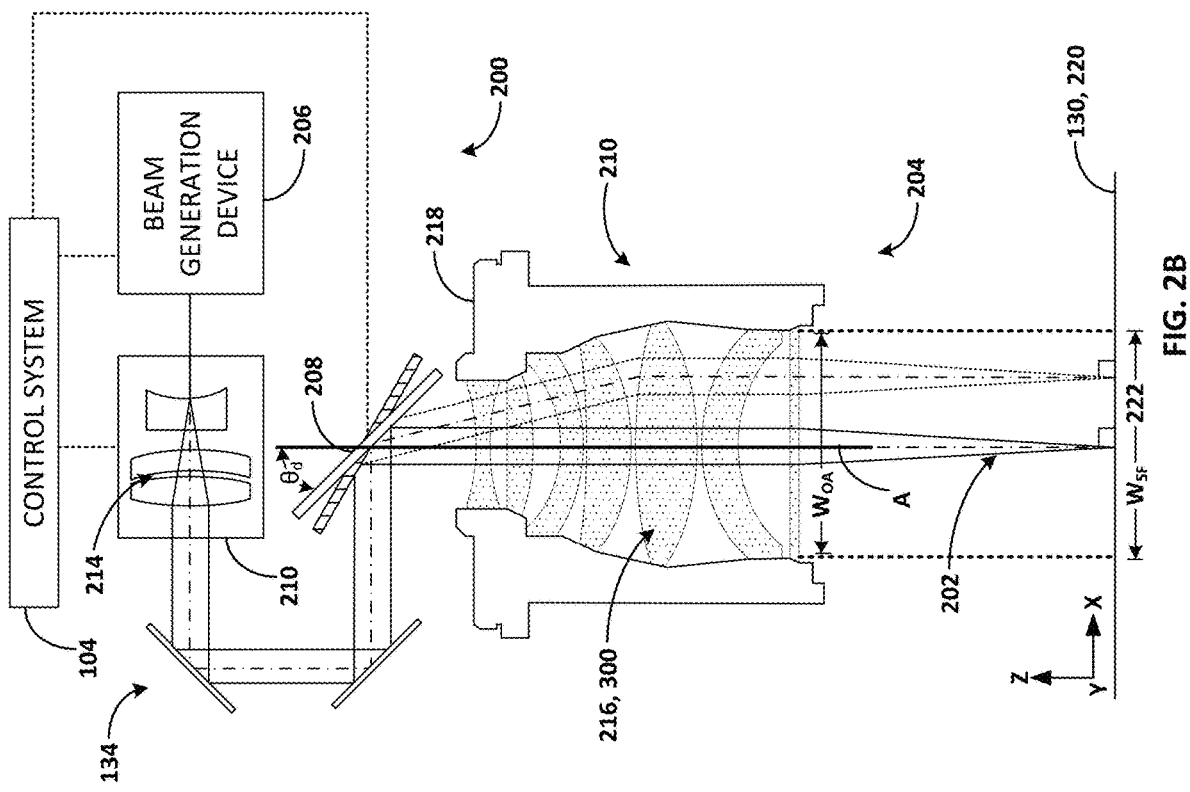
FIG. 2B schematically depicts a cross-sectional view of an exemplary energy beam system and/or optical system that has a telecentric optical element.
Figure 2A:
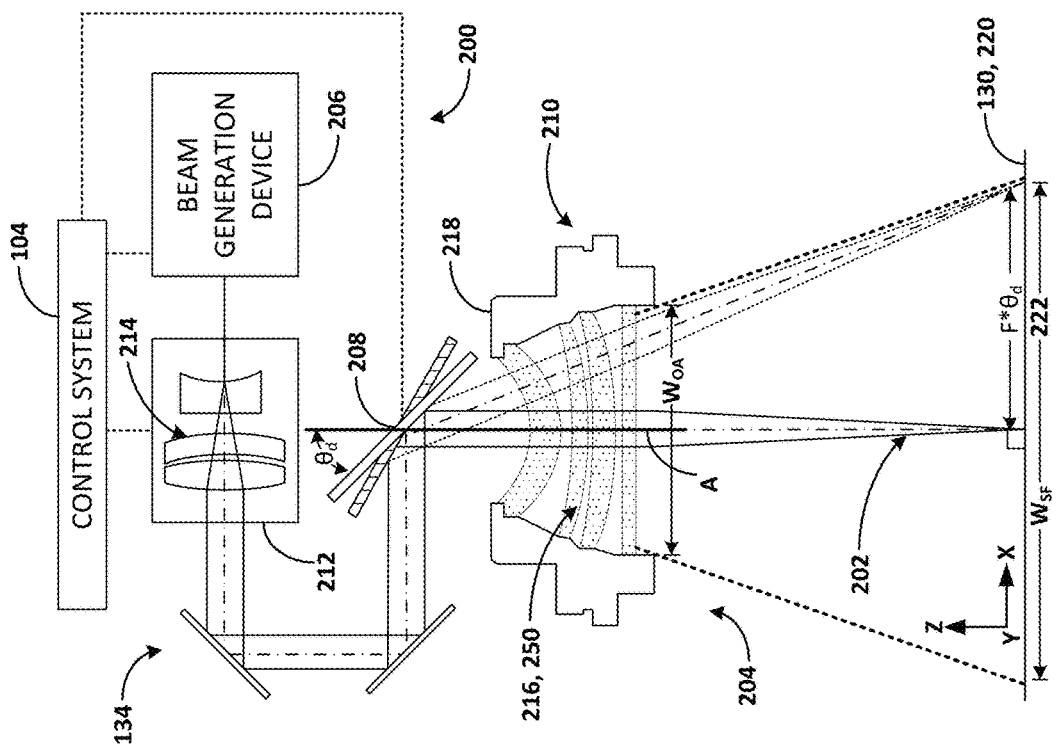
FIG. 2A schematically depicts a cross-sectional view of an exemplary energy beam system and/or optical system that has an f-theta optical element.

As shown in FIGS. 2A and 2B, a scanner 208 may be actuated, such as according to a control command from a control system 104, to change the deflection angle, theta ($\theta$), of the energy beam 202 incident upon the f-theta lens 250. With the f-theta lens 250 shown in FIG. 2A, an energy beam 202 entering the f-theta lens 250 parallel to the optical axis (A) of the f-theta lens 250 may exit the f-theta lens 250 parallel to the optical axis (A) and/or perpendicular to the focal plane 220. With the energy beam 202 entering the f-theta lens 250 at a deflection angle ($\theta$) oblique to the optical axis (A) of the f-theta lens 250, the energy beam 202 may exit the f-theta lens 250 with an angle of incidence upon the flat focal plane 220 that coincides to a linear displacement along the flat focal plane 220 that is proportional to the deflection angle ($\theta$), such as a linear displacement corresponding to a product of the effective focal length of the f-theta lens and the deflection angle ($\theta$). With the telecentric lens 300 shown in FIG. 2B, an energy beam 202 may exit the telecentric lens 300 parallel to the optical axis (A) and/or perpendicular to the focal plane 220, regardless of the deflection angle ($\theta$) of the energy beam 202 entering the telecentric lens 300.

An optical assembly 210, may have a nominal scan field 222. The nominal scan field 222 may have a cross-sectional width and/or area ($W_{SF}$) determined perpendicular to the optical axis (A). The optical assembly 210 and/or the housing 218 may have an internal cross-sectional width and/or area ($W_{OA}$) determined perpendicular to the optical axis (A). With an f-theta lens 250, as shown in FIG. 2A, the cross-sectional width and/or area of the nominal scan field 222 ($W_{SF}$) may exceed the internal cross-sectional width and/or area of the optical assembly 210 and/or housing 218 ($W_{OA}$). For example, a maximum range of linear displacement of an energy beam 202 along the focal plane of the f-theta lens 250 may exceed the corresponding width of the optical assembly 210 and/or the housing 218 of the f-theta lens 250 (e.g., $W_{OA}$). By contrast, with a telecentric lens 300, as shown in FIG. 2B, the cross-sectional width and/or area of the nominal scan field 222 ($W_{SF}$) may be smaller than the internal cross-sectional width and/or area of the optical assembly 210 and/or housing 218 ($W_{OA}$). For example, at least one of the plurality of lenses 216 that make up a telecentric lens 300 may have a cross-sectional width and/or area that that exceeds the cross-sectional width and/or area of the nominal scan field 222 ($W_{SF}$) that can be scanned by the telecentric lens 300.

Figure 3A:
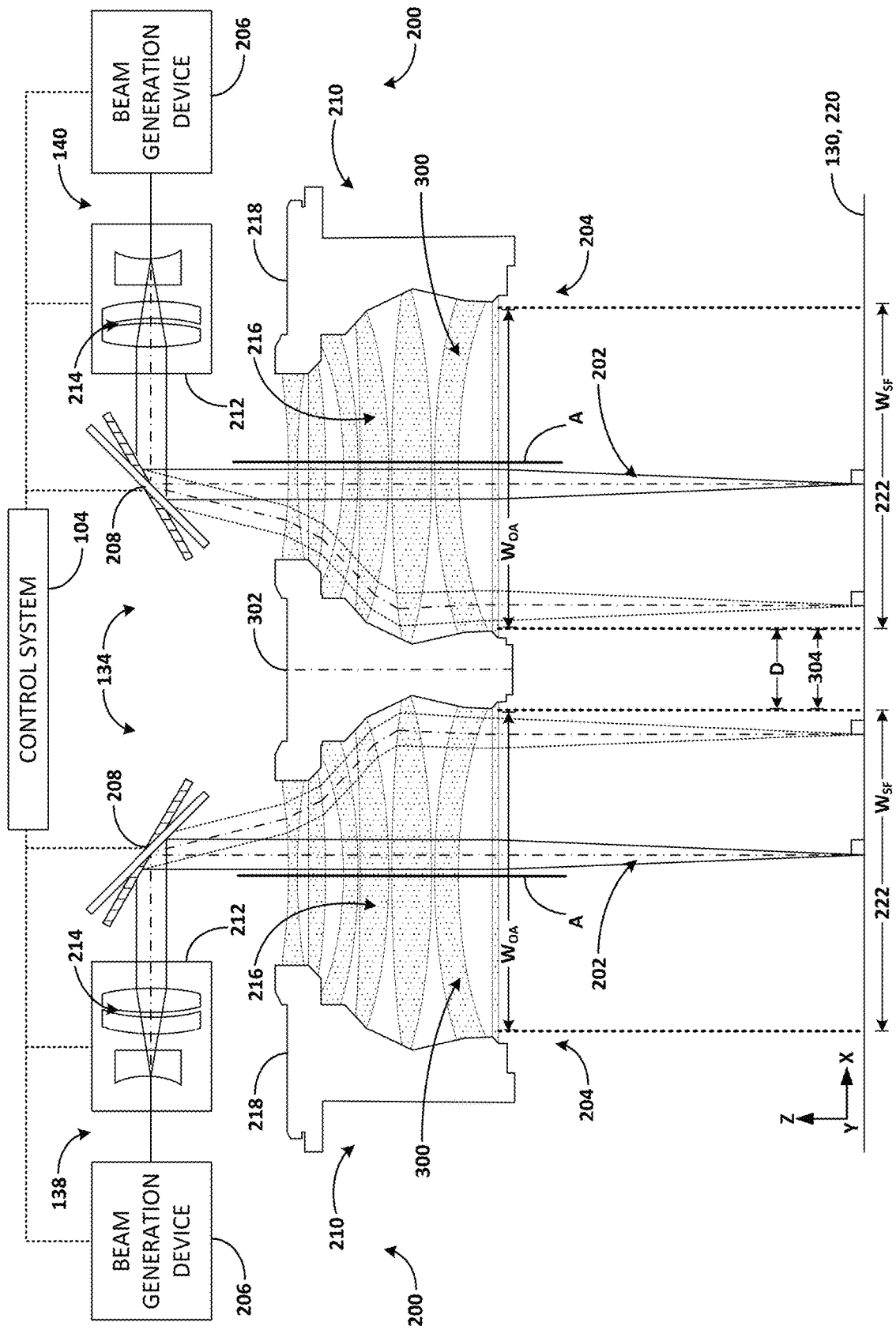
FIGS. 3A and 3B, respectively, schematically depict a cross-sectional view of an exemplary energy beam system and/or optical system that has a plurality of telecentric optical elements.
Figure 3B:
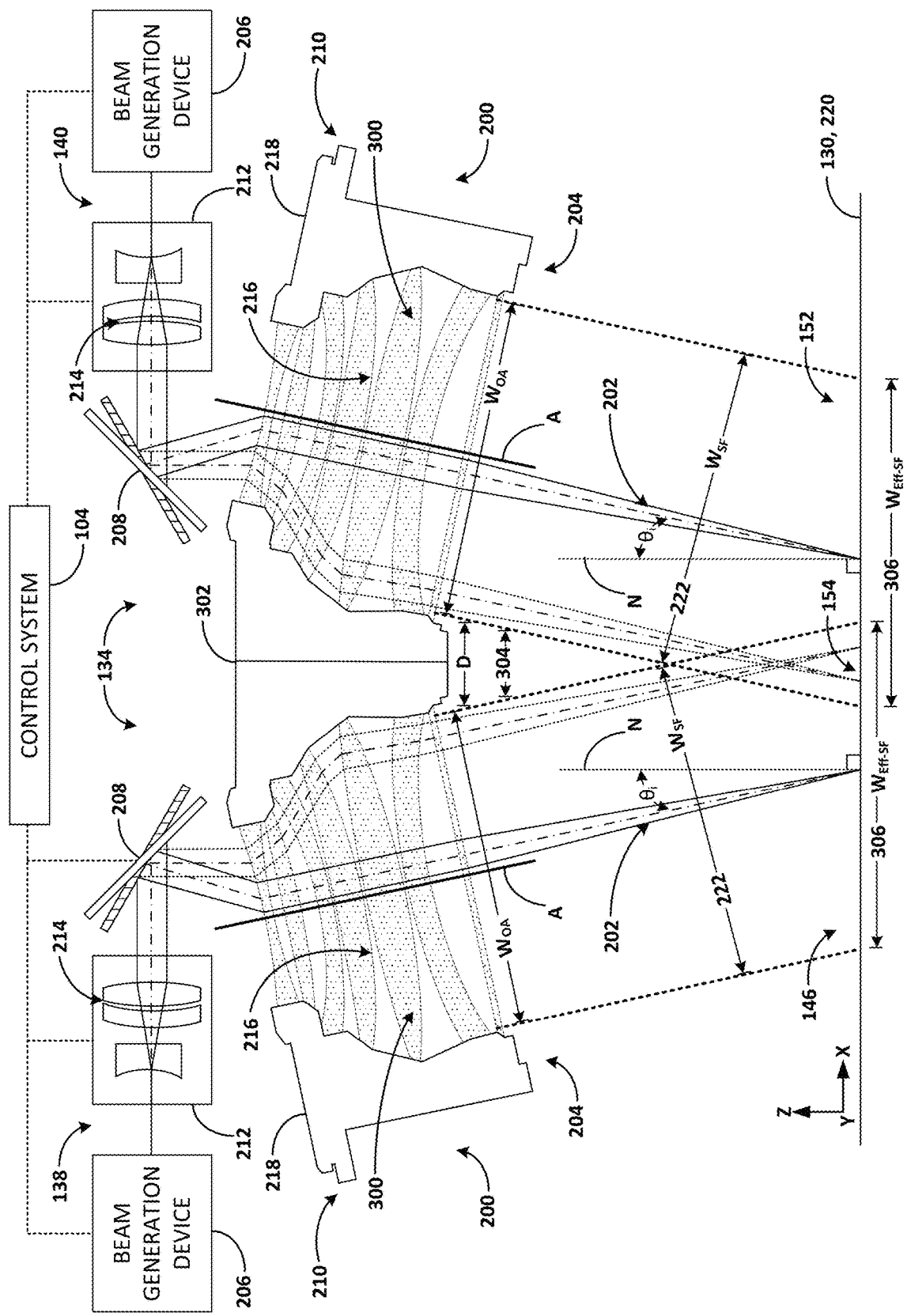

Referring now to FIGS. 3A and 3B, in some embodiments, an energy beam system 134 may include a plurality of optical assemblies 210. For example, a first irradiation device 138 may include a first one or more optical assemblies 210 and/or a second irradiation device 140 may include a second one or more optical assemblies 210. As shown in FIGS. 3A and 3B, the first irradiation device 138 includes a first optical assembly 210 and the second irradiation device 140 includes a second optical assembly 210. In some embodiments, however, the first irradiation device 138 may include a first plurality of optical assemblies 210 and/or the second irradiation device 140 may include a second plurality of optical assemblies 210.

Additionally, or in the alternative, an optical system 204 may include a plurality of optical assemblies 210. For example, as shown in FIGS. 3A and 3B, an energy beam system 134 may include a first optical system 204 and a second optical system 204. The first optical system 204 may correspond to the first irradiation device 138 and/or the second optical system 204 may correspond to the second irradiation device 140. As shown, the first optical system 204 includes a first optical assembly 210 and the second optical system 204 includes a second optical assembly 210. In some embodiments, however, the first optical system 204 may include a first plurality of optical assemblies 210 and/or the second optical system 204 may include a second plurality of optical assemblies 210.

As shown in FIGS. 3A and 3B, the first optical assembly 210 may include a first plurality of lenses 216 disposed within a first housing 218. The second optical assembly 210 may include a second plurality of lenses 216 disposed within the second housing 218. The first housing 218 and the second housing 218 may be disposed adjacent to one another. The first housing 218 and the second housing 218 may be formed as separate housings 218, or as a single housing 218 with first and second portions. For example, the first portion of the housing 218 may be configured to support the first plurality of lenses 216 corresponding to the first optical assembly 210 and/or the second portion of the housing 218 may be configured to support the second plurality of lenses 216 corresponding to the second optical assembly 210.

In some embodiments, the first optical assembly 210 and/or the second optical assembly 210 may include a plurality of lenses 216 configured as, or that includes, a telecentric lens 300. For example, as shown in FIGS. 3A and 3B, a first optical assembly 210 may be configured as or may include a first telecentric lens 300 and/or a second optical assembly 210 may be configured as or may include a second telecentric lens 300. Additionally, or in the alternative, the first optical system 204 may include a first plurality of telecentric lenses 300 and/or the second optical system 204 may include a second plurality of telecentric lenses 300. As shown in FIGS. 3A and 3B, the first telecentric lens 300 may be adjacent to the second telecentric lens 300.

A first energy beam 202 exiting the first telecentric lens 300 may exhibit a telecentric orientation relative to the optical axis (A) of the first telecentric lens 300. The first telecentric lens 300 may have a nominal scan field 222 with a cross-sectional width and/or area ($W_{SF}$) that is less than or equal to the internal cross-sectional width and/or area of the optical assembly 210 and/or housing 218 ($W_{OA}$) of the first telecentric lens 300. At least one of the plurality of lenses 216 that make up the first telecentric lens 300 may have a cross-sectional width and/or area that that exceeds the cross-sectional width and/or area of the nominal scan field 222 ($W_{SF}$) that can be scanned by the first telecentric lens 300. A second energy beam 202 exiting the second telecentric lens 300 may exhibit a telecentric orientation relative to the optical axis (A) of the second telecentric lens 300. The second telecentric lens 300 may have a nominal scan field 222 with a cross-sectional width and/or area ($W_{SF}$) that is less than or equal to the internal cross-sectional width and/or area of the optical assembly 210 and/or housing 218 ($W_{OA}$) of the second telecentric lens 300. At least one of the plurality of lenses 216 that make up the second telecentric lens 300 may have a cross-sectional width and/or area that that exceeds the cross-sectional width and/or area of the nominal scan field 222 ($W_{SF}$) that can be scanned by second telecentric lens 300.

As shown in FIG. 3A, the first telecentric lens 300 and the second telecentric lens 300 have respective scan fields 222 that are separated from one another by a lateral distance (D) determined perpendicular to the optical axis (A). The lateral distance (D) separating the respective scan fields 222 may be defined at least in part by the respective housing 218 that hold the plurality of lenses 216 that make up the respective telecentric lenses 300, 300. An intermediate housing 302 may be interposed between the first telecentric lens 300 and the second telecentric lens 300. For example, the intermediate housing 302 may be interposed between a first plurality of lenses 216 that make up the first telecentric lens 300 and a second plurality of lenses 216 that make up the second telecentric lens 300. The intermediate housing 302 may define a portion of a first housing 218 corresponding to the first telecentric lens 300 and/or a portion a second housing 218 corresponding to the second telecentric lens 300. Additionally, or in the alternative, the intermediate housing 302 may define a separate component interposed between the first and second housings 218. The lateral distance (D) may define a gap 304 between the respective scan fields 222.

In some embodiments, as shown in FIG. 3B, an energy beam system 134 and/or an optical system 204 may include a plurality of optical assemblies 210 with respective optical axis (A) oriented oblique to one another. One or more of the plurality of optical assemblies 210 may have an optical axis (A) oriented oblique to a normal line (N). The normal line may be perpendicular to the build plane 130. For example, the optical system 204 may include a plurality of telecentric lenses 300, such as a first telecentric lens 300 and a second telecentric lens 300, with respective optical axis (A) oriented oblique to one another and/or oblique to the normal line (N). An energy beam 202 exiting the respective telecentric lenses 300 may be oriented at an oblique angle of incidence ($\theta_i$) determined from the normal line (N). As shown in FIG. 3B, the orientation of the optical axis (A) one or more of the plurality of optical assemblies 210, such as the orientation of a first telecentric lens 300 and/or the orientation of a second telecentric lens 300, may be determined so as to eliminate any gap 304 between the respective scan fields 222 and/or such that the respective scan fields 222 intersect. For example, a first nominal scan field 222 corresponding to a first build plane region 146 may overlap with a second nominal scan field 222 corresponding to a second build plane region 152, with the overlapping portion providing an interlace region 154. In some embodiments, the optical axis (A) of the respective optical assemblies 210, such as the respective telecentric lenses 300, may be oriented at an oblique angle determined relative to the normal line (N) of from less than about 10 degrees, such as less than about 5 degrees, or such as less than about 3 degrees. An energy beam 202 exiting such an obliquely oriented optical assembly, such as an obliquely oriented telecentric lens 300, may be oriented at an angle of incidence ($\theta_i$), determined relative to the normal line (N), of less than about 10 degrees, such as less than about 5 degrees, or such as less than about 3 degrees.

As shown in FIG. 3B, even with an optical axis (A) oriented at an oblique angle relative to the normal line (N), and/or with an energy beam 202 having an oblique angle of incidence ($\theta_i$) relative to the normal line (N), the plurality of lenses 216 that make up an optical assembly 210 may be configured to provide a flat focal plane 220 that is perpendicular to the normal line (N). For example, the flat focal plane 220 may be parallel to, and coincide with, a build plane 130. By way of illustration, a telecentric lens 300 may include one or more lenses 216 configured to provide a flat focal plane 220 perpendicular to the normal line (N) when the optical axis (A) of the telecentric lens 300 has an oblique orientation relative to the normal line (N), including a flat focal plane 220 parallel to, and coinciding with, a build plane 130.

As shown in FIG. 3B, a flat focal plane 220 provided by an optical assembly 210 with an optical axis (A) oriented at an oblique angle relative to the normal line (N), and/or with an energy beam 202 having an oblique angle of incidence ($\theta_i$) relative to the normal line (N), may have an effective scan field 306 with a cross-sectional width and/or area ($W_{Eff\text{-}SF}$) determined parallel to the flat focal plane 220 and/or perpendicular to the normal line (N) that exceeds the corresponding cross-sectional width and/or area of the nominal scan field 222 ($W_{SF}$) determined perpendicular to the optical axis (A). As such, for a nominal scan field 222 with a given cross-sectional width and/or area ($W_{SF}$) determined perpendicular to the optical axis (A), an optical assembly 210 with an optical axis oriented oblique to the optical axis (A) may be configured to direct an energy beam 202 across a relatively larger flat focal plane 220, such as a relatively larger portion of a build plane 130, as compared to an optical assembly 210 with an optical axis (A) oriented perpendicular to the flat focal plane 220.

In some embodiments, an optical assembly 210 configured as a flat-field lens, such as a telecentric lens 300, may include one or more lenses 216 that provide a flat focal plane 220 in which an energy beam 202 exiting the optical assembly 210 has an effective focal length that depends on the linear displacement of the energy beam 202 relative to the optical axis (A) of the optical assembly 210. The relationship between the linear displacement of the energy beam 202 exiting the optical assembly 210 and the effective focal length of the energy beam 202 may be coordinated with a selected oblique angle of incidence ($\theta_i$) for the optical axis (A) of the optical assembly 210 relative to the normal line (N). With such an optical assembly 210 oriented at the selected oblique angle of incidence ($\theta_i$), the flat focal plane 220 may be perpendicular to the normal line (N), including parallel to, and coinciding with, a build plane 130.

Additionally, or in the alternative, in some embodiments, a beam conditioner 212 may be configured to adjust an effective focal length of an energy beam 202 exiting an optical assembly 210. For example, the beam conditioner 212 may include one or more optical elements, such as one or more lenses and/or one or more curved mirrors, that may be configured to augment an effective focal length of an energy beam 202 exiting an optical assembly 210 at least in part by changing a relative location of such one or more optical elements and/or a relative distance between a plurality of such optical elements. In some embodiments, a beam expander 214 may be configured to augment the focal length of an energy beam 202 exiting an optical assembly 210. The effective focal of the energy beam 202 may be augmented by the beam conditioner 212 such that an energy beam 202 exiting the optical assembly 210 has an effective focal length that depends on the linear displacement of the energy beam 202 relative to the optical axis (A) of the optical assembly 210. For example, the beam conditioner 212, working individually or in concert with one or more optical elements of the optical system 204 and/or optical assembly 210, may provide a flat focal plane 220 with the effective focal length of the energy beam 202 coordinated with a selected oblique angle of incidence ($\theta_i$) for the optical axis (A) of the optical assembly 210 relative to the normal line (N). With the optical assembly 210 oriented at the selected oblique angle of incidence ($\theta_i$), the flat focal plane 220 provided by the beam conditioner 212 may be perpendicular to the normal line (N), including parallel to, and coinciding with, a build plane 130.

In addition or in the alternative to augmenting the effective focal length of an energy beam 202, a beam conditioner 212 may be configured to augment a spot size, spot shape, power density, and/or power density profile, of an energy beam 202 exiting the optical assembly 210. For example, the beam conditioner 212 may include one or more optical elements, such as one or more lenses curved mirrors, diffractive elements, beam transformers, and/or the like, configured to augment a spot size, spot shape, power density, and/or power density profile, of an energy beam 202 exiting the optical assembly 210. In some embodiments, a beam conditioner 212 may include a beam expander 214 configured to augment a spot size, spot shape, power density, and/or power density profile, of an energy beam 202 exiting the optical assembly 210.

The energy beam 202 may be augmented by the beam conditioner 212 such that an energy beam 202 exiting the optical assembly 210 has a spot size, spot shape, power density, and/or power density profile that depends on the linear displacement of the energy beam 202 relative to the optical axis (A) of the optical assembly 210. For example, the beam conditioner 212, working individually or in concert with one or more optical elements of the optical system 204 and/or optical assembly 210, may provide an energy beam 202 with a spot size, spot shape, power density, and/or power density profile coordinated with a selected oblique angle of incidence ($\theta_i$) for the optical axis (A) of the optical assembly 210 relative to the normal line (N). With the optical assembly 210 oriented at the selected oblique angle of incidence ($\theta_i$), the spot size, spot shape, power density, and/or power density profile of the energy beam 202 may be substantially uniform across the cross-sectional width and/or area of the effective scan field 306 ($W_{Eff-SF}$), such as across the portion of the build plane 130 coinciding with the effective scan field 306.

Figure 4A:
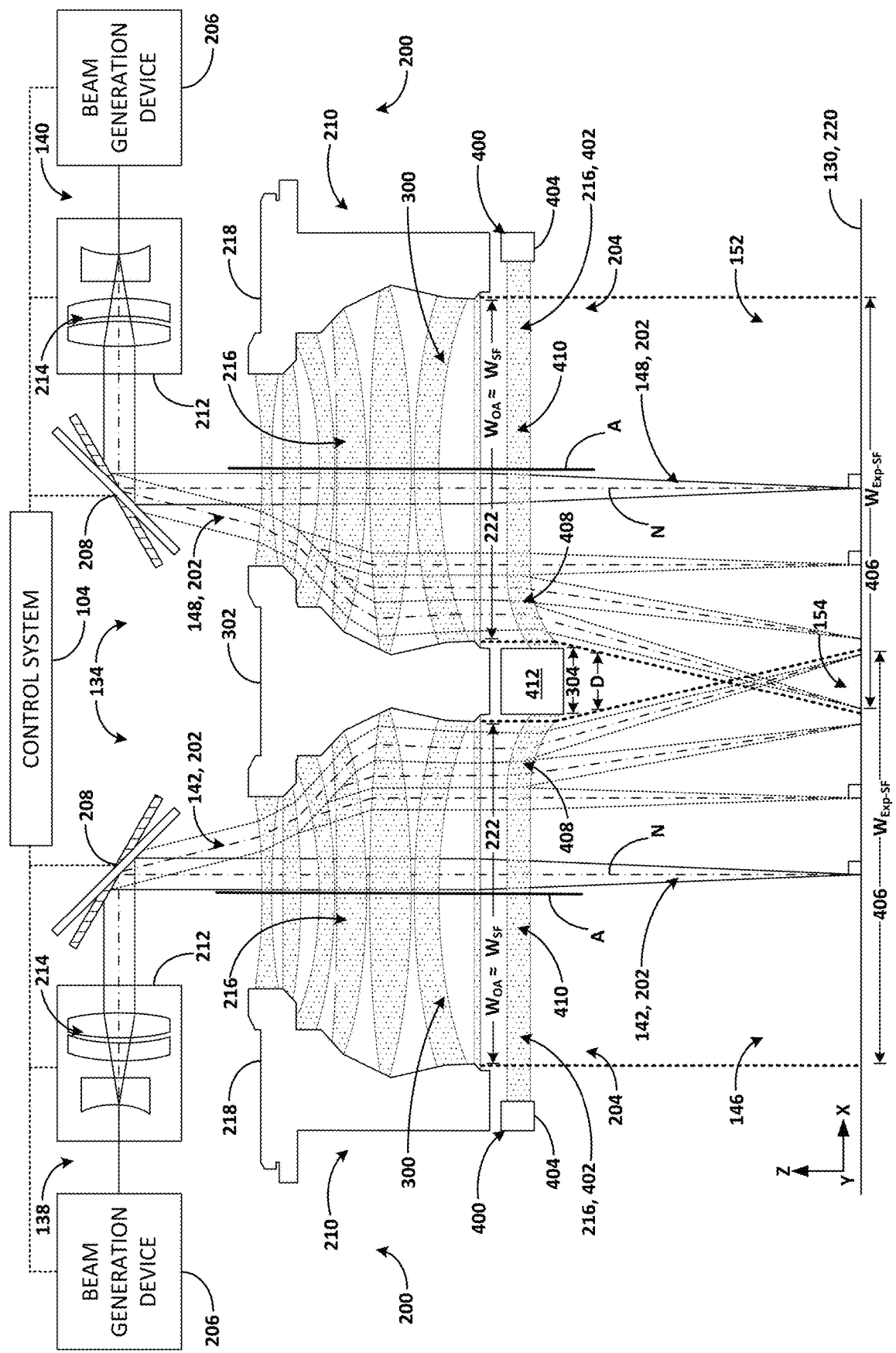
FIGS. 4A and 4B schematically depict a cross-sectional view of an exemplary energy beam system and/or optical system that includes a scan field expansion assembly.
Figure 4B:
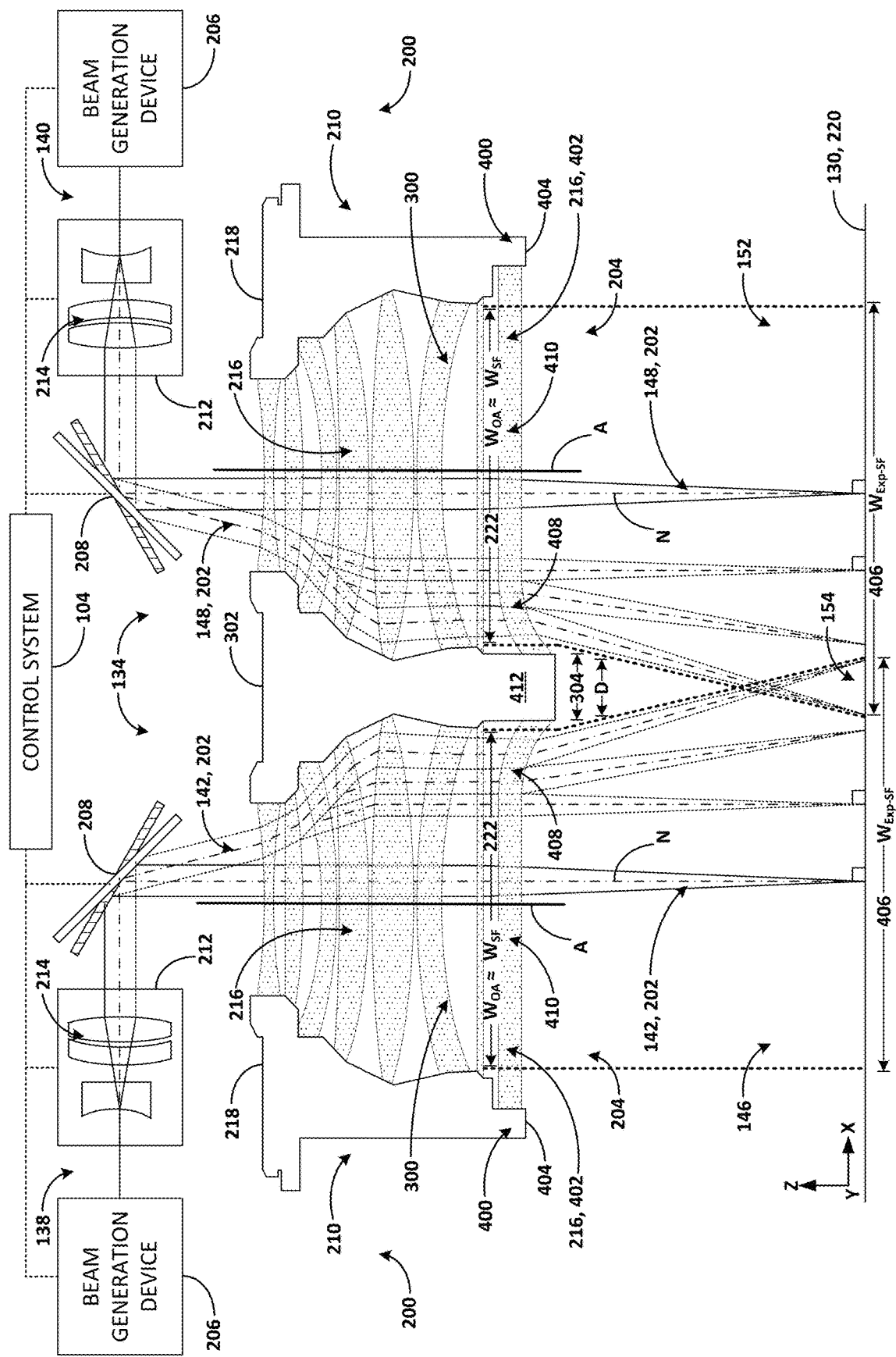

Referring now to FIGS. 4A and 4B, in some embodiments, an energy beam system 134 may include one or more scan field expansion assemblies 400.

Additionally, or in the alternative, an optical system 204 and/or an optical assembly 210 may include one or more scan field expansion assemblies 400. For example, a first irradiation device 138 and/or a first optical system 204 may include a first one or more optical assemblies 210 that includes a first one or more scan field expansion assemblies 400. Additionally, or in the alternative, a second irradiation device 140 and/or a second optical system 204 may include a second one or more optical assemblies 210 that includes a second one or more scan field expansion assemblies 400. A scan field expansion assembly 400 may include one or more field-expanding optical elements 402, such as one or more lenses 216 or other optical elements. The one or more field-expanding optical elements 402 may be supported by a field-expansion housing 404 that includes one or more housing components.

The one or more field-expanding optical elements 402 of the scan field expansion assembly 400, such as one or more lenses 216 or other optical elements thereof, may be configured to expand the nominal scan field 222 of the optical assembly 210 in at least one direction. For example, the nominal scan field 222 may be expanded in at least one direction relative to the focal plane 220 of the optical assembly 210 corresponding to the scan field expansion assembly 400. Additionally, or in the alternative, the nominal scan field 222 may be expanded in at least one direction perpendicular to an optical axis (A) of the optical assembly 210 disposed in front of the one or more field-expanding optical elements 402 of the scan field expansion assembly 400. The scan field expansion assembly 400 may expand a nominal scan field 222 of the optical assembly 210 from an initial cross-sectional width and/or area ($W_{SF}$) of the nominal scan field 222 to an expanded scan field 406 at the focal plane 220 corresponding to the optical assembly 210. The expanded scan field 406 may have a cross-sectional width and/or area ($W_{Exp-SF}$) that exceeds the corresponding initial cross-sectional width and/or area ($W_{SF}$) of the nominal scan field 222. The cross-sectional width and/or area of the expanded scan field 406 ($W_{Exp-SF}$) may exceed the internal cross-sectional width and/or area of the optical assembly 210 and/or housing 218 ($W_{OA}$). In some embodiments, an optical assembly 210 may include or may be configured as a telecentric lens 300, and the scan field expansion assembly 400 may expand the cross-sectional width and/or area of a nominal scan field 222 for the telecentric lens 300 in at least one direction perpendicular to an optical axis (A) of the telecentric lens 300. The expanded scan field 406 of a telecentric lens 300 provided by a scan field expansion assembly 400 may have an expanded cross-sectional width and/or area ($W_{Exp-SF}$) that exceeds the corresponding cross-sectional width and/or area ($W_{OA}$) of the optical assembly 210 and/or the housing 218 of the telecentric lens 300. Additionally, or in the alternative, an optical assembly 210 may include one or more lenses 216 configured as or including a flat-field lens, an f-theta lens 250, and/or an f-tan-theta lens, and the scan field expansion assembly 400 may expand the cross-sectional width and/or area of a nominal scan field 222 for such one or more lenses 216 in at least one direction perpendicular to an optical axis (A) of such one or more lenses 216.

In some embodiments, one or more field-expanding optical elements 402 of a scan field expansion assembly 400 may include a field-expansion region 408 configured to expand the portion of the nominal scan field 222 corresponding to an energy beam 202 passing through the field-expansion region 408. The field-expansion region 408 may impart a deviation from telecentricity with respect to a corresponding portion of an optical assembly 210, and/or one or more lenses 216 thereof, disposed in front of the field-expansion region 408. The field-expansion region 408 may encompass all or a portion of a respective one of the one or more field-expanding optical elements 402. For example, a field-expanding optical element 402 may include a telecentric region 410 and a field-expansion region 408. In some embodiments, a field-expansion region 408 may be located about a portion of a field-expanding optical element 402 that is proximal and/or adjacent to an intermediate housing 302 and/or adjacent to another optical assembly 210. For example, a field-expansion region 408 of a field-expanding optical element 402 may include at least a portion of a perimeter region of the field-expanding optical element 402. Additionally, or in the alternative, a telecentric region 410 may be located about a radially inward portion of a field-expanding optical element 402 and/or about a portion of a field-expanding optical element 402 that is distal to an intermediate housing 302 and/or adjacent to another optical assembly 210.

The telecentric region 410 of a field-expanding optical element 402 may exhibit telecentricity. An energy beam 202 may enter and/or exit a telecentric region 410 oriented parallel to the optical axis (A) of the field expansion assembly 400, the optical assembly 210, and/or one or more lenses 216 thereof. However, other beam angles are also contemplated. An energy beam 202 may enter a field-expansion region 408 oriented parallel to the optical axis (A) of the field expansion assembly 400, the optical assembly 210, and/or one or more lenses 216 thereof. However, other beam angles are also contemplated. An energy beam 202 exiting the field-expansion region 408 of a field-expanding optical element 402 may follow a diverging beam path, such as with an oblique orientation relative to the optical axis (A) of the field expansion assembly 400, the optical assembly 210, and/or one or more lenses 216 thereof.

The field-expansion region 408 of a field-expanding optical element 402 may include one or more aspects configured to provide a diverging beam path, such as one or more biconcave aspects, one or more plano-concave aspects, and/or one or more diverging meniscus aspects. The telecentric region 410 of a field-expanding optical element 402 may exhibit only a slight beam deflection, if any, for example, to sustain the telecentricity of a corresponding region of an optical assembly 210 and/or one or more lenses 216 thereof. Additionally, or in the alternative, the telecentric region 410 may include one or more aspects configured to deflect an energy beam 202 passing therethrough to an orientation parallel to an optical axis (A) of the field expansion assembly 400, the optical assembly 210, and/or one or more lenses 216 thereof, such as one or more converging lens aspects and/or one or more diverging lens aspects, including one or more concave, convex, and/or meniscus aspects.

Additionally, or in the alternative, a field-expanding optical element 402 may include or may be configured as an aspheric lens, a myodisc lens, a lenticular lens, a multidrop lens, a multifocal lens, and/or an astigmatic lens. Such aspheric, myodisc, lenticular, multidrop, multifocal, and/or astigmatic lens, or at least a portion thereof, may have a concave, convex, and/or meniscus configuration. Additionally, or in the alternative, at least a portion of a concave, convex, and/or meniscus lens may include an aspheric, myodisc, lenticular, multidrop, multifocal, and/or astigmatic region. Such aspheric, myodisc, lenticular, multidrop, multifocal, and/or astigmatic lens, or at least a portion thereof, may include a field-expansion region 408 with one or more aspects configured to provide a diverging beam path. Such aspheric, myodisc, lenticular, multidrop, multifocal, and/or astigmatic lens, or at least a portion thereof, may include a field-expansion region 408 and/or a telecentric region 410.

As shown in FIGS. 4A and 4B, an energy beam system 134 and/or an optical system 204 may include a plurality of optical assemblies 210 and a corresponding plurality of scan field expansion assemblies 400. For example, as shown, an energy beam system 134 and/or an optical system 204 may include a first optical assembly 210 and a first scan field expansion assembly 400 corresponding to the first optical assembly 210, and/or a second optical assembly 210 and a second scan field expansion assembly 400 corresponding to the second optical assembly 210. The first optical assembly 210 and/or the second optical assembly 210, respectively, may include or may be configured as a telecentric lens 300. The first telecentric lens 300 may be adjacent to the second telecentric lens 300. The first scan field expansion assembly 400 may be adjacent to the second scan field expansion assembly 400.

The first scan field expansion assembly 400 may include a first one or more field-expanding optical elements 402 supported by a first field-expansion housing 404. The second scan field expansion assembly 400 may include a second one or more field-expanding optical elements 402 supported by the second field-expansion housing 404. The first field-expansion housing 404 and the second field-expansion housing 404 may be disposed adjacent to one another. The first one or more field-expanding optical elements 402 may include a field-expansion region 408 adjacent and/or proximal to the second scan field expansion assembly 400, and/or the second one or more field-expanding optical elements 402 may include a field-expansion region 408 adjacent and/or proximal to the first scan field expansion assembly 400. Additionally, or in the alternative, the first one or more field-expanding optical elements 402 may include a telecentric region 410 located about a radially inward portion of the respective field-expanding optical element 402 and/or located distal to the second scan field expansion assembly 400. The second one or more field-expanding optical elements 402 may include a telecentric region 410 located about a radially inward portion of the respective field-expanding optical element 402 and/or located distal to the first scan field expansion assembly 400.

The first field-expansion housing 404 and the second field-expansion housing 404 may be formed as separate field-expansion housing 404, or as a single field-expansion housing 404 with first and second portions. For example, the first portion of the field-expansion housing 404 may be configured to support the first one or more field-expanding optical elements 402 corresponding to the first scan field expansion assembly 400 and/or the second portion of the field-expansion housing 404 may be configured to support the second one or more field-expanding optical elements 402 corresponding to the second scan field expansion assembly 400.

As shown in FIG. 4A, an energy beam system 134 and/or an optical system 204 may include a first optical assembly 210 configured as or including a first telecentric lens 300, with a first scan field expansion assembly 400 disposed behind the first telecentric lens 300. The energy beam system 134 and/or an optical system 204 may additionally include a second optical assembly 210 configured as or including a second telecentric lens 300, with a second scan field expansion assembly 400 disposed behind the second telecentric lens 300. As shown in FIG. 4A, a scan field expansion assembly 400 may be provided as a separate component from a corresponding optical assembly 210. For example, the field-expansion housing 404 (and/or one or more housing components thereof) may be separate from the housing 218 (and/or one or more housing components thereof) that supports the plurality of lenses 216 that make up the corresponding optical assembly 210, such as or including a telecentric lens 300.

As shown in FIG. 4B, an energy beam system 134 and/or an optical system 204 may include a first optical assembly 210 that includes a first telecentric lens 300 and a first scan field expansion assembly 400 disposed behind the first telecentric lens 300. The energy beam system 134 and/or an optical system 204 may additionally include a second optical assembly 210 that includes a second telecentric lens 300 and a second scan field expansion assembly 400 disposed behind the second telecentric lens 300. As shown in FIG. 4B, a scan field expansion assembly 400 may be integrated with a corresponding optical assembly 210 in a common component, and/or a scan field expansion assembly 400 may define a portion of an corresponding optical assembly 210. For example, the field-expansion housing 404 (and/or one or more housing components thereof) may define a portion of the housing 218 (and/or one or more housing components thereof) that supports the plurality of lenses 216 that make up the optical assembly 210.

Referring still to FIGS. 4A and 4B, a first energy beam 202 exiting the first telecentric lens 300 may exhibit a telecentric orientation relative to the optical axis (A) of the first telecentric lens 300. The first telecentric lens 300 may have a nominal scan field 222 with a cross-sectional width and/or area ($W_{SF}$) that is less than or equal to, e.g., approximately equal to, the internal cross-sectional width and/or area of the optical assembly 210 and/or housing 218 ($W_{OA}$) of the first telecentric lens 300. At least one of the plurality of lenses 216 that make up the first telecentric lens 300 may have a cross-sectional width and/or area that that exceeds the cross-sectional width and/or area of the nominal scan field 222 ($W_{SF}$) that can be scanned by the first telecentric lens 300. The first scan field expansion assembly 400 may expand the nominal scan field 222 of the first optical assembly 210 from an initial cross-sectional width and/or area ($W_{SF}$) to an expanded scan field 406 at the focal plane 220 corresponding to the first optical assembly 210. The expanded scan field 406 may have a cross-sectional width and/or area ($W_{Exp-SF}$) that exceeds the corresponding initial cross-sectional width and/or area ($W_{SF}$) of the nominal scan field 222 and/or that exceeds the corresponding internal cross-sectional width and/or area of the first optical assembly 210 and/or housing 218 ($W_{OA}$) of the first telecentric lens 300.

A second energy beam 202 exiting the second telecentric lens 300 may exhibit a telecentric orientation relative to the optical axis (A) of the second telecentric lens 300. The second telecentric lens 300 may have a nominal scan field 222 with a cross-sectional width and/or area ($W_{SF}$) that is less than or equal to, e.g., approximately equal to, the internal cross-sectional width and/or area of the optical assembly 210 and/or housing 218 ($W_{OA}$) of the second telecentric lens 300. At least one of the plurality of lenses 216 that make up the second telecentric lens 300 may have a cross-sectional width and/or area that that exceeds the cross-sectional width and/or area of the nominal scan field 222 ($W_{SF}$) that can be scanned by second telecentric lens 300. The second scan field expansion assembly 400 may expand the nominal scan field 222 of the second optical assembly 210 from an initial cross-sectional width and/or area ($W_{SF}$) to an expanded scan field 406 at the focal plane 220 corresponding to the second optical assembly 210. The expanded scan field 406 may have a cross-sectional width and/or area ($W_{Exp-SF}$) that exceeds the corresponding initial cross-sectional width and/or area ($W_{SF}$) of the nominal scan field 222 and/or that exceeds the corresponding internal cross-sectional width and/or area of the second optical assembly 210 and/or housing 218 ($W_{OA}$) of the second telecentric lens 300.

An intermediate field-expansion housing 412 may be interposed between the first scan field expansion assembly 400 and the second scan field expansion assembly 400. For example, the intermediate field-expansion housing 412 may be interposed between a first one or more field-expanding optical elements 402 of the first scan field expansion assembly 400 and a second one or more field-expanding optical elements 402 of the second scan field expansion assembly 400. The first one or more field-expanding optical elements 402 may include a field-expansion region 408 located adjacent and/or proximal to the intermediate field-expansion housing 412, and/or a telecentric region 410 located distal to the intermediate field-expansion housing 412. The second one or more field-expanding optical elements 402 may include a field-expansion region 408 located adjacent and/or proximal to the intermediate field-expansion housing 412, and/or a telecentric region 410 located distal to the intermediate field-expansion housing 412.

The intermediate field-expansion housing 412 may define a portion of a first field-expansion housing 404 corresponding to the first scan field expansion assembly 400 and/or a portion a second field-expansion housing 404 corresponding to the second scan field expansion assembly 400. Additionally, or in the alternative, the intermediate field-expansion housing 412 may define a separate component interposed between the first and second field-expansion housing 412. The lateral distance (D) may define a gap 304 between the respective scan fields 222. However, the respective expanded scan fields 406 may overlap, closing the gap 304 at least at the focal plane 220. The overlapping scan fields 406 may provide an interlace region 154. For example, a first expanded scan field 406 corresponding to a first build plane region 146 may overlap with a second expanded scan field 406 corresponding to a second build plane region 152, with the overlapping portion providing an interlace region 154.

In some embodiments, an energy beam 202 exiting a scan field expansion assembly 400, and/or one or more field-expanding optical elements 402 thereof, may exhibit a slight deviation from a telecentric orientation. The deviation from telecentric orientation may provide an energy beam 202 oriented at an angle of incidence ($\theta_i$) sufficient to provide an expanded scan field 406 with a cross-sectional width and/or area ($W_{Exp-SF}$) that intersects and/or overlaps with an expanded scan field 406 corresponding to another energy beam 202 exiting an adjacent scan field expansion assembly 400. For example, a first energy beam 202 exiting a first scan field expansion assembly 400 may be oriented at an angle of incidence ($\theta_i$) sufficient to provide a first expanded scan field 406 with a cross-sectional width and/or area ($W_{Exp-SF}$) that intersects and/or overlaps with a second expanded scan field 406 corresponding to a second energy beam 202 exiting a second scan field expansion assembly 400. With the first energy beam 202 exhibiting a slight deviation from telecentricity, the second energy beam 202 may have a telecentric orientation and/or the second energy beam 202 may exhibit a slight deviation from telecentricity. Additionally, or in the alternative, the second energy beam 202 exiting the second scan field expansion assembly 400 may be oriented at an angle of incidence ($\theta_i$) sufficient to provide a second expanded scan field 406 with a cross-sectional width and/or area ($W_{Exp-SF}$) that intersects and/or overlaps with the first expanded scan field 406 corresponding to the first energy beam 202 exiting the first scan field expansion assembly 400. With the second energy beam 202 exhibiting a slight deviation from telecentricity, the first energy beam 202 may have a telecentric orientation and/or the first energy beam 202 may exhibit a slight deviation from telecentricity.

By way of example, the angle of incidence ($\theta_i$) of the energy beam exiting a scan field expansion assembly 400 may be from about 0 degrees to about 10 degrees from telecentric relative to the optical axis (A) of a corresponding optical assembly 210, or such as from about 0 degrees to about 5 degrees, such as from about 0 degrees to about 3 degrees, such as from about 0 degrees to about 2 degrees, such as from about 0 degrees to about 1 degrees, such as less than about 10 degrees, such as less than about 5 degrees, such as less than about 3 degrees, such as less than about 2 degrees, or such as less than about 1 degree from telecentric relative to the optical axis (A) of a corresponding optical assembly 210.

Figure 5A:
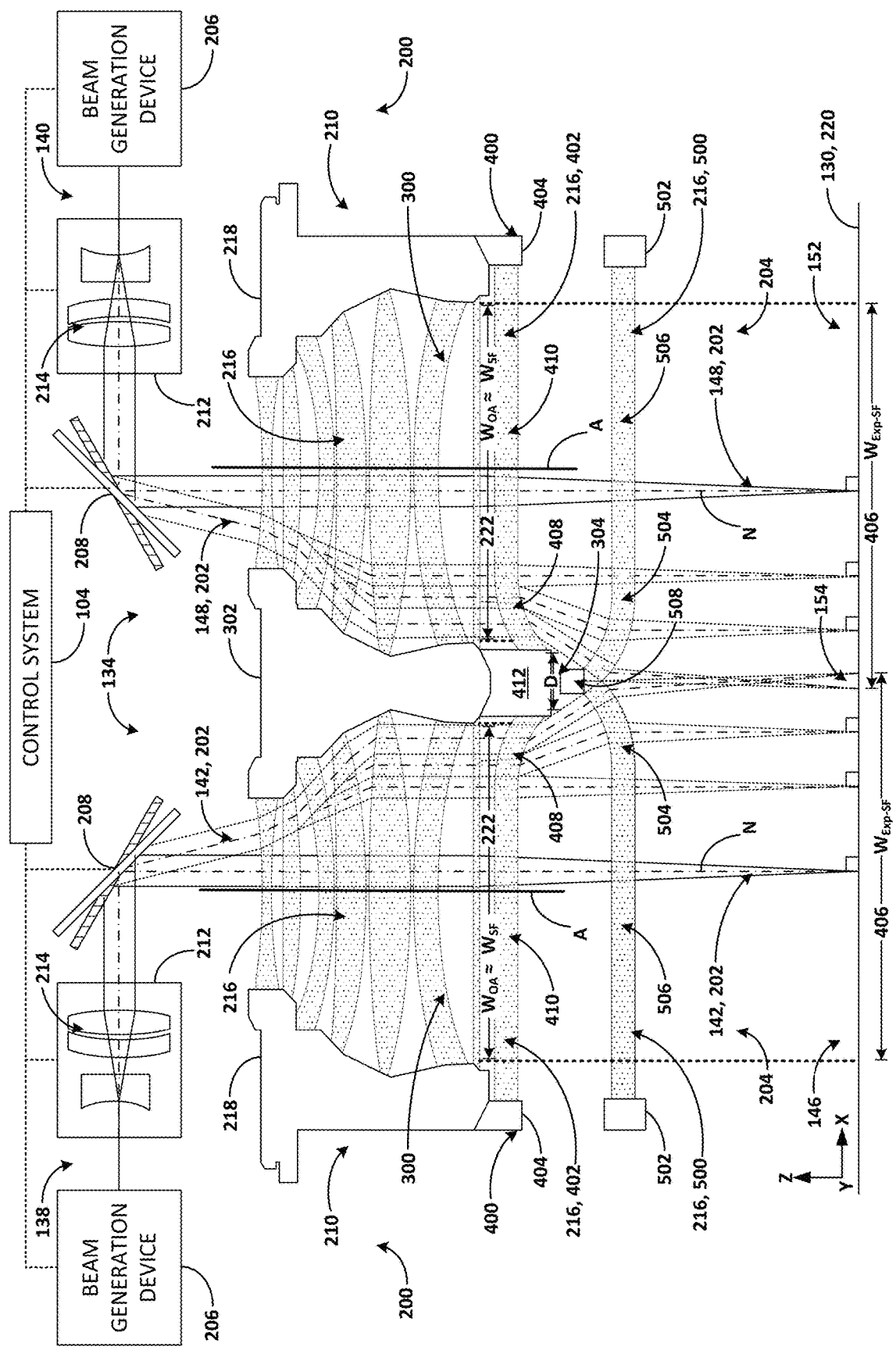
FIGS. 5A and 5B schematically depict a cross-sectional view of another exemplary energy beam system and/or optical system that includes a scan field expansion assembly.
Figure 5B:
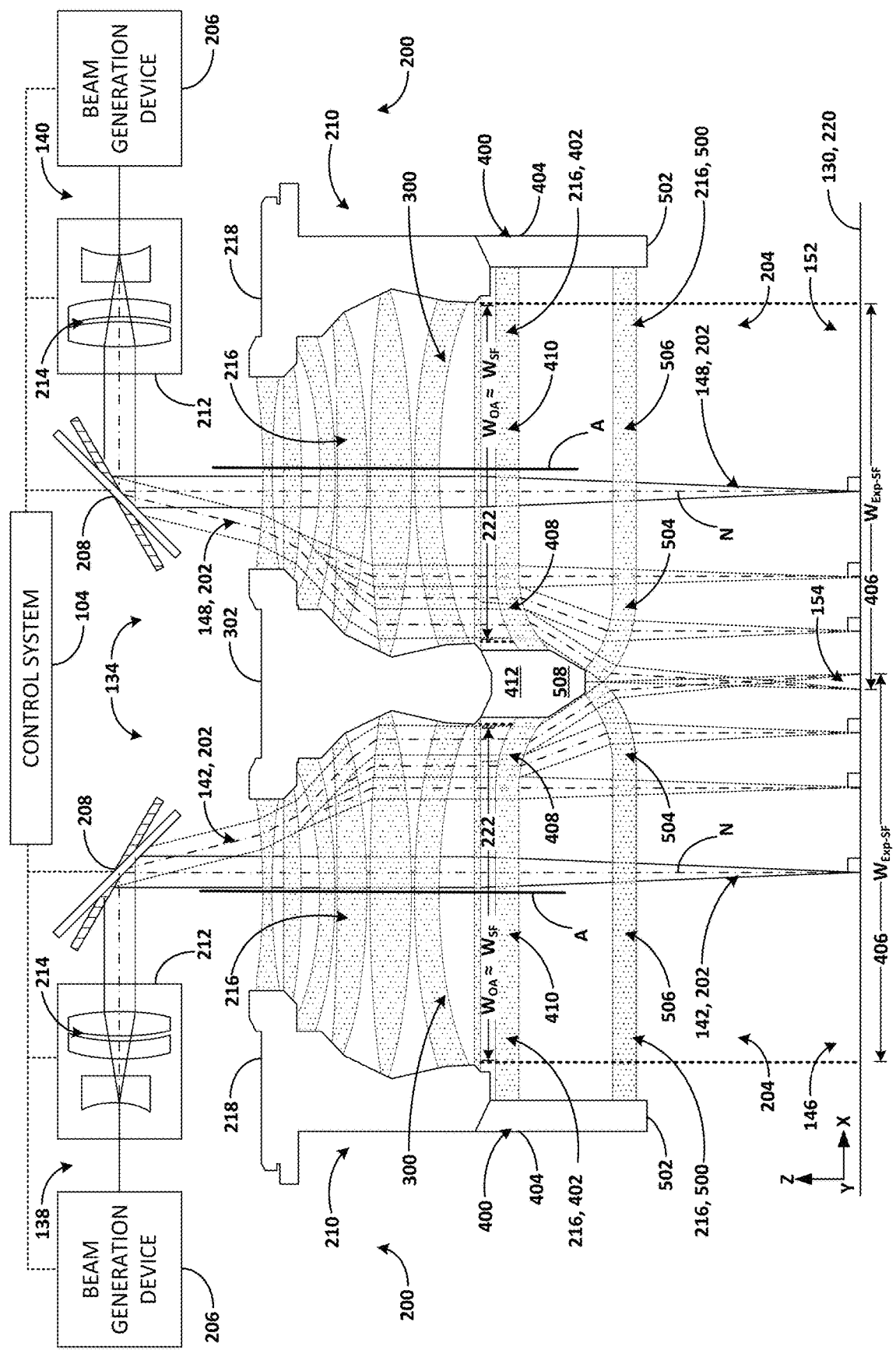

Now turning to FIGS. 5A and 5B, in some embodiments, a scan field expansion assembly 400 may be configured to output an energy beam 202 that exhibits a telecentric orientation across substantially an entire cross-sectional width and/or area of an expanded scan field 406. For example, an energy beam 202 exiting a scan field expansion assembly 400 may exhibit a telecentric orientation across at least about 90% of the expanded scan field 406, such as at least about 95% of the expanded scan field 406, such as at least about 99% of the expanded scan field 406, or such as at least about 99.5% of the expanded scan field 406. A scan field expansion assembly 400 that exhibits a telecentric orientation across substantially an entire expanded scan field 406 may output an energy beam 202 that exhibits a slight deviation from a telecentric orientation, such as less than about 2 degrees, or such as less than about 1 degree, or such as less than about 0.5 degrees.

In some embodiments, an optical assembly 210 may include or may be configured as a first telecentric lens 300, and the scan field expansion assembly 400 may include or may be configured as a second telecentric lens 300. The scan field expansion assembly 400 and/or the second telecentric lens 300 thereof may expand the cross-sectional width and/or area of a nominal scan field 222 for the telecentric lens 300 in at least one direction perpendicular to an optical axis (A) of the telecentric lens 300. The expanded scan field 406 of a telecentric lens 300 provided by a scan field expansion assembly 400 may have an expanded cross-sectional width and/or area ($W_{Exp-SF}$) that exceeds the corresponding cross-sectional width and/or area ($W_{OA}$) of the optical assembly 210 and/or the housing 218 of the telecentric lens 300. Additionally, or in the alternative, an optical assembly 210 may include one or more lenses 216 configured as or including a flat-field lens, an f-theta lens 250, and/or an f-tan-theta lens, and the scan field expansion assembly 400 may include or may be configured as a telecentric lens 300 configured to expand the cross-sectional width and/or area of a nominal scan field 222 for such one or more lenses 216 in at least one direction perpendicular to an optical axis (A) of such one or more lenses 216.

As shown in FIGS. 5A and 5B, in addition to one or more field-expanding optical elements 402, a scan field expansion assembly 400 may include one or more field-orienting optical elements 500, such as one or more lenses 216 or other optical elements. The one or more field-orienting optical elements 500 may be supported by a field-orienting housing 502 that includes one or more housing components. The one or more field-orienting optical elements 500 of the scan field expansion assembly 400 may be configured to orient the expanded scan field 406 such that an energy beam exiting the scan field expansion assembly 400, and/or the one or more field-orienting optical elements 500 thereof, may be parallel to an optical axis (A) of the optical assembly 210 disposed in front of the scan field expansion assembly 400. Additionally, or in the alternative, the one or more field-orienting optical elements 500 may be configured to orient the expanded scan field 406 such that an energy beam 202 exiting the scan field expansion assembly 400, and/or the one or more field-orienting optical elements 500 thereof, may be perpendicular to the focal plane 220 and/or the build plane 130.

In some embodiments, one or more field-orienting optical elements 500 of a scan field expansion assembly 400 may include a field-orienting region 504 configured to orient an energy beam 202, such as perpendicular to the focal plane 220 and/or the build plane 130, with respect to the portion of the expanded scan field 406 corresponding the field-orienting region 504. The field-orienting region 504 may impart telecentricity to a corresponding portion of a field-expanding optical element 402, such as a field-expansion region 408 thereof. Additionally, or in the alternative, the field-orienting region 504 may impart telecentricity to one or more lenses 216 of scan field expansion assembly 400, and/or to a corresponding optical assembly 210, disposed in front of the one or more field-orienting optical elements 500, such as in front of a field-orienting region 504 thereof. The field-orienting region 504 may encompass all or a portion of a respective one of the one or more field-orienting optical elements 500. For example, a field-orienting optical element 500 may include a telecentric region 506 and a field-orienting region 504. In some embodiments, a field-orienting region 504 may be located about a portion of a field-orienting optical element 500 that is proximal and/or adjacent to an intermediate housing 302 and/or adjacent to another optical assembly 210. For example, a field-orienting region 504 of a field-orienting optical element 500 may include at least a portion of a perimeter region of the field-orienting optical element 500. In some embodiments, a field-orienting region 504 of a field-orienting optical element 500 may at least partially overlap with a scan field of a field-expansion region 408, of a field-expanding optical element 402, disposed in front of the field-orienting optical element 500. A telecentric region 506 of a field-orienting optical element 500 may be located about a radially inward portion of a field-orienting optical element 500 and/or about a portion of a field-orienting optical element 500 that is distal to an intermediate housing 302 and/or adjacent to another optical assembly 210. In some embodiments, a telecentric region 506 of a field-orienting optical element 500 may at least partially overlap with a scan field of a telecentric region 410 of a field-expanding optical element 402 disposed in front of the field-orienting optical element 500.

The field-orienting region 504 of a field-orienting optical element 500 may include one or more aspects configured to provide a telecentric beam path, such as one or more concave, convex, and/or meniscus aspects. For example, the field-orienting region 504 may include one or more biconvex aspects, one or more plano-convex aspects, and/or one or more converging meniscus aspects. The telecentric region 506 of a field-orienting optical element 500 may exhibit only a slight beam deflection, if any, for example, to sustain the telecentricity of a corresponding region of a field-expanding optical element 402 and/or an optical assembly 210 and/or one or more lenses 216 thereof. Additionally, or in the alternative, the telecentric region 506 may include one or more aspects configured to deflect an energy beam 202 passing therethrough to an orientation parallel to an optical axis (A) of the field expansion assembly 400, the optical assembly 210, and/or one or more lenses 216 thereof, such as one or more converging lens aspects and/or one or more diverging lens aspects, including one or more concave, convex, and/or meniscus aspects.

Additionally, or in the alternative, a field-orienting optical element 500 may include or may be configured as an aspheric lens, a myodisc lens, a lenticular lens, a multidrop lens, a multifocal lens, and/or an astigmatic lens. Such aspheric, myodisc, lenticular, multidrop, multifocal, and/or astigmatic lens, or at least a portion thereof, may have a concave, convex, and/or meniscus configuration. Additionally, or in the alternative, at least a portion of a concave, convex, and/or meniscus lens may include an aspheric, myodisc, lenticular, multidrop, multifocal, and/or astigmatic region. Such aspheric, myodisc, lenticular, multidrop, multifocal, and/or astigmatic lens, or at least a portion thereof, may include a field-expansion region 408 with one or more aspects configured to provide a diverging beam path. Such aspheric, myodisc, lenticular, multidrop, multifocal, and/or astigmatic lens, or at least a portion thereof, may include a field-orienting region 504 and/or a telecentric region 506.

The field-orienting region 504 and/or the telecentric region 506 of a field-orienting optical element 500 may exhibit telecentricity. An energy beam 202 may enter and/or exit a field-orienting region 504 diverging from the optical axis (A) of the field expansion assembly 400, the optical assembly 210, and/or one or more lenses 216 thereof. However, other beam angles are also contemplated. An energy beam 202 exiting the field-orienting region 504 of a field-orienting optical element 500 may exhibit telecentricity, for example, with an orientation parallel to the optical axis (A) of the field expansion assembly 400, the optical assembly 210, and/or one or more lenses 216 thereof. However, other beam angles are also contemplated. An energy beam 202 may enter and/or exit a telecentric region 506 oriented parallel to the optical axis (A) of the field expansion assembly 400, the optical assembly 210, and/or one or more lenses 216 thereof. However, other beam angles are also contemplated.

In some embodiments, a field expansion assembly 400 may be configured as or include one or more aspheric lenses, myodisc lenses, lenticular lenses, multidrop lenses, multifocal lenses, and/or astigmatic lenses. Such one or more aspheric, myodisc, lenticular, multidrop, multifocal, and/or astigmatic lens may define at least a portion of a field-expanding optical element 402 and/or a field-orienting optical element 500. Such aspheric, myodisc, lenticular, multidrop, multifocal, and/or astigmatic lens, or at least a portion thereof, may have a concave, convex, and/or meniscus configuration. Additionally, or in the alternative, at least a portion of a concave, convex, and/or meniscus lens may include an aspheric, myodisc, lenticular, multidrop, multifocal, and/or astigmatic region.

As shown in FIGS. 5A and 5B, an energy beam system 134 and/or an optical system 204 may include a plurality of optical assemblies 210 and a corresponding plurality of scan field expansion assemblies 400 that respectively include one or more field-expanding optical elements 402 and one or more field-orienting optical elements 500. A first scan field expansion assembly 400 may include a first one or more field-orienting optical elements 500 disposed within a first field-orienting housing 502. The first scan field expansion assembly 400 may additionally include a first one or more field-expanding optical elements 402 supported by a first field-expansion housing 404. The second scan field expansion assembly 400 may include a second one or more field-orienting optical elements 500 disposed within a second field-orienting housing 502. The second scan field expansion assembly 400 may additionally include a second one or more field-expanding optical elements 402 supported by the second field-expansion housing 404.

The first field-orienting housing 502 and the second field-orienting housing 502 may be disposed adjacent to one another. The first one or more field-orienting optical elements 500 may include a field-orienting region 504 adjacent and/or proximal to the second scan field expansion assembly 400, the second one or more field-orienting optical elements 500, and/or the second one or more field-expanding optical elements 402. Additionally, or in the alternative, the second one or more field-orienting optical elements 500 may include a field-orienting region 504 adjacent and/or proximal to the first scan field expansion assembly 400, the first one or more field-orienting optical elements 500, and/or the first one or more field-expanding optical elements 402.

The first one or more field-orienting optical elements 500 may include a telecentric region 506 located about a radially inward portion of the respective field-orienting optical elements 500 and/or located distal to the second scan field expansion assembly 400, the second one or more field-orienting optical elements 500, and/or the second one or more field-expanding optical elements 402. The second one or more field-orienting optical elements 500 may include a telecentric region 506 located about a radially inward portion of the respective field-orienting optical elements 500 and/or located distal to the first scan field expansion assembly 400, the first one or more field-orienting optical elements 500, and/or the first one or more field-expanding optical elements 402.

The first field-orienting housing 502 and the second field-orienting housing 502 may be formed as a respectively separate field-orienting housing 502, or as a single field-orienting housing 502 with first and second portions. For example, the first portion of the field-orienting housing 502 may be configured to support the first one or more field-orienting optical elements 500 corresponding to the first scan field expansion assembly 400 and/or the second portion of the field-orienting housing 502 may be configured to support the second one or more field-orienting optical elements 500 corresponding to the second scan field expansion assembly 400. Additionally, or in the alternative, the one or more field-orienting housings 502 and the one or more field-expansion housing 404 may be formed as a respectively separate housing, or as a single housing with a field-expansion housing 404 portion and a field-orienting housing 502 portion. For example, a first housing may include a first field-expansion housing 404 and a first field-orienting housing 502 configured as a combined housing corresponding to the first scan field expansion assembly 400, and/or a second housing may include a second field-expansion housing 404 and a second field-orienting housing 502 configured as a combined housing corresponding to the second scan field expansion assembly 400.

As shown in FIG. 5A, a scan field expansion assembly 400 may include one or more field-orienting optical elements 500 provided as a separate component from a corresponding one or more field-expanding optical elements 402 and/or corresponding optical assembly 210. For example, the field-orienting housing 502 (and/or one or more housing components thereof) may be separate from the field-expansion housing 404 (and/or one or more housing components thereof). The one or more field-orienting optical elements 500 may be operably couplable or operably coupled to the one or more field-expanding optical elements 402. Additionally or in the alternative, the field-orienting housing 502 may be separate from the optical assembly 210 and corresponding housing 218 that supports the plurality of lenses 216 thereof, such as or including a telecentric lens 300. The one or more field-expanding optical elements 402 may be operably couplable or operably coupled to a corresponding optical assembly 210. Additionally, or in the alternative, the one or more field-expanding optical elements 402 may be integrated with a corresponding optical assembly 210 in a common component and/or the one or more field-expanding optical elements 402 may define a portion of an corresponding optical assembly 210.

As shown in FIG. 5B, a scan field expansion assembly 400 may include one or more field-orienting optical elements 500 integrated with one or more field-expanding optical elements 402 in a common component. For example, the field-orienting housing 502 and the field-expansion housing 404 may define respective portions of a scan field expansion assembly 400. Additionally, or in the alternative, The scan field expansion assembly 400 may be operably couplable or operably coupled with a corresponding optical assembly 210. Additionally, or in the alternative, the scan field expansion assembly 400 may be integrated with a corresponding optical assembly 210 in a common component, and/or a scan field expansion assembly 400 may define a portion of an corresponding optical assembly 210.

Referring still to FIGS. 5A and 5B, a first energy beam 202 exiting the first telecentric lens 300 may exhibit a telecentric orientation relative to the optical axis (A) of the first telecentric lens 300. The first telecentric lens 300 may have a nominal scan field 222 with a cross-sectional width and/or area ($W_{SF}$) that is less than or equal to, e.g., approximately equal to, the internal cross-sectional width and/or area of the optical assembly 210 and/or housing 218 ($W_{OA}$) of the first telecentric lens 300. At least one of the plurality of lenses 216 that make up the first telecentric lens 300 may have a cross-sectional width and/or area that that exceeds the cross-sectional width and/or area of the nominal scan field 222 ($W_{SF}$) that can be scanned by the first telecentric lens 300. The first scan field expansion assembly 400, including a first one or more field-expanding optical elements 402 and a first one or more field-orienting optical elements 500, may expand the nominal scan field 222 of the first optical assembly 210 from an initial cross-sectional width and/or area ($W_{SF}$) to an expanded scan field 406 at the focal plane 220 corresponding to the first optical assembly 210. The expanded scan field 406 may be telecentric. The expanded scan field 406 may have a cross-sectional width and/or area ($W_{Exp-SF}$) that exceeds the corresponding initial cross-sectional width and/or area ($W_{SF}$) of the nominal scan field 222 and/or that exceeds the corresponding internal cross-sectional width and/or area of the first optical assembly 210 and/or housing 218 ($W_{OA}$) of the first telecentric lens 300.

A second energy beam 202 exiting the second telecentric lens 300 may exhibit a telecentric orientation relative to the optical axis (A) of the second telecentric lens 300. The second telecentric lens 300 may have a nominal scan field 222 with a cross-sectional width and/or area ($W_{SF}$) that is less than or equal to, e.g., approximately equal to, the internal cross-sectional width and/or area of the optical assembly 210 and/or housing 218 ($W_{OA}$) of the second telecentric lens 300. At least one of the plurality of lenses 216 that make up the second telecentric lens 300 may have a cross-sectional width and/or area that that exceeds the cross-sectional width and/or area of the nominal scan field 222 ($W_{SF}$) that can be scanned by second telecentric lens 300. The second scan field expansion assembly 400, including a second one or more field-expanding optical elements 402 and a second one or more field-orienting optical elements 500, may expand the nominal scan field 222 of the second optical assembly 210 from an initial cross-sectional width and/or area ($W_{SF}$) to an expanded scan field 406 at the focal plane 220 corresponding to the second optical assembly 210. The expanded scan field 406 may be telecentric. The expanded scan field 406 may have a cross-sectional width and/or area ($W_{Exp-SF}$) that exceeds the corresponding initial cross-sectional width and/or area ($W_{SF}$) of the nominal scan field 222 and/or that exceeds the corresponding internal cross-sectional width and/or area of the second optical assembly 210 and/or housing 218 ($W_{OA}$) of the second telecentric lens 300.

An intermediate field-orienting housing 508 may be interposed between the first scan field expansion assembly 400 and the second scan field expansion assembly 400. For example, the intermediate field-orienting housing 508 may be interposed between a first one or more field-orienting optical elements 500 of the first scan field expansion assembly 400 and a second field-orienting optical elements 500 of the second scan field expansion assembly 400. The first one or more field-orienting optical elements 500 may include a field-orienting region 504 located adjacent and/or proximal to the intermediate field-orienting housing 508, and/or a telecentric region 506 located distal to the intermediate field-orienting housing 508. The second one or more field-orienting optical elements 500 may include a field-orienting region 504 located adjacent and/or proximal to the intermediate field-orienting housing 508, and/or a telecentric region 506 located distal to the intermediate field-orienting housing 508.

The intermediate field-orienting housing 508 may define a portion of a first field-orienting housing 502 corresponding to the first scan field expansion assembly 400 and/or a portion a second field-orienting housing 502 corresponding to the second scan field expansion assembly 400. Additionally, or in the alternative, the intermediate field-orienting housing 508 may define a separate component interposed between the first and second field-orienting housing 502. The lateral distance (D) may define a gap 304 between the respective scan fields 222. However, the respective expanded scan fields 406 may be telecentrically adjacent to one another, closing the gap 304 at least at the focal plane 220. In some embodiments, as shown in FIGS. 5A and 5B, the telecentrically adjacent expanded scan fields 406 may overlap, provide an interlace region 154. For example, an energy beam 202 exiting a scan field expansion assembly 400, and/or one or more field-orienting optical elements 500 thereof, may exhibit a slight deviation from a telecentric orientation. By way of example, the angle of incidence ($\theta_i$) of the energy beam exiting scan field expansion assembly 400 that includes one or more field-orienting optical elements 500 may be from about 0 degrees to about 2 degrees, such as from about 0 degrees to about 1 degrees, such as less than about 2 degrees, or such as less than about 1 degree from telecentric relative to the optical axis (A) of a corresponding optical assembly 210.

Referring to FIGS. 4A and 4B, and 5A and 5B, in some embodiments, a scan field expansion assembly 400 may provide a flat focal plane 220, such as a flat focal plane 220 perpendicular to the normal line (N), including parallel to, and coinciding with, a build plane 130. In some embodiments, the field-expansion region 408 of a scan field expansion assembly 400 may provide a focal plane 220 with a slight curvature, and/or a focal plane 220 that slightly deviates from perpendicular to the normal line (N) and/or from parallel to the build plane 130. For example, a portion of the focal plane 220 corresponding to a field-expansion region 408 may exhibit a slight curvature and/or a slight deviation from being perpendicular to the normal line (N) and/or from parallel to the build plane 130. Additionally, or in the alternative, a portion of the focal plane 220 corresponding to a field-orienting region 504 may exhibit a slight curvature and/or a slight deviation from being perpendicular to the normal line (N) and/or from parallel to the build plane 130.

An energy beam exiting a scan field expansion assembly 400 may exhibit one or more beam properties that differ depending, for example, at least in part on the linear displacement of the energy beam 202 relative to the optical axis (A) of the scan field expansion assembly and/or the optical assembly 210 corresponding to the scan field expansion assembly 400. For example, an energy beam 202 exiting a scan field expansion assembly 400 may exhibit a spot size, spot shape, power density, and/or power density, that depends at least in part on the linear displacement of the energy beam 202 relative to the optical axis (A) of the scan field expansion assembly and/or the optical assembly 210 corresponding to the scan field expansion assembly 400.

In some embodiments, a beam conditioner 212 may be configured to adjust an effective focal length of an energy beam 202 exiting a scan field expansion assembly 400. For example, the beam conditioner 212 may include one or more optical elements, such as one or more lenses and/or one or more curved mirrors, that may be configured to augment an effective focal length of an energy beam 202 exiting an scan field expansion assembly 400 at least in part by changing a relative location of such one or more optical elements and/or a relative distance between a plurality of such optical elements. In some embodiments, a beam expander 214 may be configured to augment the focal length of an energy beam 202 exiting a scan field expansion assembly 400. The effective focal of the energy beam 202 may be augmented by the beam conditioner 212 such that an energy beam 202 exiting the scan field expansion assembly 400 has an effective focal length that depends on the linear displacement of the energy beam 202 relative to the optical axis (A) of the optical assembly 210.

For example, the beam conditioner 212 may be configured to augment the effective focal length of an energy beam 202 exiting the scan field expansion assembly 400, working individually or in concert with one or more optical elements of the scan field expansion assembly 400 and/or in concert with one or more optical elements of an optical assembly 210 corresponding to the scan field expansion assembly 400, with respect to at least a portion of the focal plane 220 corresponding to the field-expansion region 408 and/or the field-orienting region 504 of the scan field expansion assembly 400. Additionally, or in the alternative, the effective focal length of an energy beam 202 may be augmented with respect to at least a portion of the focal plane 220 corresponding to the telecentric region 410 of the scan field expansion assembly 400. The portion of the focal plane 220 corresponding to the field-expansion region 408 and/or the telecentric region 410 of a field-expanding optical element 402 may be aligned with one another at least in part by augmenting the effective focal length of an energy beam 202 exiting at least a portion of the field-expansion region 408, and/or at least a portion of the telecentric region 410, of the field-expanding optical element 402. The portion of the focal plane 220 corresponding to the field-orienting region 504 and/or the telecentric region 506 of a field-orienting optical element 500 may be aligned with one another at least in part by augmenting the effective focal length of an energy beam 202 exiting at least a portion of the field-expansion region 408, and/or at least a portion of the telecentric region 410, of the field-expanding optical element 402. The expanded scan field 406 provided by the scan field expansion assembly 400 may exhibit a flat focal plane 220, attributable at least in part to the focal plane 220 corresponding to the field-expansion region 408 and/or the telecentric region 410 having been augmented and/or aligned with one another. The flat focal plane 220 may be perpendicular to the normal line (N), including parallel to, and coinciding with, a build plane 130.

In addition or in the alternative to augmenting the effective focal length of an energy beam 202, a beam conditioner 212 may be configured to augment a spot size, spot shape, power density, and/or power density profile, of an energy beam 202 exiting the scan field expansion assembly 400. For example, the beam conditioner 212 may include one or more optical elements, such as one or more lenses curved mirrors, diffractive elements, beam transformers, and/or the like, configured to augment a spot size, spot shape, power density, and/or power density profile, of an energy beam 202 exiting the scan field expansion assembly 400. In some embodiments, a beam conditioner 212 may include a beam expander 214 configured to augment a spot size, spot shape, power density, and/or power density profile, of an energy beam 202 exiting the scan field expansion assembly 400.

The energy beam 202 may be augmented by the beam conditioner 212 such that an energy beam 202 exiting the scan field expansion assembly 400 has a spot size, spot shape, power density, and/or power density profile that depends on the linear displacement of the energy beam 202 relative to the optical axis (A) of the optical assembly 210. For example, the beam conditioner 212 may be configured to augment the spot size, spot shape, power density, and/or power density profile of an energy beam with respect to at least a portion of a field-expansion region 408 and/or a field-orienting region 504 of a scan field expansion assembly 400. Additionally, or in the alternative, the beam conditioner 212 may be configured to augment the spot size, spot shape, power density, and/or power density profile of an energy beam with respect to at least a portion of a telecentric region 410, 506 of the scan field expansion assembly 400. The beam conditioner 212 may augment the spot size, spot shape, power density, and/or power density profile of an energy beam by working individually or in concert with one or more optical elements of the scan field expansion assembly 400 and/or in concert with one or more optical elements of the optical assembly 210 corresponding to the scan field expansion assembly 400, The spot size, spot shape, power density, and/or power density profile corresponding to the field-expansion region 408 and/or the telecentric region 410 of the scan field expansion assembly 400 may be coordinated with one another at least in part by adjustments made by the beam conditioner 212 with respect to an energy beam 202 exiting at least a portion of the field-expansion region 408, and/or at least a portion of the telecentric region 410, of the scan field expansion assembly 400. Additionally, or in the alternative, the spot size, spot shape, power density, and/or power density profile corresponding to the field-orienting region 504 and/or the telecentric region 506 of the scan field expansion assembly 400 may be coordinated with one another at least in part by adjustments made by the beam conditioner 212 with respect to an energy beam 202 exiting at least a portion of the field-orienting region 504, and/or at least a portion of the telecentric region 506, of the scan field expansion assembly 400.

The spot size, spot shape, power density, and/or power density profile of an energy beam 202 may be substantially uniform across the cross-sectional width and/or area of the expanded scan field 406 ($W_{Exp-SF}$). For example, the spot size, spot shape, power density, and/or power density profile of an energy beam 202 may be substantially uniform as between a first portion of the expanded scan field 406 corresponding to at least a portion of the field-expansion region 408 and/or the field-orienting region 504 of the scan field expansion assembly 400 and a second portion of the expanded scan field 406 corresponding to at least a portion of the telecentric region 410, 506 of the scan field expansion assembly 400. Additionally, or in the alternative, the spot size, spot shape, power density, and/or power density profile of an energy beam 202 may be substantially uniform within at least a portion of the expanded scan field 406 corresponding to the field-expansion region 408 and/or the field-orienting region 504 of the scan field expansion assembly 400, and/or and within at least a portion of the expanded scan field 406 corresponding to at least a portion of the telecentric region 410, 506 of the scan field expansion assembly 400. The spot size, spot shape, power density, and/or power density profile of an energy beam 202 may be substantially uniform across an expanded scan field 406 with a flat focal plane 220, such as a flat focal plane 220 perpendicular to the normal line (N), including parallel to, and coinciding with, a build plane 130.

Figure 6:
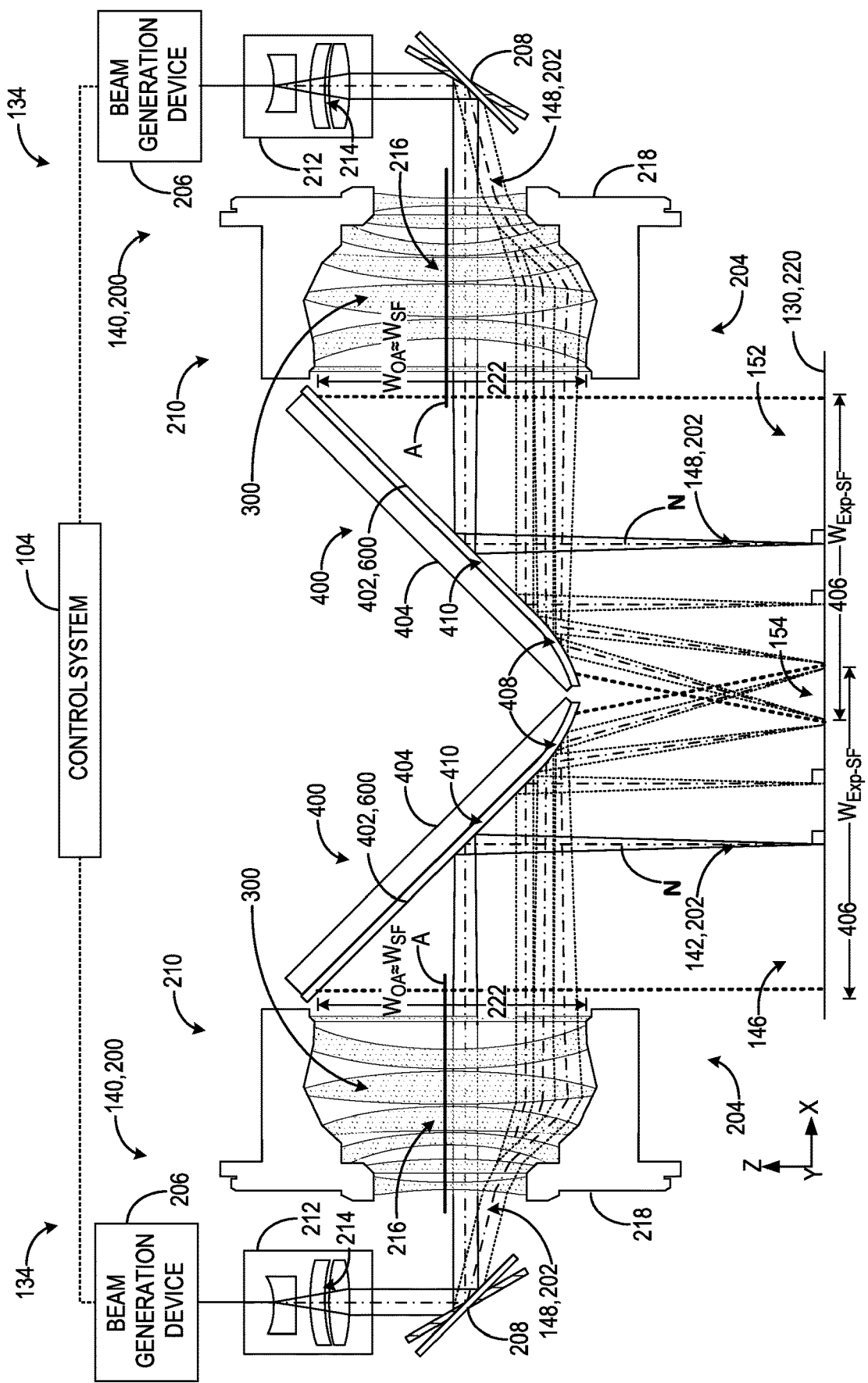
FIG. 6 schematically depicts a side cross-sectional view of yet another exemplary energy beam system and/or optical system that includes a scan field expansion assembly.

Now turning to FIG. 6, another exemplary energy beam system 134 and/or optical system 204 that includes a scan field expansion assembly 400 will be described. A scan field expansion assembly 400 may include one or more field-expanding optical elements 402. As shown in FIG. 6, the one or more field-expanding optical elements 402 may include one or more field-expanding mirror elements 600 in addition or in the alternative to one or more other optical elements. The one or more field-expanding optical elements 402, including the one or more field-expanding mirror elements 600, may be supported by a field-expansion housing 404 that includes one or more housing components.

The one or more field-expanding optical elements 402 of the scan field expansion assembly 400, such as the one or more field-expanding mirror elements 600 thereof, may be configured to expand the nominal scan field 222 of the optical assembly 210 in at least one direction, such as at least one direction relative to the focal plane 220 of the optical assembly 210 corresponding to the scan field expansion assembly 400. The one or more field-expanding mirror elements 600 of the scan field expansion assembly 400 may expand a nominal scan field 222 of the optical assembly 210 from an initial cross-sectional width and/or area ($W_{SF}$) of the nominal scan field 222 to an expanded scan field 406 at the focal plane 220 corresponding to the optical assembly 210. The expanded scan field 406 may have a cross-sectional width and/or area ($W_{Exp-SF}$) that exceeds the corresponding initial cross-sectional width and/or area ($W_{SF}$) of the nominal scan field 222. The cross-sectional width and/or area of the expanded scan field 406 ($W_{Exp-SF}$) may exceed the internal cross-sectional width and/or area of the optical assembly 210 and/or housing 218 ($W_{OA}$). In some embodiments, an optical assembly 210 may include or may be configured as a telecentric lens 300, and the one or more field-expanding mirror elements 600 of the scan field expansion assembly 400 may expand the cross-sectional width and/or area of a nominal scan field 222 for the telecentric lens 300 in at least one direction perpendicular to an optical axis (A) of the telecentric lens 300. The expanded scan field 406 of a telecentric lens 300 provided by the one or more field-expanding mirror elements 600 of the scan field expansion assembly 400 may have an expanded cross-sectional width and/or area ($W_{Exp-SF}$) that exceeds the corresponding cross-sectional width and/or area ($W_{OA}$) of the optical assembly 210 and/or the housing 218 of the telecentric lens 300. Additionally, or in the alternative, an optical assembly 210 may include one or more lenses 216 configured as or including a flat-field lens, an f-theta lens 250, and/or an f-tan-theta lens, and the scan field expansion assembly 400 may expand the cross-sectional width and/or area of a nominal scan field 222 for such one or more lenses 216 in at least one direction perpendicular to an optical axis (A) of such one or more lenses 216.

In some embodiments, one or more field-expanding mirror elements 600 of a scan field expansion assembly 400 may include a field-expansion region 408 configured to expand the portion of the nominal scan field 222 corresponding to an energy beam 202 passing through the field-expansion region 408. The field-expansion region 408 may impart a deviation from telecentricity with respect to a corresponding portion of an optical assembly 210, and/or one or more lenses 216 thereof, disposed in front of the field-expansion region 408. The field-expansion region 408 may encompass all or a portion of a respective one of the one or more field-expanding optical elements 402, such as the one or more field-expanding mirror elements 600. For example, a field-expanding optical element 402, such as a field-expanding mirror element 600, may include a telecentric region 410 and a field-expansion region 408. In some embodiments, a field-expansion region 408 may be located about a portion of a field-expanding mirror element 600 that is proximal and/or adjacent to an intermediate housing 302 and/or adjacent to another optical assembly 210. For example, a field-expansion region 408 of a field-expanding mirror element 600 may include at least a portion of a perimeter region of the field-expanding mirror element 600. Additionally, or in the alternative, a telecentric region 410 may be located about a radially inward portion of a field-expanding mirror element 600.

The portion of an expanded scan field 406 corresponding to a telecentric region 410 of a field-expanding mirror element 600 may exhibit telecentricity. An energy beam 202 may be incident upon a field-expanding mirror element 600 at an angle of incidence oriented parallel to the optical axis (A) of the field expansion assembly 400, the optical assembly 210, and/or one or more lenses 216 thereof. However, other beam angles are also contemplated. An orientation of the telecentric region 410 may differ from an orientation of the field-expansion region 408 of the field-expanding mirror element 600. An energy beam 202 reflecting from a telecentric region 410 of the field-expanding mirror element 600 may be oriented parallel to the normal line (N) and/or perpendicular to a flat focal plane 220. An energy beam 202 reflecting from a field-expansion region 408 of the field-expanding mirror element 600 may follow a diverging beam path, such as a beam path oriented oblique to the normal line (N). Additionally, or in the alternative, the reflecting energy beam 202 may follow a diverging beam path oriented oblique to the portion of the flat focal plane 220 corresponding to the telecentric region 410 and/or the field-expansion region 408 of the field-expanding mirror element 600, including oblique to the build plane 130. However, other beam angles are also contemplated.

The field-expansion region 408 of a field-expanding mirror element 600 may include one or more mirror aspects configured to provide a diverging beam path, such as one or more convex mirror aspects. The telecentric region 410 of a field-expanding mirror element 600 may exhibit only a slight beam divergence, if any, for example, to sustain the telecentricity of a corresponding region of an optical assembly 210 and/or one or more lenses 216 thereof. Additionally, or in the alternative, the telecentric region 410 may include one or more mirror aspects configured to reflect an energy beam 202 to an orientation parallel to the normal line (N) and/or to an orientation perpendicular to the flat focal plane 220, including parallel to the build plane 130, such as one or more concave or convex mirror aspects.

Additionally, or in the alternative, a field-expanding mirror element 600 may include or may be configured as an aspheric mirror, a lenticular mirror, a multifocal mirror, and/or an astigmatic mirror. Such aspheric, lenticular, multifocal, and/or astigmatic mirror, or at least a portion thereof, may have a concave and/or convex configuration. Additionally, or in the alternative, at least a portion of a concave and/or convex mirror may include an aspheric, lenticular, multifocal, and/or astigmatic region. Such aspheric, lenticular, multifocal, and/or astigmatic mirror, or at least a portion thereof, may include a field-expansion region 408 with one or more aspects configured to provide a diverging beam path. Additionally, or in the alternative, such aspheric, myodisc, lenticular, multidrop, multifocal, and/or astigmatic mirror, or at least a portion thereof, may include a field-expansion region 408 and/or a telecentric region 410.

As shown in FIG. 6, an energy beam system 134 and/or an optical system 204 may include a plurality of optical assemblies 210 and a corresponding plurality of scan field expansion assemblies 400, such as a plurality of field-expanding mirror elements 600. For example, as shown, an energy beam system 134 and/or an optical system 204 may include a first optical assembly 210 and a first scan field expansion assembly 400 with a field-expanding mirror element 600 corresponding to the first optical assembly 210, and/or a second optical assembly 210 and a second scan field expansion assembly 400 with a field-expanding mirror element 600 corresponding to the second optical assembly 210. The first optical assembly 210 and/or the second optical assembly 210, respectively, may include or may be configured as a telecentric lens 300. The first telecentric lens 300 may be adjacent to the second telecentric lens 300. The first scan field expansion assembly 400 and/or the first field-expanding mirror element 600 may be adjacent to the second scan field expansion assembly 400 and/or the second field-expanding mirror element 600.

The first scan field expansion assembly 400 may include a first field-expanding mirror element 600 supported by a first field-expansion housing 404. The second scan field expansion assembly 400 may include a second field-expanding mirror element 600 supported by the second field-expansion housing 404. The first field-expansion housing 404 and the second field-expansion housing 404 may be disposed adjacent to one another. The first one or more field-expanding mirror elements 600 may include a field-expansion region 408 adjacent and/or proximal to the second scan field expansion assembly 400, and/or the second one or more field-expanding mirror elements 600 may include a field-expansion region 408 adjacent and/or proximal to the first scan field expansion assembly 400. Additionally, or in the alternative, the first one or more field-expanding mirror elements 600 may include a telecentric region 410 located about a radially inward portion of the respective field-expanding mirror element 600 and/or located distal to the second scan field expansion assembly 400. The second one or more field-expanding mirror elements 600 may include a telecentric region 410 located about a radially inward portion of the respective field-expanding mirror element 600 and/or located distal to the first scan field expansion assembly 400.

The first field-expansion housing 404 and the second field-expansion housing 404 may be formed as separate field-expansion housing 404, or as a single field-expansion housing 404 with first and second portions. For example, the first portion of the field-expansion housing 404 may be configured to support the first one or more field-expanding mirror elements 600 corresponding to the first scan field expansion assembly 400 and/or the second portion of the field-expansion housing 404 may be configured to support the second one or more field-expanding mirror elements 600 corresponding to the second scan field expansion assembly 400.

As shown in FIG. 6, an energy beam system 134 and/or an optical system 204 may include a first optical assembly 210 configured as or including a first telecentric lens 300, with a first scan field expansion assembly 400 that includes a first field-expanding mirror element 600 disposed behind the first telecentric lens 300. The energy beam system 134 and/or an optical system 204 may additionally include a second optical assembly 210 configured as or including a second telecentric lens 300, with a second scan field expansion assembly 400 that includes a second field-expanding mirror element 600 disposed behind the second telecentric lens 300. As shown in FIG. 6, a scan field expansion assembly 400 that includes a field-expanding mirror element 600 may be provided as a separate component from a corresponding optical assembly 210. For example, the field-expansion housing 404 (and/or one or more housing components thereof) may be separate from the housing 218 (and/or one or more housing components thereof) that supports the plurality of lenses 216 that make up the corresponding optical assembly 210, such as or including a telecentric lens 300. Additionally, or in the alternative, a scan field expansion assembly 400 that includes a field-expanding mirror element 600 may be integrated with a corresponding optical assembly 210 in a common component, and/or a scan field expansion assembly 400 may define a portion of an corresponding optical assembly 210. For example, the field-expansion housing 404 (and/or one or more housing components thereof) may define a portion of the housing 218 (and/or one or more housing components thereof) that supports the plurality of lenses 216 that make up the optical assembly 210.

Referring still to FIG. 6, a first energy beam 202 exiting the first telecentric lens 300 may exhibit a telecentric orientation relative to the optical axis (A) of the first telecentric lens 300 and/or the normal line (N) corresponding to the flat focal plane 220. The first telecentric lens 300 may have a nominal scan field 222 with a cross-sectional width and/or area ($W_{SF}$) that is less than or equal to, e.g., approximately equal to, the internal cross-sectional width and/or area of the optical assembly 210 and/or housing 218 ($W_{OA}$) of the first telecentric lens 300. At least one of the plurality of lenses 216 that make up the first telecentric lens 300 may have a cross-sectional width and/or area that that exceeds the cross-sectional width and/or area of the nominal scan field 222 ($W_{SF}$) that can be scanned by the first telecentric lens 300. The first scan field expansion assembly 400, such as the first field-expanding mirror element 600 thereof, may expand the nominal scan field 222 of the first optical assembly 210 from an initial cross-sectional width and/or area ($W_{SF}$) to an expanded scan field 406 at the focal plane 220 corresponding to the first optical assembly 210. The expanded scan field 406 may have a cross-sectional width and/or area ($W_{Exp-SF}$) that exceeds the corresponding initial cross-sectional width and/or area ($W_{SF}$) of the nominal scan field 222 and/or that exceeds the corresponding internal cross-sectional width and/or area of the first optical assembly 210 and/or housing 218 ($W_{OA}$) of the first telecentric lens 300.

A second energy beam 202 exiting the second telecentric lens 300 may exhibit a telecentric orientation relative to the optical axis (A) of the second telecentric lens 300. The second telecentric lens 300 may have a nominal scan field 222 with a cross-sectional width and/or area ($W_{SF}$) that is less than or equal to, e.g., approximately equal to, the internal cross-sectional width and/or area of the optical assembly 210 and/or housing 218 ($W_{OA}$) of the second telecentric lens 300. At least one of the plurality of lenses 216 that make up the second telecentric lens 300 may have a cross-sectional width and/or area that that exceeds the cross-sectional width and/or area of the nominal scan field 222 ($W_{SF}$) that can be scanned by second telecentric lens 300. The second scan field expansion assembly 400, such as the second field-expanding mirror element 600 thereof, may expand the nominal scan field 222 of the second optical assembly 210 from an initial cross-sectional width and/or area ($W_{SF}$) to an expanded scan field 406 at the focal plane 220 corresponding to the second optical assembly 210. The expanded scan field 406 may have a cross-sectional width and/or area ($W_{Exp-SF}$) that exceeds the corresponding initial cross-sectional width and/or area ($W_{SF}$) of the nominal scan field 222 and/or that exceeds the corresponding internal cross-sectional width and/or area of the second optical assembly 210 and/or housing 218 ($W_{OA}$) of the second telecentric lens 300.

The respective expanded scan fields 406 may overlap at least at the focal plane 220. The overlapping scan fields 406 may provide an interlace region 154. For example, a first expanded scan field 406 corresponding to a first build plane region 146 may overlap with a second expanded scan field 406 corresponding to a second build plane region 152, with the overlapping portion providing an interlace region 154.

In some embodiments, an energy beam 202 exiting a scan field expansion assembly 400, and/or one or more field-expanding mirror elements 600 thereof, may exhibit a slight deviation from a telecentric orientation. The deviation from telecentric orientation may provide an energy beam 202 oriented at an angle of incidence ($\theta_i$) sufficient to provide an expanded scan field 406 with a cross-sectional width and/or area ($W_{Exp-SF}$) that intersects and/or overlaps with an expanded scan field 406 corresponding to another energy beam 202 exiting an adjacent scan field expansion assembly 400. For example, a first energy beam 202 reflecting from a first field-expanding mirror element 600 may be oriented at an angle of incidence ($\theta_i$) sufficient to provide a first expanded scan field 406 with a cross-sectional width and/or area ($W_{Exp-SF}$) that intersects and/or overlaps with a second expanded scan field 406 corresponding to a second energy beam 202 reflecting from a second field-expanding mirror element 600. With the first energy beam 202 exhibiting a slight deviation from telecentricity, the second energy beam 202 may have a telecentric orientation and/or the second energy beam 202 may exhibit a slight deviation from telecentricity. Additionally, or in the alternative, the second energy beam 202 reflecting from the second field-expanding mirror element 600 may be oriented at an angle of incidence ($\theta_i$) sufficient to provide a second expanded scan field 406 with a cross-sectional width and/or area ($W_{Exp-SF}$) that intersects and/or overlaps with the first expanded scan field 406 corresponding to the first energy beam 202 reflecting from the first field-expanding mirror element 600. With the second energy beam 202 exhibiting a slight deviation from telecentricity, the first energy beam 202 may have a telecentric orientation and/or the first energy beam 202 may exhibit a slight deviation from telecentricity.

By way of example, the angle of incidence ($\theta_i$) of the energy beam reflecting from a field-expanding mirror element 600 may be from about 0 degrees to about 10 degrees from telecentric relative to the normal line (N) of a corresponding optical assembly 210, or such as from about 0 degrees to about 5 degrees, such as from about 0 degrees to about 3 degrees, such as from about 0 degrees to about 2 degrees, such as from about 0 degrees to about 1 degrees, such as less than about 10 degrees, such as less than about 5 degrees, such as less than about 3 degrees, such as less than about 2 degrees, or such as less than about 1 degree from telecentric relative to the normal line (N) of a corresponding optical assembly 210.

Figure 7:
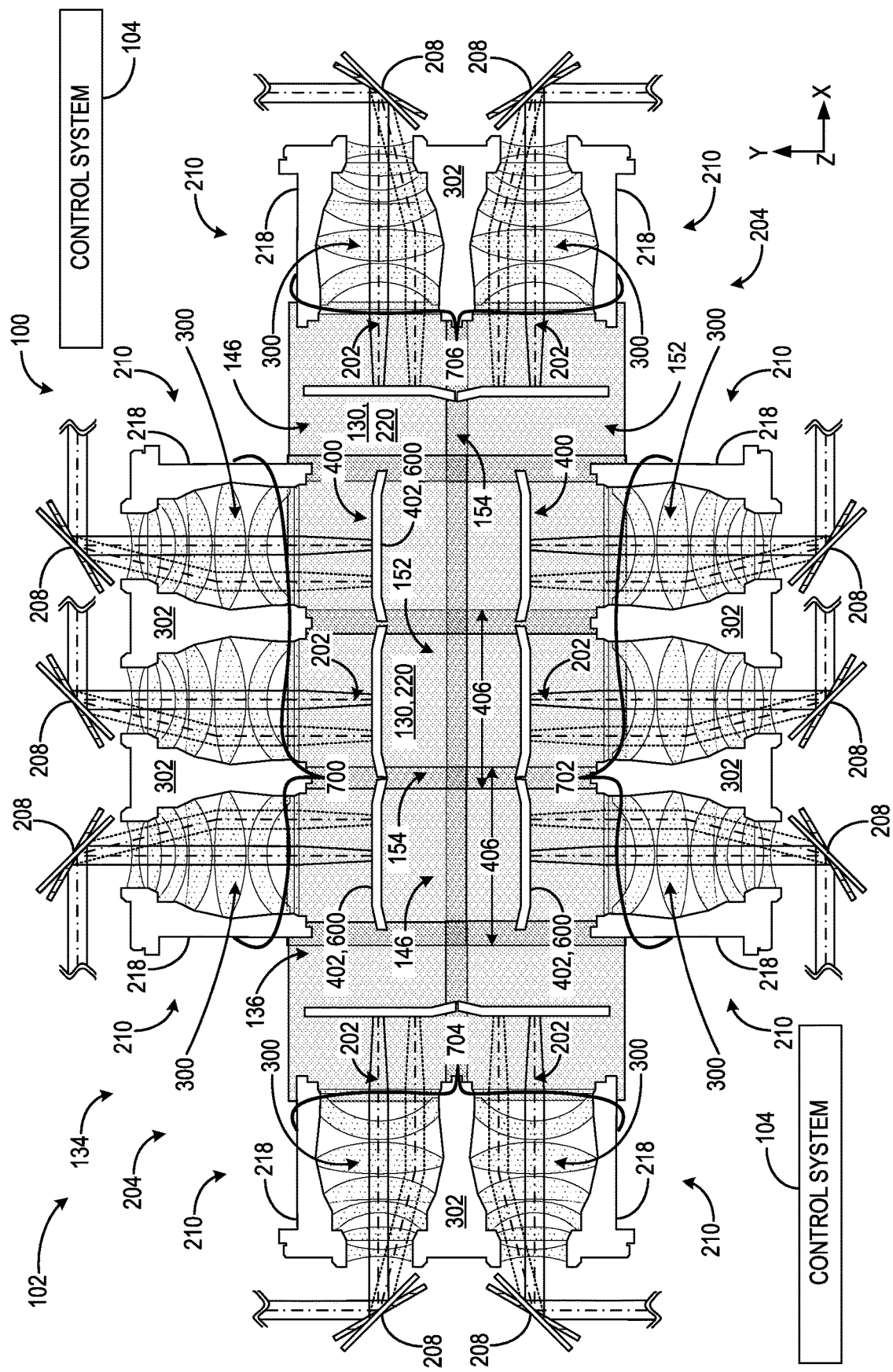
FIG. 7 schematically depicts a top cross-sectional view of yet another exemplary energy beam system and/or optical system that includes a scan field expansion assembly.
Figure 8A:
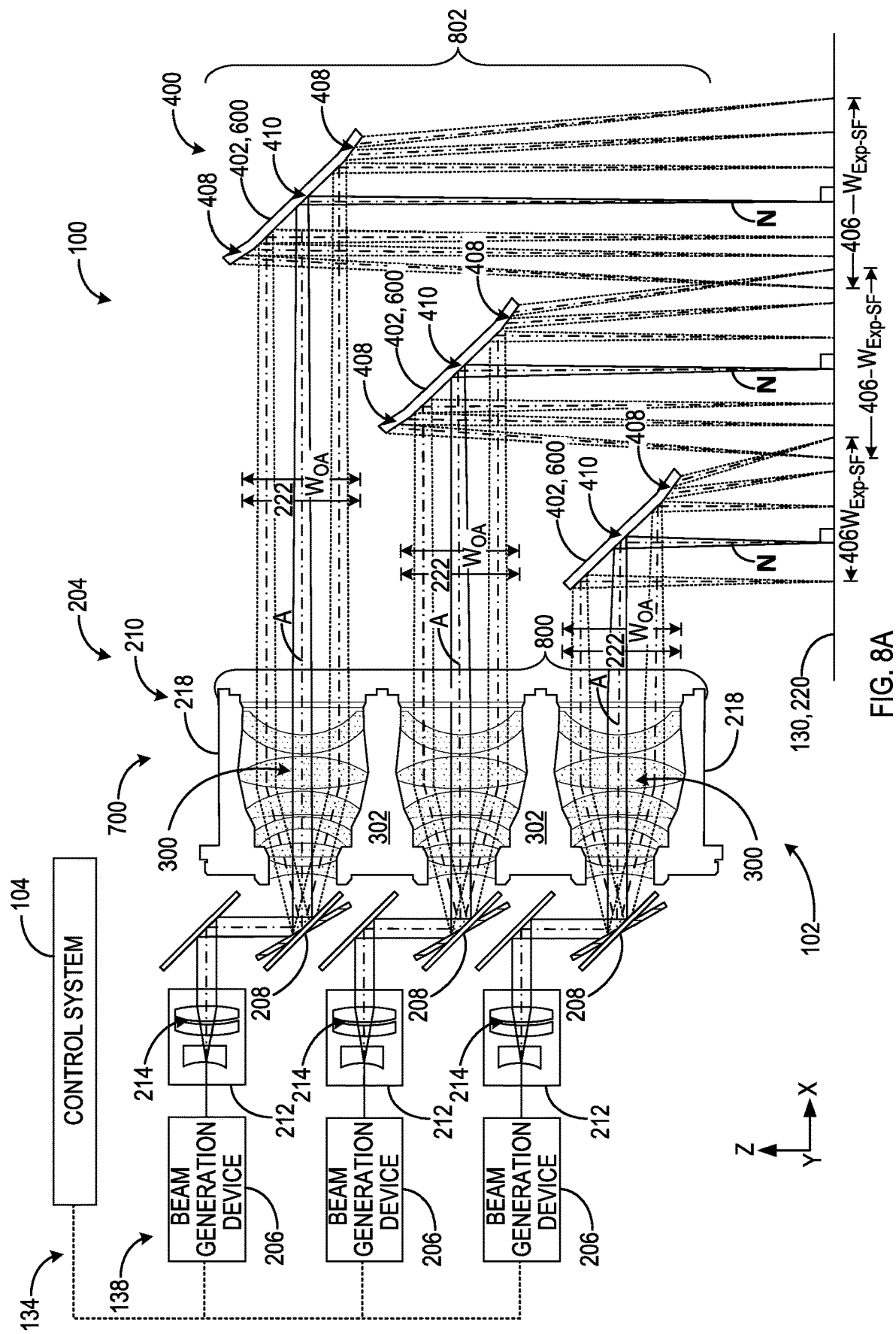
FIGS. 8A and 8B schematically depicts a side cross-sectional view of yet another exemplary energy beam system and/or optical system that includes a scan field expansion elements.
Figure 8B:
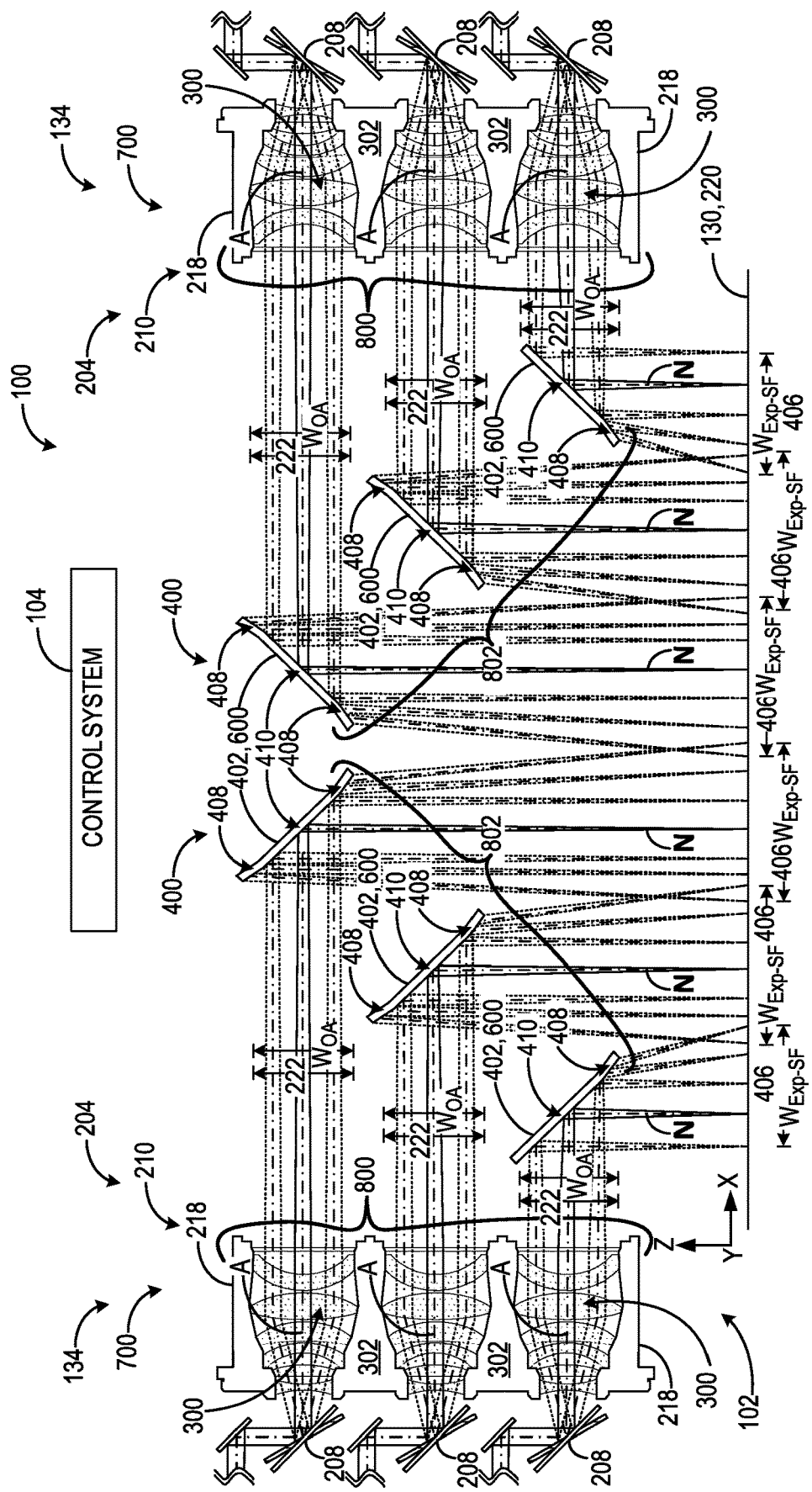

Referring now to FIG. 7 and FIGS. 8A and 8B, exemplary arrangements of optical assemblies 210 will be described. As shown in FIG. 7, in some embodiments, an energy beam system 134 and/or an optical system 204 may include an optical assembly group 700. An optical assembly group 700 may include a plurality of optical assemblies 210 and/or a plurality of scan field expansion assemblies 400. The plurality of optical assemblies 210 in an optical assembly group 700 may be oriented adjacent to one another. Additionally, or in the alternative, the plurality of scan field expansion assemblies 400 may be oriented adjacent to one another. A first optical assembly 210 may be oriented adjacent to a second optical assembly 210, and/or the first optical assembly 210 may be oriented opposite to a third optical assembly 210. Additionally, or in the alternative, a first scan field expansion assembly 400 may be oriented adjacent to a second scan field expansion assembly 400, and/or the first scan field expansion assembly 400 may be oriented opposite to a third scan field expansion assembly 400. The plurality of optical assemblies 210 may provide a plurality of overlapping expanded scan fields 406, for example, coinciding with a build plane 130 of an additive manufacturing machine 102. Respective overlapping expanded scan fields 406 may respectively correspond to a build plane region, such as a first build plane region 146, a second build plane region 152, and so forth, with the overlapping portion respectively providing an interlace region 154.

In some embodiments, as shown for example, in FIG. 7, a first optical assembly group 700 may be oriented opposite, such as laterally opposite, to a second optical assembly group 702. The first optical assembly group 700 may include a first plurality of optical assemblies 210 oriented adjacent, such as laterally adjacent, to one another, and/or a first plurality of scan field expansion assemblies 400 oriented adjacent, such as laterally adjacent, to one another. The second optical assembly group 702 may include a second plurality of optical assemblies 210 oriented adjacent, such as laterally adjacent, to one another, and/or a second plurality of scan field expansion assemblies 400 oriented adjacent, such as laterally adjacent, to one another. A third optical assembly group 704 may be oriented opposite, such as laterally opposite, to a fourth assembly group 706. The third optical assembly group 704 may include a third plurality of optical assemblies 210 oriented adjacent, such as laterally adjacent, to one another, and/or a third plurality of scan field expansion assemblies 400 oriented adjacent, such as laterally adjacent, to one another. The fourth optical assembly group 706 may include a fourth plurality of optical assemblies 210 oriented adjacent, such as laterally adjacent, to one another, and/or a fourth plurality of scan field expansion assemblies 400 oriented adjacent, such as laterally adjacent, to one another.

As shown for example in FIGS. 8A and 8B, in some embodiments, an optical assembly group 700 may include an optical assembly stack 800 and/or a scan field expansion assembly stack 802. An optical assembly stack 800 may include a plurality of optical assemblies 210 configured and arranged as a stack. Respective ones of the plurality of optical assemblies 210 of an optical assembly stack 800 may be stacked vertically relative to one another, such as in the z-direction. The plurality of optical assemblies 210 of an optical assembly stack 800 may be aligned with a common vertical axis, such as a z-axis, and/or the plurality of optical assemblies 210 of an optical assembly stack 800 may be laterally and/or horizontally offset from one another, such as in an x-direction and/or a y-direction. A scan field expansion assembly stack 802 may include a plurality of scan field expansion assemblies 400 configured and arranged as a stack. Respective ones of the plurality of scan field expansion assemblies 400 of a scan field expansion assembly stack 802 may be stacked vertically relative to one another, such as in the z-direction. The plurality of scan field expansion assemblies 400 of a scan field expansion assembly stack 802 may be aligned with a common vertical axis, such as a z-axis, and/or the plurality of scan field expansion assemblies 400 of a scan field expansion assembly stack 802 may be laterally and/or horizontally offset from one another, such as in an x-direction and/or a y-direction.

The plurality of scan field expansion assemblies 400 of a scan field expansion assembly stack 802 may be laterally offset from one another. The lateral offset between respective scan field expansion assemblies may be configured so as to allow a corresponding one or more field-expanding optical elements 402 to expand a plurality of scan fields 222 a corresponding plurality of expanded scan fields 406 oriented transverse to the plurality of scan fields 222. For example, a first scan field expansion assembly 400 of a scan field expansion assembly stack 802 may be located proximal, such as laterally or horizontally proximal, to the first optical assembly 210 of the corresponding optical assembly stack 800. A second scan field expansion assembly 400 of the scan field expansion assembly stack 802 may be located distal, such as laterally or horizontally distal, to a second optical assembly 210 of the optical assembly stack 800. A third scan field expansion assembly 400 of the scan field expansion assembly stack 802 may be interposed, such as laterally or horizontally interposed, between the first scan field expansion assembly 400 and the second scan field expansion assembly 400.

The first optical assembly 210 and the corresponding first scan field expansion assembly 400 may provide a first expanded scan field 406 located proximal, such as laterally or horizontally proximal, to the optical assembly stack 800. The second optical assembly 210 and the corresponding second scan field expansion assembly 400 may provide a second expanded scan field 406 located distal, such as laterally or horizontally distal, to the optical assembly stack 800. The third optical assembly 210 and the corresponding third scan field expansion assembly 400 may provide a third expanded scan field 406 interposed, such as laterally or horizontally interposed, between the first expanded scan field 406 and the second expanded scan field 406.

As shown in FIG. 8B, and with reference to FIG. 7, in some embodiments, an energy beam system 134 and/or an optical system 204 may include an optical assembly group 700 may include one or more optical assembly stacks 800 and/or one or more scan field expansion assembly stacks 802. A plurality of optical assembly stacks 800 in an optical assembly group 700 may be oriented adjacent to one another. Additionally, or in the alternative, a plurality of scan field expansion assembly stacks 802 may be oriented adjacent to one another. As shown in FIG. 8B, a first optical assembly group 700 may include a first one or more optical assembly stacks 800 and/or a first one or more scan field expansion assembly stacks 802. Also as shown, a second optical assembly group 702 may include a second one or more optical assembly stacks 800 and/or a second one or more scan field expansion assembly stacks 802.

The first one or more optical assembly stacks 800 and/or the first one or more scan field expansion assembly stacks 802 may be oriented opposite, such as laterally opposite, to the second one or more optical assembly stacks 800 and/or the second one or more scan field expansion assembly stacks 802. The plurality of optical assemblies 210 of a first optical assembly stack 800, and the corresponding plurality of scan field expansion assemblies 400 of a corresponding first scan field expansion assembly stack 802, may provide a plurality of first overlapping expanded scan fields 406, for example, coinciding with a build plane 130 of an additive manufacturing machine 102. Additionally, or in the alternative, the plurality of optical assemblies 210 of a second optical assembly stack 800, and the corresponding plurality of scan field expansion assemblies 400 of a corresponding second scan field expansion assembly stack 802, may provide a second plurality of overlapping expanded scan fields 406, for example, coinciding with a build plane 130 of an additive manufacturing machine 102. At least one of the expanded scan fields 406 corresponding to the first optical assembly stack 800 (and corresponding first scan field expansion assembly stack 802) may overlap with at least one of the expanded scan fields 406 corresponding to the second optical assembly stack 800 (and corresponding second scan field expansion assembly stack 802). Respective overlapping expanded scan fields 406 may respectively correspond to a build plane region, such as a first build plane region 146, a second build plane region 152, and so forth, with the overlapping portion respectively providing an interlace region 154.

Referring still to FIGS. 7 and 8B, in some embodiments, a first optical assembly group 700 may include a first optical assembly stack 800 (and corresponding first scan field expansion assembly stack 802) oriented opposite, such as laterally opposite, to a second optical assembly group 702 that includes a second optical assembly stack 800 (and corresponding second scan field expansion assembly stack 802). A third optical assembly group 704 may include a third optical assembly stack 800 (and corresponding third scan field expansion assembly stack 802) oriented opposite, such as laterally opposite, to a fourth optical assembly group 706 that includes a fourth optical assembly stack 800 (and corresponding fourth scan field expansion assembly stack 802).

In some embodiments, a plurality of optical assembly groups 700 may be configured and arranged so as to provide at least three expanded scan fields 406 oriented in a first direction and/or at least three expanded scan fields 406 oriented in a second direction. The second direction may be transverse to the first direction. The expanded scan fields 406 may provide an array of at least three (3) expanded scan fields 406 in the first direction by at least three (3) expanded scan fields in the second direction.

Figure 9A:
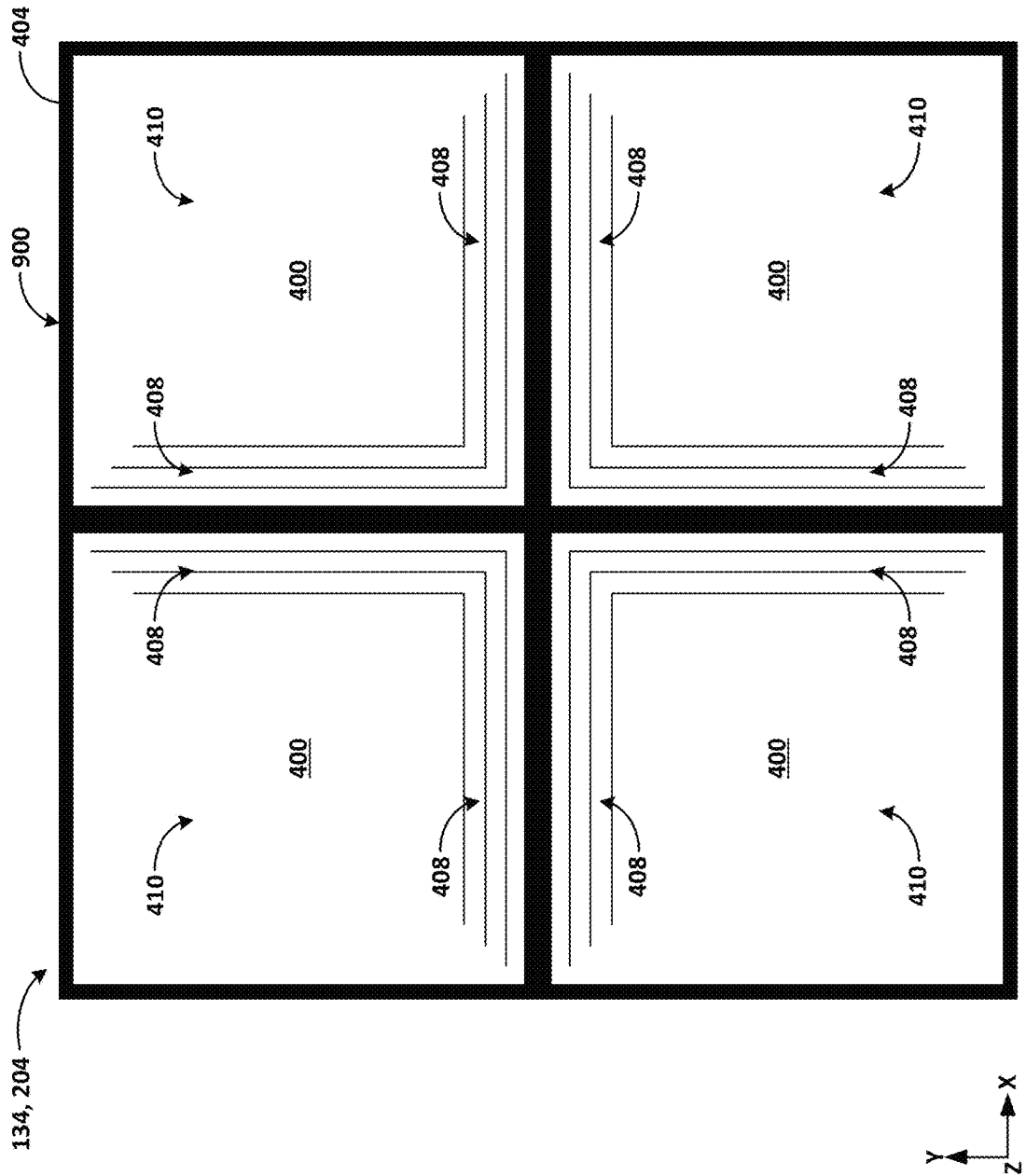
FIGS. 9A and 9B schematically depict facing views of exemplary scan field expansion arrays that respectively include a plurality of field-expanding optical elements.
Figure 9B:
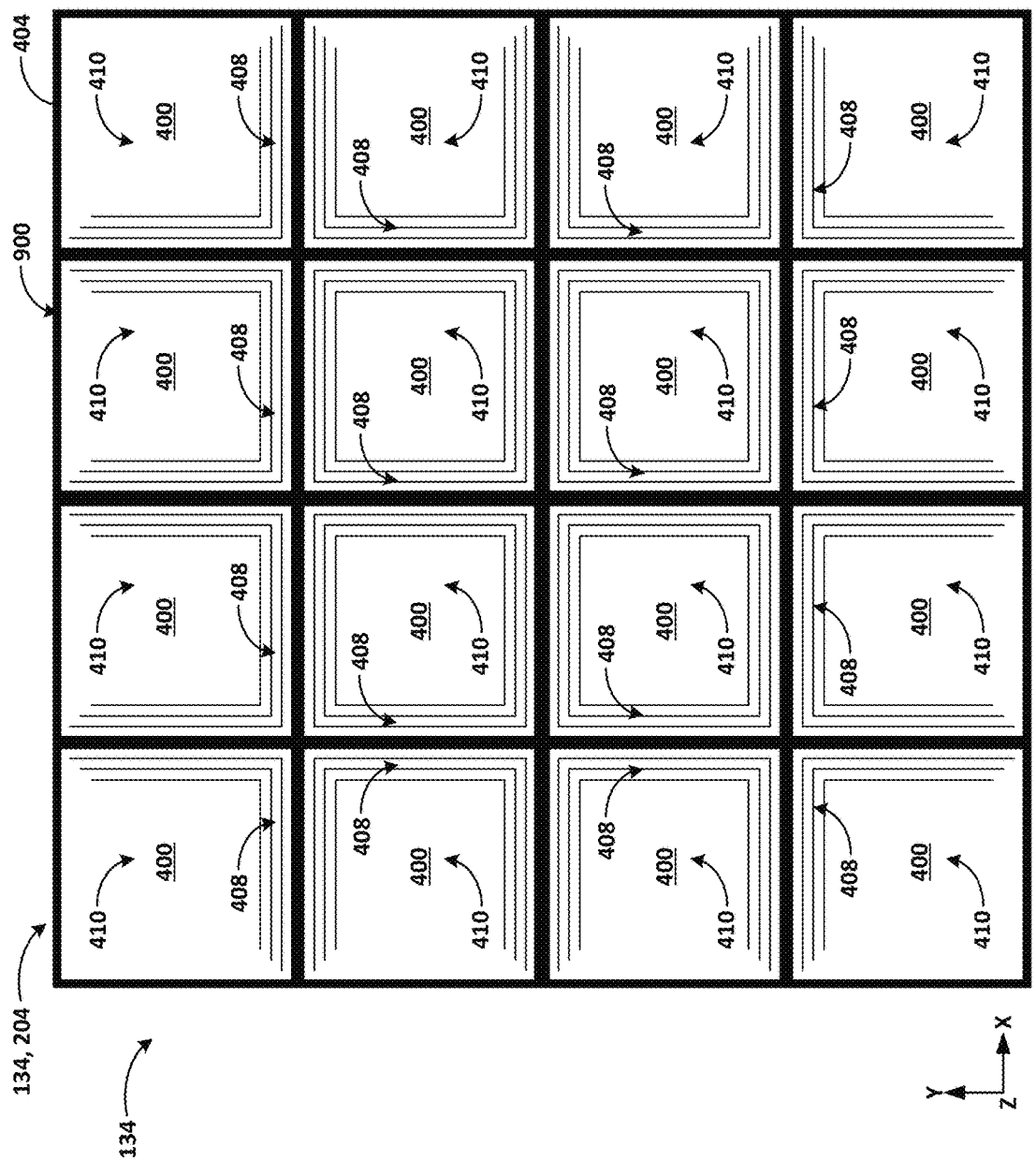
Figure 10:
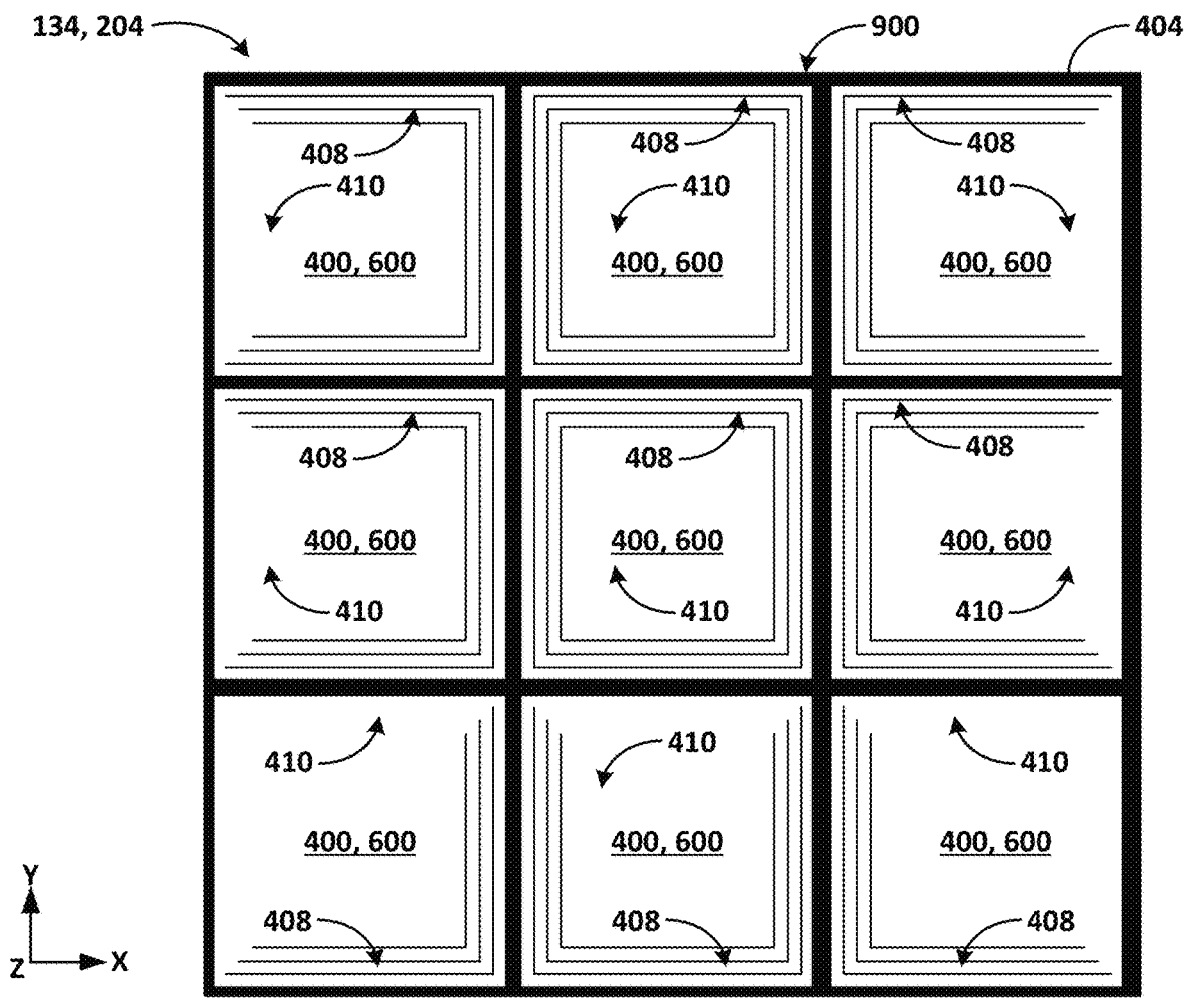
FIG. 10 schematically depicts a facing view of another exemplary scan field expansion array that includes a plurality of field-expanding optical elements.

Referring now to FIGS. 9A and 9B, and FIG. 10, exemplary scan field expansion arrays 900 will be further described. A scan field expansion array 900 may include a plurality of optical assemblies 210 and/or a plurality of scan field expansion assemblies 400. The scan field expansion array 900 may provide a focal plane 220 with a plurality of overlapping expanded scan fields 406 configured and arranged in accordance with the configuration and arrangement of the scan field expansion array 900. A scan field expansion array 900 may include any number of optical assemblies 210 and corresponding scan field expansion assemblies 400. In some embodiments, an exemplary scan field expansion array 900 may include an array of (X,Y) array units, where X is a whole number of at least 2, such as a whole number from 2 to 10, and Y is a whole number of at least 2, such as a whole number from 2 to 10. By way of example, an exemplary scan field expansion array 900 may include an array of (X,Y) array units, with a size of from (2,2) to (10,10), such as from (2,2) to (5,5), such as from (2,2) to (2,10), such as from (2,2) to (2,5).

FIG. 9A shows an exemplary scan field expansion array 900 that has a size of (2,2) units. The scan field expansion array 900 shown in FIG. 9A may correspond to the energy beam system 134 and/or the optical system 204 shown in FIG. 4A, FIG. 4B, FIG. 5A, FIG. 5B, FIG. 6, FIG. 7, FIG. 8A, and/or FIG. 8B. FIG. 9B shows another exemplary scan field expansion array 900 that has a size of (4,4) units. The scan field expansion array 900 shown in FIG. 9B may correspond to an energy beam system 134 and/or an optical system 204 that has one or more features described with reference to FIGS. 4A through 8B.

As shown in FIGS. 9A and 9B, respective scan field expansion assemblies 400 in a scan field expansion array 900 may include a plurality of field-expanding optical elements 402 that respectively have a field-expansion region 408 disposed about at least a portion of a perimeter of the field-expanding optical elements 402, such as the portion of the perimeter adjacent to an adjoining field-expanding optical elements 402 in the scan field expansion array 900. The plurality of field-expanding optical elements 402 may additionally include a telecentric region 410 at least partially surrounded by a corresponding field-expansion region 408. Additionally, or in the alternative, in some embodiments, respective scan field expansion assemblies 400 in a scan field expansion array 900 may include a plurality of field-expanding optical elements 402 that respectively have a telecentric region 410 disposed about at least a portion of a perimeter of the field-expanding optical elements 402, such as the portion of the perimeter adjacent to an external field-expansion housing 404. For example, the portion of the perimeter of a field-expanding optical element 402 adjacent to an intermediate field-expansion housing 412 may include a field-expansion region 408 and/or the portion of the perimeter of the field-expanding optical element 402 adjacent to an external field-expansion housing 404 may include a telecentric region 410.

As shown in FIG. 10, respective scan field expansion assemblies 400 in a scan field expansion array 900 may include a plurality of field-expanding mirror elements 600 that respectively have a field-expansion region 408 disposed about at least a portion of a perimeter of the field-expanding mirror elements 600, such as the portion of the perimeter adjacent to an adjoining field-expanding mirror elements 600 in the scan field expansion array 900. The plurality of field-expanding mirror elements 600 may additionally include a telecentric region 410 at least partially surrounded by a corresponding field-expansion region 408. Additionally, or in the alternative, in some embodiments, respective scan field expansion assemblies 400 in a scan field expansion array 900 may include a plurality of field-expanding mirror elements 600 that respectively have a telecentric region 410 disposed about at least a portion of a perimeter of the field-expanding optical elements 402, such as the portion of the perimeter adjacent to an external field-expansion housing 404. For example, the portion of the perimeter of a field-expanding mirror element 600 adjacent to an intermediate field-expansion housing 412 may include a field-expansion region 408 and/or the portion of the perimeter of the field-expanding mirror elements 600 adjacent to an external field-expansion housing 404 may include a telecentric region 410. Additionally, or in the alternative, as shown in FIG. 10, the portion of a perimeter of a field-expanding mirror element 600 adjacent to an intermediate field-expansion housing 412 may include a telecentric region 410. For example, the telecentric region 410 disposed about a portion of a perimeter of a field-expanding mirror element 600 adjacent to an intermediate field-expansion housing 412 may correspond to an external perimeter of a corresponding array of expanded scan fields 406, such as when the field-expanding mirror element 600 inverses an orientation of the nominal scan field 222 and/or an expanded scan field 406, such as shown in FIGS. 8A and 8B.

Now turning to FIGS. 11A and 11B, 11C and 11D, 11E and 11F, 11G and 11H, 11I and 11J, and 11K and 11L, 11M and 11N, and 11O and 11P, exemplary field-expanding optical elements 402 and/or field-orienting optical elements 500 will be described. The elements depicted in FIGS. 11A through 11P may respectively represent a field-expanding optical element 402, such as any one of those shown in any one of FIG. 4A through FIG. 10. Additionally, or in the alternative, the elements depicted in FIGS. 11A through 11P may respectively represent a field-orienting optical element 500, such as any one of those shown in any one of FIG. 4A through FIG. 1.

Figure 11C:
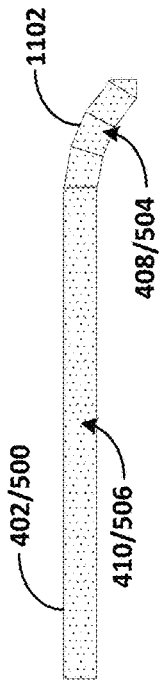
Figure 11D:
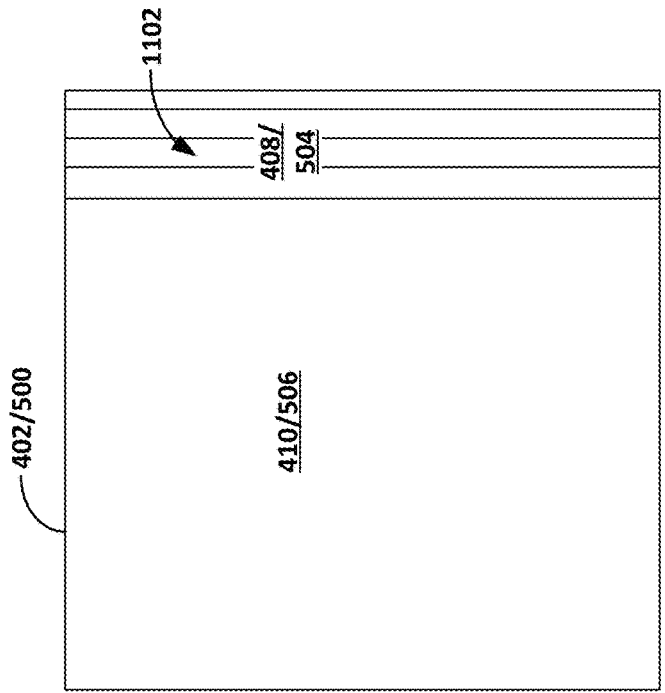
Figure 11A:
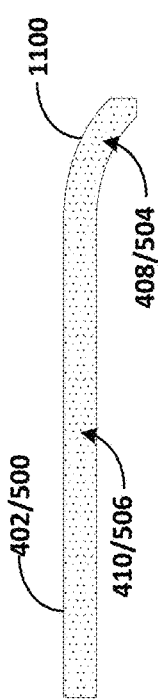
Figure 11B:
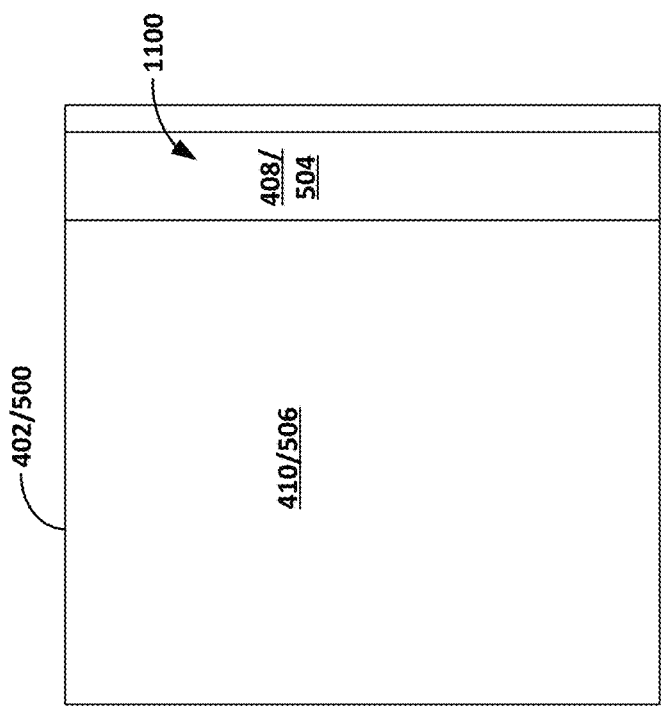
Figure 11K:
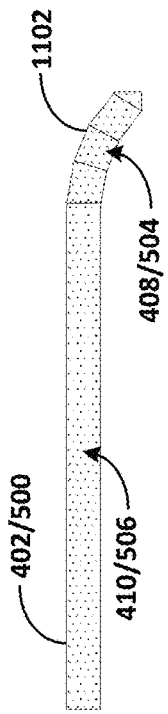
Figure 11L:
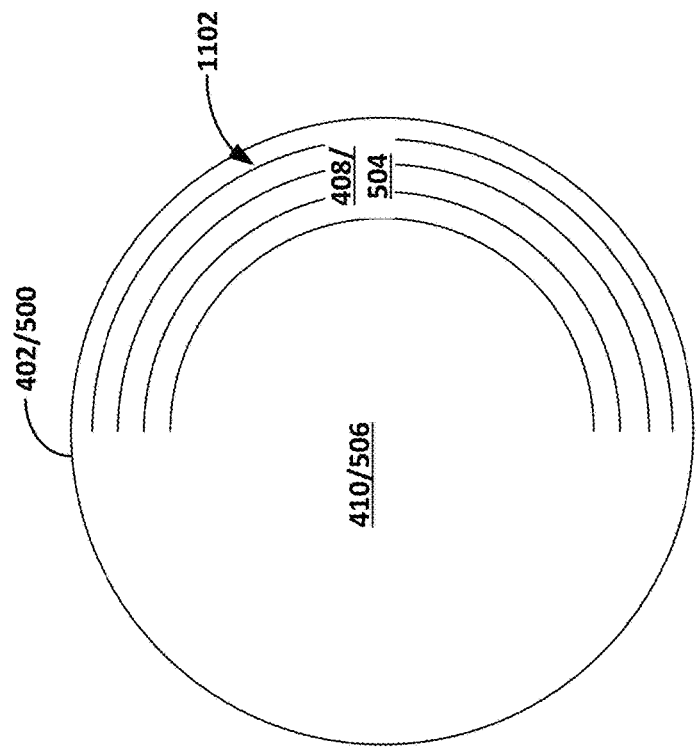

As shown, for example, in FIGS. 11A and 11B, a field-expanding optical element 402 may include a field-expansion region 408 disposed along a lateral portion of the field-expanding optical element 402. Additionally, or in the alternative, a field-orienting optical elements 500 may include a field-expansion region 408 disposed along a lateral portion of the field-orienting optical elements 500. As shown, for example, in FIGS. 11A and 11B, a field-expansion region 408 may include a curved portion 1100 corresponding to a desired amount of deflection, or reflection, to be imparted upon an energy beam incident upon the field-expansion region 408. As shown, for example, in FIGS. 11C and 11D, a field-expansion region 408 may include a plurality of facets 1102 respectively corresponding to a desired amount of deflection, or reflection, to be imparted upon an energy beam incident upon the field-expansion region 408.

As shown, for example, in FIGS. 11E and 11F, a field-expanding optical element 402 may include a first field-expansion region 408 disposed along a first lateral portion of the field-expanding optical element 402 and/or a second field-expansion region 408 disposed along a second lateral portion of the field-expanding optical element 402. Additionally, or in the alternative, a field-orienting optical elements 500 may include a first field-expansion region 408 disposed along a first lateral portion of the field-orienting optical elements 500, and/or a second field-expansion region 408 disposed along a second lateral portion of the field-orienting optical elements 500. As shown, for example, in FIGS. 11E and 11F, the first and second field-expansion region 408 may include a curved portion 1100 corresponding to a desired amount of deflection, or reflection, to be imparted upon an energy beam incident upon the respective field-expansion region 408. A first curved portion 1100 corresponding to a first field-expansion region 408 may differ from a second curved portion 1100 corresponding to a second field-expansion region 408. As shown, for example, in FIGS. 11G and 11H, the first and second field-expansion region 408 may include a plurality of facets 1102 respectively corresponding to a desired amount of deflection, or reflection, to be imparted upon an energy beam incident upon the respective field-expansion region 408. A first plurality of facets 1102 corresponding to a first field-expansion region 408 may differ from a second plurality of facets 1102 corresponding to a second field-expansion region 408.

Figure 11I:
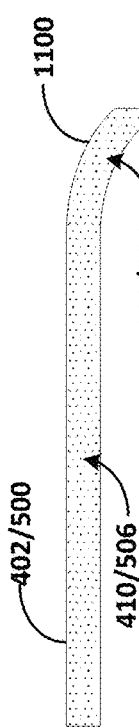
Figure 11J:
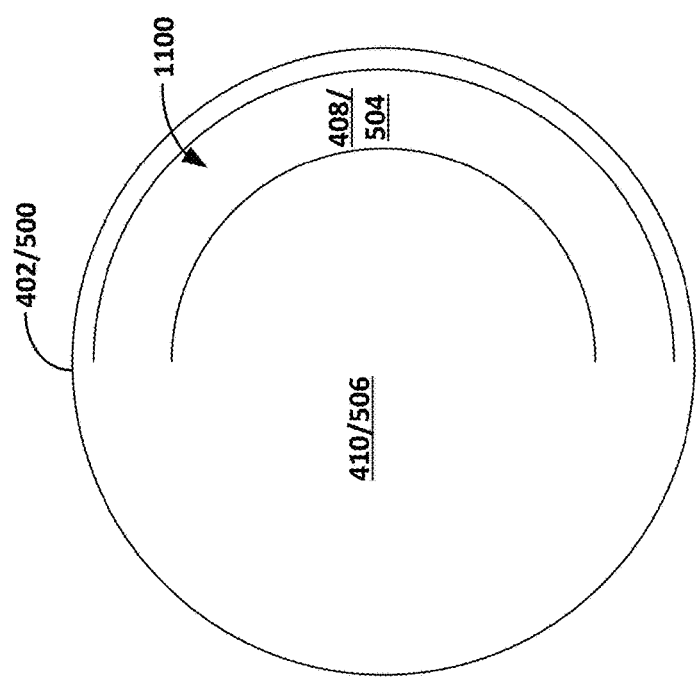

As shown, for example, in FIGS. 11I and 11J, a field-expanding optical element 402 may have a circular or oval cross-sectional profile, with a field-expansion region 408 disposed along at least a portion of the circumference of the field-expanding optical element 402. Additionally, or in the alternative, a field-orienting optical elements 500 may have a circular or oval cross-sectional profile, with a field-expansion region 408 disposed along at least a portion of the circumference of the field-orienting optical elements 500. As shown, for example, in FIGS. 11I and 11J, a field-expansion region 408 may include a curved portion 1100 disposed annularly about a field-expanding optical element 402 and/or a field-orienting optical elements 500. The curved portion 1100 may have a curvature corresponding to a desired amount of deflection, or reflection, to be imparted upon an energy beam incident upon the field-expansion region 408. As shown, for example, in FIGS. 11K and 11L, a field-expansion region 408 may include a plurality of facets 1102 disposed concentrically about at least a semi-annular portion of a field-expanding optical element 402 and/or a field-orienting optical elements 500. Respective ones of the plurality of facets 1102 may be configured and arranged to provide a desired amount of deflection, or reflection, to be imparted upon an energy beam incident upon the field-expansion region 408.

Figure 11M:
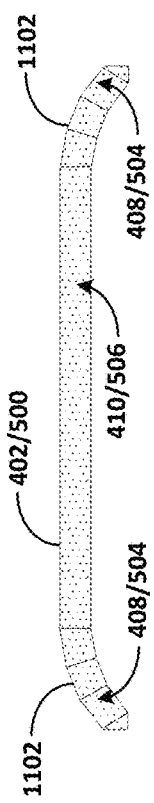
Figure 11O:
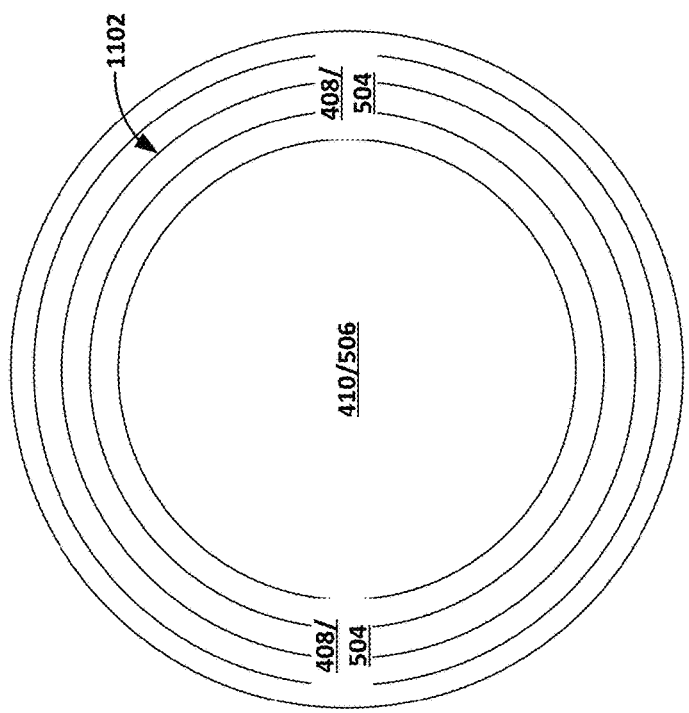
Figure 11N:
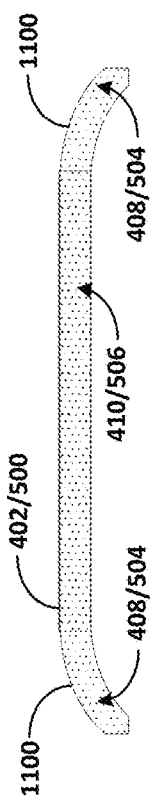
Figure 11P:
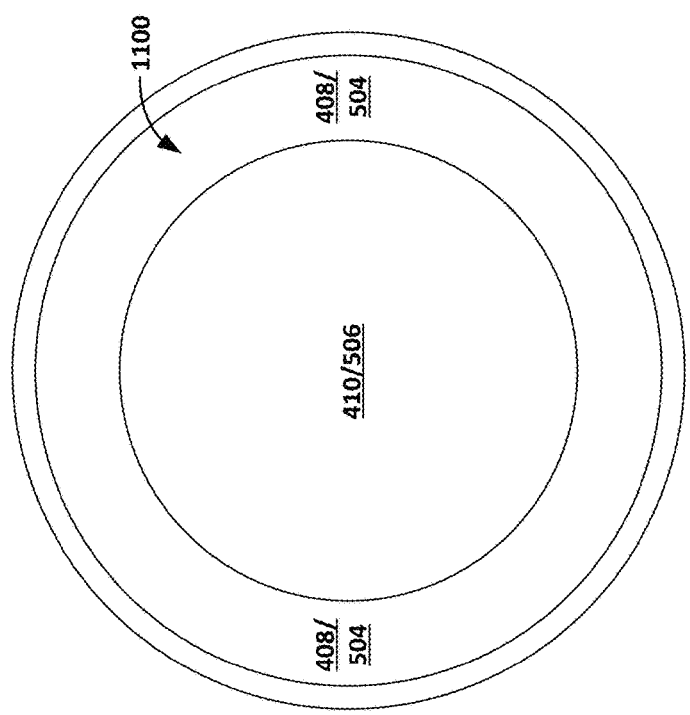

As shown, for example, in FIGS. 11M and 11N, a field-expanding optical element 402 may have a circular or oval cross-sectional profile, with a field-expansion region 408 disposed about the circumference of the field-expanding optical element 402. Additionally, or in the alternative, a field-orienting optical elements 500 may have a circular or oval cross-sectional profile, with a field-expansion region 408 disposed about the circumference of the field-orienting optical elements 500. As shown, for example, in FIGS. 11M and 11N, a field-expansion region 408 may include a curved portion 1100 disposed annularly about a field-expanding optical element 402 and/or a field-orienting optical elements 500. The curved portion 1100 may have a curvature corresponding to a desired amount of deflection, or reflection, to be imparted upon an energy beam incident upon the field-expansion region 408. As shown, for example, in FIGS. 11O and 11P, a field-expansion region 408 may include a plurality of facets 1102 disposed concentrically about an annular portion of a field-expanding optical element 402 and/or a field-orienting optical elements 500. Respective ones of the plurality of facets 1102 may be configured and arranged to provide a desired amount of deflection, or reflection, to be imparted upon an energy beam incident upon the field-expansion region 408.

Now turning to FIG. 12, and exemplary control system 104 will be described. In some embodiments, a control system 104 may be configured to perform one or more control operations. A control system 104 may be configured to output one or more control commands associated with an additive manufacturing machine 102. The control commands may include control commands configured to control one or more controllable components of an energy beam system 134 and/or one or more controllable components of an optical system 204 in accordance with the present disclosure. For example, one or more control commands may be configured to control operation of a beam generation device 206, one or more operations of a scanner 208, and/or one or more operations of a beam condition 212, such as one or more operations of a beam expander 214.

Figure 12:
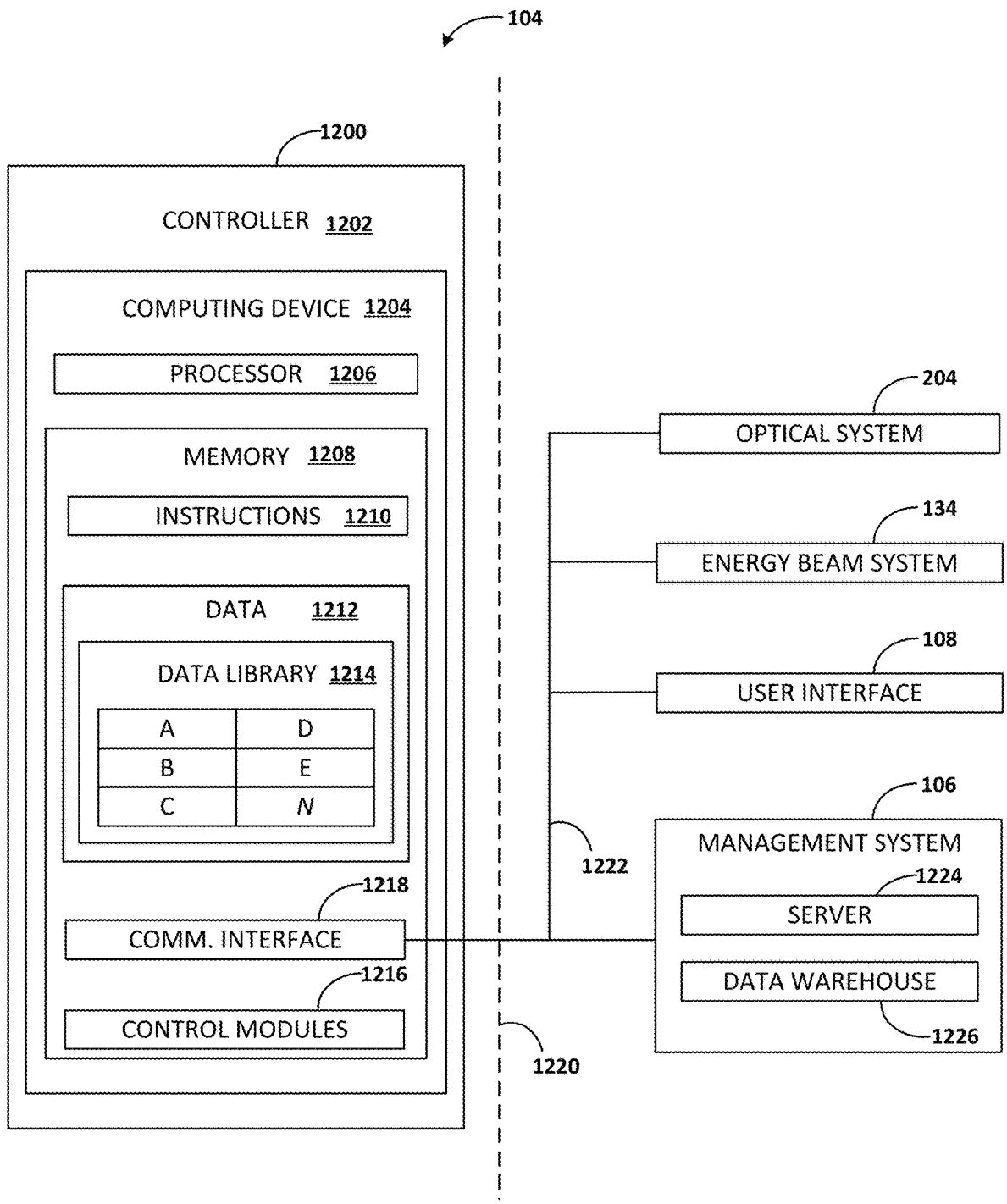
FIG. 12 schematically depicts an exemplary control system.

As shown in FIG. 12, an exemplary control system 104 includes a controller 1200 configured to control one or more irradiation parameters associated with an additive manufacturing machine 102. The controller 1200 may be communicatively coupled with an additive manufacturing machine 102. In some embodiments, the controller 1200 may be communicatively coupled with one or more components of an additive manufacturing machine 102, such as an energy beam system 134 and/or an imaging system 162. The controller 1200 may also be communicatively coupled with a management system 106 and/or a user interface 108.

The controller 1200 may include one or more computing devices 1202, which may be located locally or remotely relative to the additive manufacturing machine 102 and/or a calibration system 250. The one or more computing devices 1202 may include one or more processors 1204 and one or more memory devices 1206. The one or more processors 1204 may include any suitable processing device, such as a microprocessor, microcontroller, integrated circuit, logic device, and/or other suitable processing device. The one or more memory devices 1206 may include one or more computer-readable media, including but not limited to non-transitory computer-readable media, RAM, ROM, hard drives, flash drives, and/or other memory devices 1206.

The one or more memory devices 1206 may store information accessible by the one or more processors 1204, including computer-executable instructions 1208 that can be executed by the one or more processors 1204. The instructions 1208 may include any set of instructions which when executed by the one or more processors 1204 cause the one or more processors 1204 to perform operations, including calibration operations and/or additive manufacturing operations. Such calibration operations may include calibrating a coordinate system and/or one or more moveable components as described herein. For example, a calibration operation may include aligning a coordinate system and/or one or more moveable components associated with a first beam generation device 206, such as a first irradiation device 138, with a coordinate system and/or one or more moveable components associated with a second beam generation device 206, such as a second irradiation device 140. Additive manufacturing operations may include controlling and/or monitoring additive manufacturing operations.

The memory devices 1206 may store data 1210 accessible by the one or more processors 1204. The data 1210 can include current or real-time data 1210, past data 1210, or a combination thereof. The data 1210 may be stored in a data library 1212. As examples, the data 1210 may include data 1210 associated with or generated by an additive manufacturing system 100 and/or an additive manufacturing machine 102, including data 1210 associated with or generated by the controller 1200, an additive manufacturing machine 102, an energy beam system 134, an imaging system 162, a management system 106, a user interface 108, and/or a computing device 1202. Such data 1210 may pertain to operation of an energy beam system 134 and/or an optical system 204 in accordance with the present disclosure. The data 1210 may also include other data sets, parameters, outputs, information, associated with an additive manufacturing system 100 and/or an additive manufacturing machine 102.

The controller 1200 may be configured to perform one or more control operations in accordance with a control module 1216. The control module 1216 may include control logic executable to provide control commands configured to control one or more controllable components of an energy beam system 134 and/or one or more controllable components of an optical system 204 in accordance with the present disclosure. For example, a control module 1216 may be configured to provide one or more control commands executable to control operation of a beam generation device 206, one or more operations of a scanner 208, and/or one or more operations of a beam condition 212, such as one or more operations of a beam expander 214.

The one or more computing devices 1202 may also include a communication interface 1218, which may be used for communications with a communication network 1220 via wired or wireless communication lines 1222. The communication interface 1218 may include any suitable components for interfacing with one or more network(s), including for example, transmitters, receivers, ports, controllers, antennas, and/or other suitable components. The communication interface 1218 may allow the computing device 1202 to communicate with various nodes on the communication network 1220, such as nodes associated with the additive manufacturing machine 102, the energy beam system 134, the imaging system 162, the management system 106, and/or a user interface 108. The communication network 1220 may include, for example, a local area network (LAN), a wide area network (WAN), SATCOM network, VHF network, a HF network, a Wi-Fi network, a WiMAX network, a gatelink network, and/or any other suitable communication network 1220 for transmitting messages to and/or from the controller 1200 across the communication lines 1222. The communication lines 1222 of communication network 1220 may include a data bus or a combination of wired and/or wireless communication links.

The communication interface 1218 may allow the computing device 1202 to communicate with various components of an additive manufacturing system 100 and/or an additive manufacturing machine 102 communicatively coupled with the communication interface 1218 and/or communicatively coupled with one another, including an energy beam system 134 and/or an imaging system 162. The communication interface 1218 may additionally or alternatively allow the computing device 1202 to communicate with the management system 106 and/or the user interface 108. The management system 106 may include a server 1224 and/or a data warehouse 1226. As an example, at least a portion of the data 1210 may be stored in the data warehouse 1226, and the server 1224 may be configured to transmit data 1210 from the data warehouse 1226 to the computing device 1202, and/or to receive data 1210 from the computing device 1202 and to store the received data 1210 in the data warehouse 1226 for further purposes. The server 1224 and/or the data warehouse 1226 may be implemented as part of a control system 104 and/or as part of the management system 106.

Figure 13:
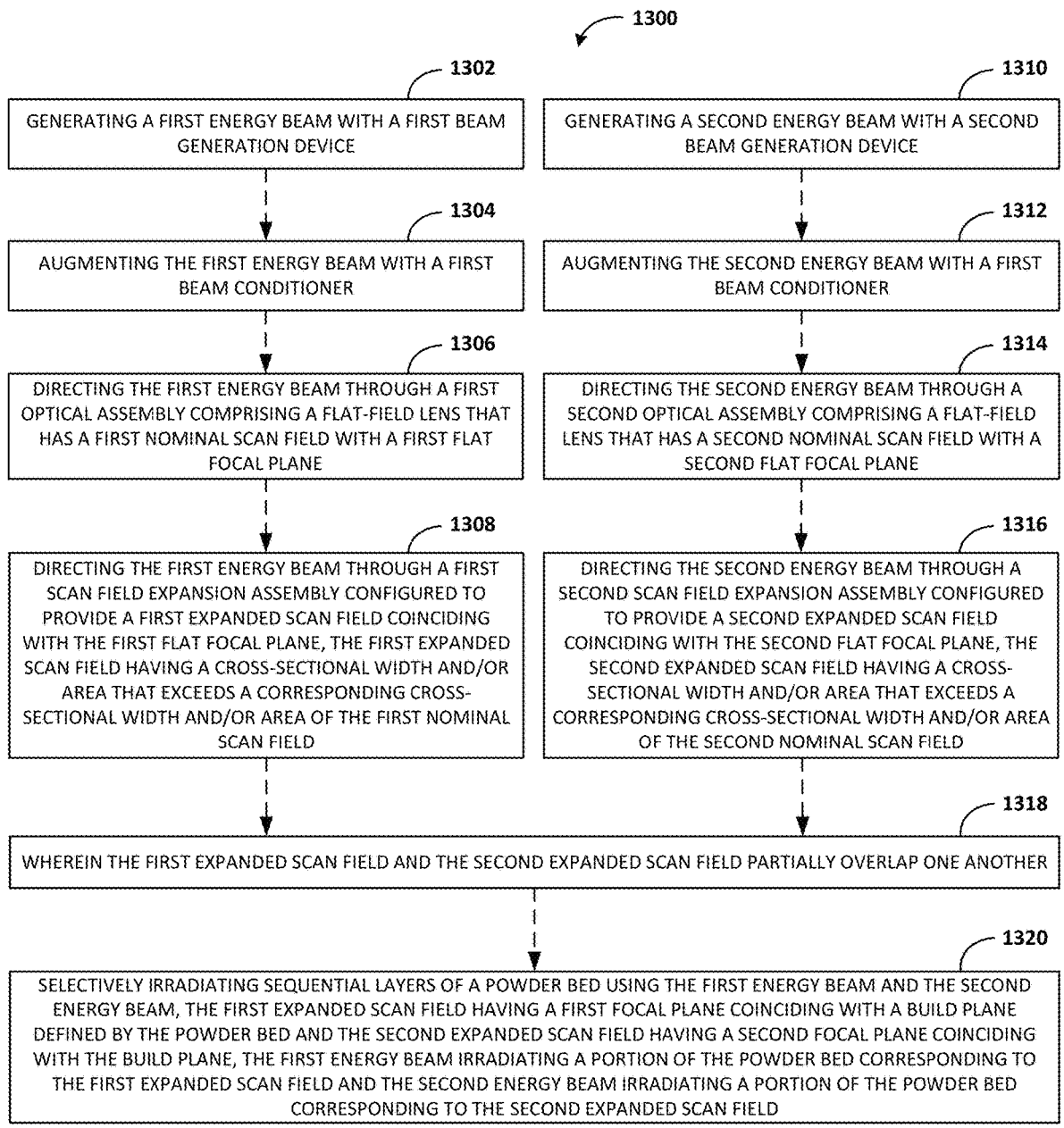
FIG. 13 shows a flow chart depicting an exemplary method of projecting one or more energy beams upon a surface.

Now turning to FIG. 13, exemplary methods 1300 of providing an expanded a scan field 406 for an energy beam 202 will be described, including exemplary methods 1300 of additively manufacturing a three-dimensional object 114 using one or more energy beams 202 with an expanded scan field 406. As shown in FIG. 13, an exemplary method 1300 may include, at block 1302, generating a first energy beam 202 with a first beam generation device 206. The first beam generation device 206 may be associated with an energy beam system 134 and/or an optical system 204. For example, the first beam generation device 206 may define at least a portion of a first irradiation device 138. In some embodiments, an exemplary method 1300 may include, at block 1304, augmenting the first energy beam 202 with a first beam conditioner 212. For example, the first beam conditioner 212 may be configured to focus, collimate, expand, diffract, shape and/or filter the first energy beam 202 emitted from the first beam generation device 206. In some embodiments, the first beam conditioner 212 may include a beam expander 214.

An exemplary method 1300 may include, at block 1306, directing the first energy beam 202 through a first optical assembly 210. The first optical assembly 210 may include, or may be configured as, a flat-field lens 216, such as an f-theta lens 250, an f-tan-theta lens, and/or a telecentric lens 300. The flat-field lens 216 may have a first nominal scan field 222 with a first flat focal plane 220. At block 1308, an exemplary method 1300 may include directing the first energy beam 202 through a first scan field expansion assembly 400 configured to provide a first expanded scan field 406 coinciding with the first flat focal plane 220. The first expanded scan field 406 may have a cross-sectional width and/or area ($W_{Exp-SF}$) that exceeds a corresponding cross-sectional width and/or area ($W_{SF}$) of the first nominal scan field 222. The first scan field expansion assembly 400 may include one or more field-expanding optical elements 402, such as one or more lenses 216 or other optical elements. In some embodiments, the one or more field-expanding optical elements 402 may include, or may be configured as, one or more field-expanding mirror elements 600.

In some embodiments, an exemplary method 1300 may additionally or alternatively include, at block 1310, generating a second energy beam 202 with a second beam generation device 206. The second beam generation device 206 may be associated with an energy beam system 134 and/or an optical system 204. For example, the second beam generation device 206 may define at least a portion of a second irradiation device 140. In some embodiments, an exemplary method 1300 may include, at block 1312, augmenting the second energy beam 202 with a first beam conditioner 212. For example, the second beam conditioner 212 may be configured to focus, collimate, expand, diffract, shape and/or filter the second energy beam 202 emitted from the second beam generation device 206. In some embodiments, the second beam conditioner 212 may include a beam expander 214.

An exemplary method 1300 may include, at block 1314, directing the second energy beam 202 through a second optical assembly 210. The second optical assembly 210 may include, or may be configured as, a flat-field lens 216, such as an f-theta lens 250, an f-tan-theta lens, and/or a telecentric lens 300. The flat-field lens 216 may have a second nominal scan field 222 with a second flat focal plane 220. At block 1316, an exemplary method 1300 may include directing the second energy beam 202 through a second scan field expansion assembly 400 configured to provide a second expanded scan field 406 coinciding with the second flat focal plane 220. The second expanded scan field 46 may have a cross-sectional width and/or area ($W_{Exp\text{-}SF}$) that exceeds a corresponding cross-sectional width and/or area ($W_{SF}$) of the second nominal scan field 222. The second scan field expansion assembly 400 may include one or more field-expanding optical elements 402, such as one or more lenses 216 or other optical elements. In some embodiments, the one or more field-expanding optical elements 402 may include, or may be configured as, one or more field-expanding mirror elements 600.

In some embodiments, as shown at block 1318, an exemplary method 1300 may provide a first expanded scan field 406 and a second expanded scan field 406 that partially overlap one another. The overlapping scan fields 406 may provide an interlace region 154. For example, the first expanded scan field 406 may correspond to a first build plane region 146 and the second expanded scan field 406 may correspond to a second build plane region 152, with the overlapping portion of the first and second build plane regions 146, 152 providing an interlace region 154.

Additionally, or in the alternative, an exemplary method 1300 may include, at block 1320, selectively irradiating sequential layers of a powder bed 136 using the first energy beam 202 and the second energy beam 202. The first expanded scan field 406 may have a first focal plane 220 coinciding with a build plane 130 defined by the powder bed 136 and the second expanded scan field 406 may have a second focal plane 220 coinciding with the build plane 130. The first energy beam 202 may be utilized to irradiate a portion of the powder bed 136 corresponding to the first expanded scan field 406 and the second energy beam 202 may be utilized to irradiate a portion of the powder bed 136 corresponding to the second expanded scan field 406. In some embodiments the first energy beam 202 and/or the second energy beam 202 may be utilized to irradiate a portion of the powder bed 136 corresponding to an interlace region 154.

Further aspects of the invention are provided by the subject matter of the following clauses and/or any combination of one or more thereof:

1. An optical system for an apparatus for additively manufacturing three-dimensional objects, the optical system comprising: a first optical assembly comprising or configured as a first flat-field lens, the first flat-field lens having a first nominal scan field with a first flat focal plane; and a first scan field expansion assembly comprising one or more first field-expanding optical elements configured to provide a first expanded scan field coinciding with the first flat focal plane; wherein the first expanded scan field has a cross-sectional width and/or area that exceeds a corresponding cross-sectional width and/or area of the first nominal scan field.

2. The optical system of any preceding clause, comprising: a second optical assembly comprising or configured as a second flat-field lens, the second flat-field lens having a second nominal scan field with a second flat focal plane; and a second scan field expansion assembly comprising one or more second field-expanding optical elements configured to provide a second expanded scan field coinciding with the second flat focal plane; wherein the second expanded scan field has a cross-sectional width and/or area that exceeds a corresponding cross-sectional width and/or area of the second nominal scan field; and wherein the first expanded scan field and the second expanded scan field partially overlap one another.

3. The optical system of any preceding clause, comprising: a first beam generation device configured to generate the first energy beam, and a second beam generation device configured to generate the second energy beam; wherein the optical assembly is configured to irradiate sequential layers of a powder bed using the first energy beam and the second energy beam; and wherein the powder bed defines a build plane, and wherein the first expanded scan field has a first focal plane coinciding with the build plane and the second expanded scan field has a second focal plane coinciding with the build plane.

4. The optical system of any preceding clause, comprising: the first scan field expansion assembly being configured and arranged relative to the powder bed to irradiate a first portion of the powder bed corresponding to the first expanded scan field using the first energy beam; the second scan field expansion assembly being configured and arranged relative to the powder bed to irradiate a second portion of the powder bed corresponding to the second expanded scan field using the second energy beam; and the first scan field expansion assembly and the second scan field expansion assembly being configured and arranged relative to the powder bed to irradiate an interlace region of the powder bed using the first energy beam and/or the second energy beam, the interlace region corresponding to a portion of the first expanded scan field and a portion of the second expanded scan field that overlap one another.

5. The optical system of any preceding clause, wherein the first flat-field lens comprises: an f-theta lens, an f-tan-theta lens, and/or a telecentric lens; and/or wherein the second flat-field lens comprises: an f-theta lens, an f-tan-theta lens, and/or a telecentric lens.

6. The optical system of any preceding clause, wherein the first expanded scan field exhibits telecentricity, and/or wherein the second expanded scan field exhibits telecentricity.

7. The optical system of any preceding clause, wherein the first scan field expansion assembly comprises: one or more first field-orienting optical elements configured to orient the first energy beam exiting the first scan field expansion assembly to a first orientation parallel to a first optical axis of the first optical assembly; and/or wherein the second scan field expansion assembly comprises: one or more second field-orienting optical elements configured to orient the second energy beam exiting the second scan field expansion assembly to a second orientation parallel to a second optical axis of the second optical assembly.

8. The optical system of any preceding clause, wherein the one or more first field-expanding optical elements comprises: one or more first lenses and/or one or more first field-expanding mirror elements; and/or wherein the one or more second field-expanding optical elements comprises: one or more second lenses and/or one or more second field-expanding mirror elements.

9. The optical system of any preceding clause, comprising: a first beam conditioner configured to augment the first energy beam, wherein the first beam conditioner comprises a first beam expander; and/or a second beam conditioner configured to augment the second energy beam, wherein the second beam conditioner comprises a second beam expander.

10. The optical system of any preceding clause, wherein the first optical assembly and the second optical assembly define a portion of a scan field expansion array comprising a plurality of optical assemblies and a plurality of scan field expansion assemblies, the scan field expansion array providing a focal plane with a plurality of overlapping expanded scan fields; wherein the scan field expansion array comprises an array of (X,Y) array units, where X is a whole number from 2 to 10 and Y is a whole number from 2 to 10 By way of example, an exemplary scan field expansion array 900 may include an array of (X,Y) array units, with a size of from (2,2) to (10,10), such as from (2,2) to (5,5), such as from (2,2) to (2,10), such as from (2,2) to (2,5).

11. A method of additively manufacturing a three-dimensional object, the method comprising: directing a first energy beam through a first optical assembly comprising or configured as a first flat-field lens, the first flat-field lens having a first nominal scan field with a first flat focal plane; and directing the first energy beam through a first scan field expansion assembly comprising one or more first field-expanding optical elements configured to provide a first expanded scan field coinciding with the first flat focal plane; wherein the first expanded scan field has a cross-sectional width and/or area that exceeds a corresponding cross-sectional width and/or area of the first nominal scan field.

12. The method of any preceding clause, comprising: directing a second energy beam through a second optical assembly comprising or configured as a second flat-field lens, the second flat-field lens having a second nominal scan field with a second flat focal plane; and directing the second energy beam through a second scan field expansion assembly comprising one or more second field-expanding optical elements configured to provide a second expanded scan field coinciding with the second flat focal plane; wherein the second expanded scan field has a cross-sectional width and/or area that exceeds a corresponding cross-sectional width and/or area of the second nominal scan field; and wherein the first expanded scan field and the second expanded scan field partially overlap one another.

13. The method of any preceding clause, comprising: irradiating sequential layers of a powder bed using the first energy beam and the second energy beam; wherein the powder bed defines a build plane, and wherein the first expanded scan field has a first focal plane coinciding with the build plane and the second expanded scan field has a second focal plane coinciding with the build plane.

14. The method of any preceding clause, comprising: irradiating a first portion of the powder bed corresponding to the first expanded scan field using the first energy beam; irradiating a second portion of the powder bed corresponding to the second expanded scan field using the second energy beam; and irradiating an interlace region of the powder bed using the first energy beam and/or the second energy beam, the interlace region corresponding to a portion of the first expanded scan field and a portion of the second expanded scan field that overlap one another.

15. The method of any preceding clause, wherein the first flat-field lens comprises: an f-theta lens, an f-tan-theta lens, and/or a telecentric lens; and/or wherein the second flat-field lens comprises: an f-theta lens, an f-tan-theta lens, and/or a telecentric lens.

16. The method of any preceding clause, wherein the first expanded scan field exhibits telecentricity, and/or wherein the second expanded scan field exhibits telecentricity.

17. The method of any preceding clause, wherein the first scan field expansion assembly comprises: one or more first field-orienting optical elements configured to orient the first energy beam exiting the first scan field expansion assembly to a first orientation parallel to a first optical axis of the first optical assembly; and/or wherein the second scan field expansion assembly comprises: one or more second field-orienting optical elements configured to orient the second energy beam exiting the second scan field expansion assembly to a second orientation parallel to a second optical axis of the second optical assembly.

18. The method of any preceding clause, wherein the one or more first field-expanding optical elements comprises one or more first lenses and/or one or more first field-expanding mirror elements; and/or wherein the one or more second field-expanding optical elements comprises one or more second lenses and/or one or more second field-expanding mirror elements.

19. The method of any preceding clause, comprising: generating the first energy beam with a first beam generation device, and augmenting the first energy beam with a first beam conditioner, wherein the first beam conditioner comprises a first beam expander; and generating the second energy beam with a second beam generation device, and augmenting the second energy beam with a second beam conditioner, wherein the second beam conditioner comprises a second beam expander.

20. The method of any preceding clause, wherein the method is performed using the apparatus of any preceding clause.

21. The apparatus of any preceding clause, wherein the apparatus is configured to perform the method of any preceding clause.

22. A computer-readable medium comprising computer-executable instructions, which when executed by a processor associated with an additive manufacturing machine or system, cause the additive manufacturing machine or system to perform a method, the method comprising: directing a first energy beam through a first optical assembly comprising or configured as a first flat-field lens, the first flat-field lens having a first nominal scan field with a first flat focal plane; and directing the first energy beam through a first scan field expansion assembly comprising one or more first field-expanding optical elements configured to provide a first expanded scan field coinciding with the first flat focal plane; wherein the additive manufacturing machine or system comprises the first optical assembly and the first scan field expansion assembly; and wherein the first expanded scan field has a cross-sectional width and/or area that exceeds a corresponding cross-sectional width and/or area of the first nominal scan field.

23. The computer-readable medium of any preceding clause, wherein the computer-readable medium is executed by a processor associated with the apparatus of any preceding clause.

24. The computer-readable medium of any preceding clause, which when executed by a processor associated with an additive manufacturing machine or system, cause the additive manufacturing machine or system to perform the method of any preceding clause.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An optical system for an apparatus for additively manufacturing three-dimensional objects, the optical system comprising:
a first optical assembly comprising or configured as a first flat-field lens, the first flat-field lens having a first nominal scan field with a first flat focal plane;
a first scan field expansion assembly comprising one or more first field-expanding optical elements, the one or more first field-expanding optical elements secured to a field-expansion housing and having a flat portion and a curved portion at radially different regions;
a beam generation device configured to generate an energy beam;
a scanner arranged proximal to the beam generation device, the scanner directing the energy beam received from the beam generation device at a first angle onto the flat portion and the curved portion of the one or more first field-expanding optical elements at a different, second angle, the curved portion configured to expand the first nominal scan field to a first expanded scan field coinciding with the first flat focal plane,
wherein the first expanded scan field has a cross-sectional width and/or area that exceeds a corresponding cross-sectional width and/or area of the first nominal scan field.

2. The optical system of claim 1, comprising:
a second optical assembly comprising or configured as a second flat-field lens, the second flat-field lens having a second nominal scan field with a second flat focal plane; and
a second scan field expansion assembly comprising one or more second field-expanding optical elements configured to provide a second expanded scan field coinciding with the second flat focal plane, and
wherein the second expanded scan field has a cross-sectional width and/or area that exceeds a corresponding cross-sectional width and/or area of the second nominal scan field, and
wherein the first expanded scan field and the second expanded scan field partially overlap one another.

3. The optical system of claim 2, wherein the beam generation device is a first beam generation device and the energy beam is a first energy beam, the optical system further comprising a second beam generation device configured to generate a second energy beam,
wherein the optical assembly's configured to irradiate sequential layers of a powder bed using the first energy beam and the second energy beam,
wherein the powder bed defines a build plane, and
wherein the first expanded scan field has a first focal plane coinciding with the build plane and the second expanded scan field has a second focal plane coinciding with the build plane.

4. The optical system of claim 3, wherein the first scan field expansion assembly is configured and arranged relative to the powder bed to irradiate a first portion of the powder bed corresponding to the first expanded scan field using the first energy beam,
wherein the second scan field expansion assembly is configured and arranged relative to the powder bed to irradiate a second portion of the powder bed corresponding to the second expanded scan field using the second energy beam, and
wherein the first scan field expansion assembly and the second scan field expansion assembly are configured and arranged relative to the powder bed to irradiate an interlace region of the powder bed using the first energy beam and/or the second energy beam, the interlace region corresponding to a portion of the first expanded scan field and a portion of the second expanded scan field that overlap one another.

5. The optical system of claim 2, wherein the first flat-field lens comprises: an f-theta lens, an f-tan-theta lens, and/or a telecentric lens; and/or
wherein the second flat-field lens comprises: an f-theta lens, an f-tan-theta lens, and/or a telecentric lens.

6. The optical system of claim 2, wherein the first expanded scan field exhibits telecentricity across substantially an entirety of the first expanded scan field, and/or wherein the second expanded scan field exhibits telecentricity across substantially an entirety of the second expanded scan field.

7. The optical system of claim 2, wherein the first scan field expansion assembly comprises: one or more first field-orienting optical elements configured to orient the first energy beam exiting the first scan field expansion assembly to a first orientation parallel to a first optical axis of the first optical assembly; and/or
wherein the second scan field expansion assembly comprises: one or more second field-orienting optical elements configured to orient a second energy beam exiting the second scan field expansion assembly to a second orientation parallel to a second optical axis of the second optical assembly.

8. The optical system of claim 2, wherein the one or more first field-expanding optical elements comprises: one or more first lenses and/or one or more first field-expanding mirror elements; and/or
wherein the one or more second field-expanding optical elements comprises: one or more second lenses and/or one or more second field-expanding mirror elements.

9. The optical system of claim 2, comprising:
a first beam conditioner configured to augment the first energy beam, wherein the first beam conditioner comprises a first beam expander; and/or
a second beam conditioner configured to augment a second energy beam, wherein the second beam conditioner comprises a second beam expander.

10. The optical system of claim 2, wherein the first optical assembly and the second optical assembly define a portion of a scan field expansion array comprising a plurality of optical assemblies and a plurality of scan field expansion assemblies, the scan field expansion array providing a focal plane with a plurality of overlapping expanded scan fields;
wherein the scan field expansion array comprises an array of (X,Y) array units, where X is a whole number from 2 to 10 and Y is a whole number from 2 to 10.

11. A method of additively manufacturing a three-dimensional object, the method comprising:
directing a first energy beam to a scanner of a first optical assembly at a first angle comprising or configured as a first flat-field lens, the first flat-field lens having a first nominal scan field with a first flat focal plane; and
re-directing, via the scanner, the first energy beam at a different, second angle through a first scan field expansion assembly comprising one or more first field-expanding optical elements, the one or more first field-expanding optical elements secured to a field-expansion housing and having a flat portion and a curved portion at radially different regions, the curved portion configured to expand the first nominal scan field to a first expanded scan field coinciding with the first flat focal plane, wherein the first expanded scan field has a cross-sectional width and/or area that exceeds a corresponding cross-sectional width and/or area of the first nominal scan field.

12. The method of claim 11, comprising:
directing a second energy beam through a second optical assembly comprising or configured as a second flat-field lens, the second flat-field lens having a second nominal scan field with a second flat focal plane; and
directing the second energy beam through a second scan field expansion assembly comprising one or more second field-expanding optical elements configured to provide a second expanded scan field coinciding with the second flat focal plane,
wherein the second expanded scan field has a cross-sectional width and/or area that exceeds a corresponding cross-sectional width and/or area of the second nominal scan field, and
wherein the first expanded scan field and the second expanded scan field partially overlap one another.

13. The method of claim 12, comprising:
irradiating sequential layers of a powder bed using the first energy beam and the second energy beam,
wherein the powder bed defines a build plane, and
wherein the first expanded scan field has a first focal plane coinciding with the build plane and the second expanded scan field has a second focal plane coinciding with the build plane.

14. The method of claim 13, comprising:
irradiating a first portion of the powder bed corresponding to the first expanded scan field using the first energy beam;
irradiating a second portion of the powder bed corresponding to the second expanded scan field using the second energy beam; and
irradiating an interlace region of the powder bed using the first energy beam and/or the second energy beam, the interlace region corresponding to a portion of the first expanded scan field and a portion of the second expanded scan field that overlap one another.

15. The method of claim 12, wherein the first flat-field lens comprises: an f-theta lens, an f-tan-theta lens, and/or a telecentric lens; and/or
wherein the second flat-field lens comprises: an f-theta lens, an f-tan-theta lens, and/or a telecentric lens.

16. The method of claim 12, wherein the first expanded scan field exhibits telecentricity across substantially an entirety of the first expanded scan field, and/or wherein the second expanded scan field exhibits telecentricity across substantially an entirety of the second expanded scan field.

17. The method of claim 12, wherein the first scan field expansion assembly comprises: one or more first field-orienting optical elements configured to orient the first energy beam exiting the first scan field expansion assembly to a first orientation parallel to a first optical axis of the first optical assembly; and/or
wherein the second scan field expansion assembly comprises: one or more second field-orienting optical elements configured to orient the second energy beam exiting the second scan field expansion assembly to a second orientation parallel to a second optical axis of the second optical assembly.

18. The method of claim 12, wherein the one or more first field-expanding optical elements comprises one or more first lenses and/or one or more first field-expanding mirror elements; and/or
wherein the one or more second field-expanding optical elements comprises one or more second lenses and/or one or more second field-expanding mirror elements.

19. The method of claim 12, comprising:
generating the first energy beam with a first beam generation device, and augmenting the first energy beam with a first beam conditioner, wherein the first beam conditioner comprises a first beam expander; and
generating the second energy beam with a second beam generation device, and augmenting the second energy beam with a second beam conditioner, wherein the second beam conditioner comprises a second beam expander.

* * * * *